US012783826B2

(12) United States Patent
Kurra et al.

(10) Patent No.: US 12,783,826 B2
(45) Date of Patent: Nov. 3, 2026

(54) AUTHENTICATION ELEMENTS FOR AUTHENTICATING OBJECTS AND SYSTEMS, OBJECTS, AND METHODS USING THEM

(71) Applicant: Mineral City Biotechnologies, LLC, Jacksonville, FL (US)

(72) Inventors: Chandana Kurra, Winter Park, FL (US); Paul Wasserman, Jacksonville, FL (US); Michael C. Freidl, Jacksonville, FL (US); Travis Eugene Meyer, Jacksonville, FL (US); David B. Spenciner, Farmington, ME (US)

(73) Assignee: Mineral City Biotechnologies, LLC, Jacksonville, FL (US)

( * ) Notice: Subject to any disclaimer, the term of this patent is extended or adjusted under 35 U.S.C. 154(b) by 0 days.

(21) Appl. No.: 18/767,520

(22) Filed: Jul. 9, 2024

(65) Prior Publication Data

US 2025/0148230 A1 May 8, 2025

Related U.S. Application Data

(60) Provisional application No. 63/640,582, filed on Apr. 30, 2024, provisional application No. 63/525,714, filed on Jul. 9, 2023.

(51) Int. Cl.
*G06K 7/10* (2006.01)

(52) U.S. Cl.
CPC ................................ *G06K 7/10366* (2013.01)

(58) Field of Classification Search
CPC ..................... G06K 7/10366; G06K 19/06046
See application file for complete search history.

(56) References Cited

U.S. PATENT DOCUMENTS

| | | | | |
|---|---|---|---|---|
| 5,535,871 A * | 7/1996 | Harbaugh | G06K 19/067 | 324/663 |
| 5,903,340 A * | 5/1999 | Lawandy | G07D 7/005 | 356/71 |

(Continued)

FOREIGN PATENT DOCUMENTS

| | | |
|---|---|---|
| EP | 3178030 B1 | 9/2020 |
| WO | WO-2025/014947 A1 | 1/2025 |

OTHER PUBLICATIONS

International Search Report for PCT/US2024/037201, 8 pages (Dec. 9, 2024).
Written Opinion for PCT/US2024/037201, 21 pages (Dec. 9, 2024).

*Primary Examiner* — Jamara A Franklin
(74) *Attorney, Agent, or Firm* — Choate, Hall & Stewart LLP; Kristen C. Buteau; Michael D. Schmitt

(57) ABSTRACT

Authentication elements that can be physically associated with objects in order to authenticate the objects are provided. An authentication element encodes at least a portion of an authentication code. In some embodiments, an authentication element is readable using x-rays, radio waves (e.g., in combination with a magnetic field), sound waves, or a combination thereof. An authentication code may be known only to a certain individual or organization. An authentication code may be distinct in some manner, for example, may be unique or correspond to a certain individual or organization. In some embodiments, a composite authentication element is used, for example, for a set of objects where each object is physically associated with a distinct portion of the composite authentication element. An authentication element (or composite authentication element) may be a passive element, for example that does not contain any circuitry and/or antenna.

45 Claims, 20 Drawing Sheets

(56) References Cited

U.S. PATENT DOCUMENTS

| | | | | |
|---|---|---|---|---|
| 2006/0244253 | A1* | 11/2006 | Wei | G09F 3/02<br>283/81 |
| 2014/0217171 | A1 | 8/2014 | Greene | |

* cited by examiner

AUTHENTICATION ELEMENTS FOR AUTHENTICATING OBJECTS AND SYSTEMS, OBJECTS, AND METHODS USING THEM

BACKGROUND

There is an ongoing need to be able to verify the authenticity of objects, especially high-value objects and objects for which there is a desire to track them. For example, it is desirable to be able to verify the authenticity of artworks, antiques, and designer fashion items (e.g., clothing, handbags, and accessories). As another example, it is desirable to be able to verify the authenticity of weapons and ammunition for weapons, in some contexts for valuation purposes (e.g., for collectable weapons) and in some contexts for tracking purposes (e.g., crime solving).

Current approaches rely on technology, such as Radiofrequency Identification (RFID), that is not suitable for all applications. For example, RFID does not fit on all objects, is usually visible to humans (e.g., such that it can be defeated by removal and/or interferes with aesthetics), can be blocked, and is active (e.g., uses circuitry powered internally or using an internal antenna). Other authentication schemes that are not RFID are often human-visible or require being viewed by a human in order to be used for authentication. Therefore, there is a need for alternative ways to verify authenticity of objects, especially those that are difficult for counterfeiters to circumvent.

SUMMARY

Authentication elements disclosed herein encode at least a portion of an authentication code. Such authentication elements can address one or more problems associated with conventional authentication schemes, like RFID. For example, authentication elements disclosed herein may be invisible to an unaided human viewer, may be readable when covered and/or embedding in an object, may be readable when disposed inside an opaque outer container, may be irremovable from being associated with an object (e.g., irremovable from the object or a label affixed to an object), or a combination thereof. Therefore, it may be harder (or impossible) to defeat authentication schemes that use one or more authentication elements disclosed herein than it is to defeat conventional security schemes, such as RFID-based schemes. Similarly, authentication elements disclosed herein may be hard to duplicate thereby being less susceptible to counterfeiting. Moreover, some such authentication elements disclosed herein can be read in-line, such as during an existing logistics process for shipping, sorting, and/or storing objects. In some embodiments, an authentication element is readable using commercially available equipment, such as an x-ray, CT, or MRI machine with a conveyor belt, thereby facilitating easy integration into existing processes. Examples of such processes include a logistics process, such as a sorting process, a routing process, a shipping process, a warehouse process, and/or a distribution process. Authentication elements disclosed herein may be used to determine whether one or more objects is authentic or inauthentic (e.g., fraudulent and/or counterfeit).

Authentication elements may be physically associated with objects in order to authenticate the objects. An authentication element encodes at least a portion of an authentication code, for example using one or more encoding portions, such as radiopaque and/or sound-attenuating encoding portion(s). In some embodiments, an authentication element is readable using x-rays, radio waves, sound waves, magnetization, or a combination thereof. An authentication code may be known only to a certain individual or organization. An authentication code may be distinct in some manner, for example, may be unique or correspond to a certain individual or organization. In some embodiments, a composite authentication element is used, for example, for a set of objects where each object is physically associated with a distinct portion of the composite authentication element. An authentication element (or composite authentication element) may be a passive element, for example that does not contain any circuitry and/or antenna. Using circuitry and/or antenna as part of an authentication element, such as with RFID, can require using larger sizes and/or more complex manufacturing, leading to increased costs and reduced versatility. In some embodiments, an authentication element may be able to be read to determine an authentication code, for example using only that information which is readable from the authentication element or in combination with other information (e.g., another portion of the authentication code or a key), in order to verify authenticity of an object.

An object may be physically associated with an authentication element. For example, an object may include an authentication element, for example embedded in the object, integrated with the object, or disposed on an interior or exterior surface of the object. As another example, an authentication element may be included in a label affixed to (e.g., adhered to) an object. An object may be disposed inside of an outer container. In some embodiments, an authentication element physically associated with an object can be read to determine an authentication code, at least a portion of which is encoded by the authentication element. In some embodiments, such reading occurs while the object is inside of an outer container (e.g., packaging), for example secured in the outer container. Accordingly, authentication elements as disclosed herein may be physically associated with objects and used to verify authenticity of the objects.

Additional security may be provided based on the manner in which an authentication element is physically associated with an object. For example, a tamper-proof mechanism (e.g., seal) may be included an authentication element. In some embodiments, tampering with a tamper-proof mechanism renders an authentication element unable to be read, for example damages or destroys (e.g., tears) the authentication element. Additionally or alternatively, a tamper-proof mechanism, such as a lock or seal, may be used for an outer container inside of which an object is disposed, to prevent unauthorized or surreptitious access to an object or authentication element associated therewith. In some embodiments, a location and/or orientation of one or more authentication elements, relative to the object and/or relative to each other, provides additional security for one or more objects. For example, an authentication element disposed in an incorrect location, disposed an incorrect distance from another authentication element, and/or incorrectly oriented may mean that the authentication element is inauthentic (e.g., fraudulent and/or counterfeit), whether or not an authentication code determined using information read from the authentication element would otherwise verify authenticity or not.

In some embodiments, the present disclosure is directed to an object that can be authenticated. The object may be physically associated with a passive authentication element that encodes at least a portion of an authentication code, for example encodes an entire authentication code.

In some embodiments, the present disclosure is directed to a passive authentication element that encodes at least a portion of an authentication code, for example encodes an entire authentication code.

In some embodiments, the present disclosure is directed to a method of verifying authenticity of an object. The method may include receiving an authentication code for an object that has been obtained, at least in part, by reading a passive authentication element. The passive authentication element may be physically associated with, for example included in, the object that encodes at least a portion of the authentication code. The method may include verifying authenticity of the object using the authentication code. In some embodiments, the authentication code is an alphanumeric string, passcode, password, or passphrase.

In some embodiments, the present disclosure is directed to a method of verifying authenticity of an object. The method may include receiving information potentially corresponding to an authentication code for an object. At least a portion of the information may have been obtained by reading a passive authentication element. The passive authentication element may be physically associated with (e.g., in or on) the object. The method may further include determining whether the information sufficiently corresponds to the authentication code. For example, the method may include determining that the information at least approximates (e.g., matches) the authentication code. The method may include determining that the information could not correspond to any other authentication code.

In some embodiments, the present disclosure is directed to a system of contained authenticatable objects. The system may include an (e.g., enclosed) outer container. The system may include objects removably disposed in (e.g., inside) the outer container. The system may further include a composite authentication element encoding at least a portion of an authentication code. In some embodiments, each of the objects is physically associated with (e.g., includes) a distinct portion of the composite authentication element. In some embodiments, the composite authentication element can be read (e.g., to determine the authentication code) through the outer container. The composite authentication element may be able to be read without accessing inside of the outer container.

In some embodiments, the present disclosure is directed to a system of an authenticatable object. The system may include an (e.g., enclosed) (e.g., opaque) outer container. The system may further include an object removably disposed in (e.g., inside) the outer container. An authentication element encoding at least a portion of an authentication code physically associated with the object. In some embodiments, the object includes distinct portions of the authentication element each disposed in or on a different portion of the object. In some embodiments, the authentication element is readable without accessing the outer container based on the object being distorted in a particular manner.

In some embodiments, the present disclosure is directed to a system for contained authenticatable objects. The system may include an (e.g., enclosed) outer container. The system may further include an object removably disposed in (e.g., inside) the outer container. In some embodiments, the object includes an authentication element encoding at least a portion of an authentication code (e.g., an entire authentication code). In some embodiments, the authentication element can be read (e.g., to determine the authentication code) without accessing inside of the outer container.

In some embodiments, the present disclosure is directed to a method of authenticating objects. The method may include providing a system. The system may include (i) an outer container (e.g., an opaque outer container), (ii) objects removably disposed in (e.g., inside) the outer container, and (iii) a composite authentication element encoding at least a portion of an authentication code, wherein each of the objects is physically associated with (e.g., includes) a portion (e.g., a distinct portion) of the composite authentication element. The method may further include reading the composite authentication element through the outer container. In some embodiments, the reading happens without accessing inside of the outer container.

In some embodiments, the present disclosure is directed to a method of authenticating objects. The method may include providing a system that includes (i) an outer container (e.g., an opaque outer container), (ii) one or more objects removably disposed in (e.g., inside of) the outer container, and (iii), for each of the one or more objects, an authentication element physically associated with the object that encodes at least a portion of an authentication code. The method may further include reading the authentication element through the outer container (e.g., without accessing inside of the outer container).

In some embodiments, the present disclosure is directed to a method for registering a fingerprint of an object. The method may include receiving an object physically associated with an authentication element. The method may further include obtaining a fingerprint of the authentication element. The method may further include registering the fingerprint with the object in a registry.

In some embodiments, the present disclosure is directed to a method of verifying authenticity of an object. The method may include obtaining a comparative fingerprint for an authentication element physically associated with an object. The method may further include receiving, from a registry, a copy of an authentic fingerprint for the object, wherein the object has been registered with the registry. The method may further include verifying authenticity of the object by, at least in part, comparing the comparative fingerprint to the authentic fingerprint.

In some embodiments, the present disclosure is directed to a passive cipher element. The passive cipher element may encode a cipher key, for example for an encrypted authentication code (e.g., corresponding to an object).

In some embodiments, the present disclosure is directed to a plurality of cipher elements. The cipher elements may encode a cipher key for an encrypted authentication code (e.g., corresponding to an object). The cipher elements may each encode a different cipher key of a set of cipher keys corresponding to an encrypted authentication code (e.g., for an object).

In some embodiments, the present disclosure is directed to a method of determining authenticity of an object. The method may include reading a cipher element physically associated with an object to determine a cipher key. The method may further include decrypting an encrypted authentication code for the object using the cipher key. The method may further include determining that the object is authentic based on the decrypted authentication code.

In some embodiments, the present disclosure is directed to a system that includes an enclosed outer container, objects removably disposed in the outer container, and a composite cipher element encoding a cipher key for an encrypted authentication code corresponding to the objects. Each of the objects may be physically associated with (e.g., includes) a distinct portion of the composite cipher element and the composite cipher element can be read (e.g., to determine the cipher key) through the outer container (e.g., without accessing inside of the outer container).

In some embodiments, the present disclosure is directed to a system that includes an enclosed outer container, an object removably disposed in the outer container. The object may include a cipher element encoding a cipher key for an encrypted authentication code. The authentication code may correspond to the object. The cipher element may be able to be ready (e.g., to determine the cipher key) without accessing inside of the outer container.

Any two or more of the features described in this specification, including in this summary section, may be combined to form implementations of the disclosure, whether specifically expressly described as a separate combination in this specification or not.

BRIEF DESCRIPTION OF THE DRAWINGS

The present teachings described herein will be more fully understood from the following description of various illustrative embodiments, when read together with the accompanying drawings. It should be understood that the drawing described below is for illustration purposes only and is not intended to limit the scope of the present teachings in any way. The foregoing and other objects, aspects, features, and advantages of the disclosure will become more apparent and may be better understood by referring to the following description taken in conjunction with the accompanying drawings, in which.

DETAILED DESCRIPTION OF CERTAIN EMBODIMENTS

Figure 1:
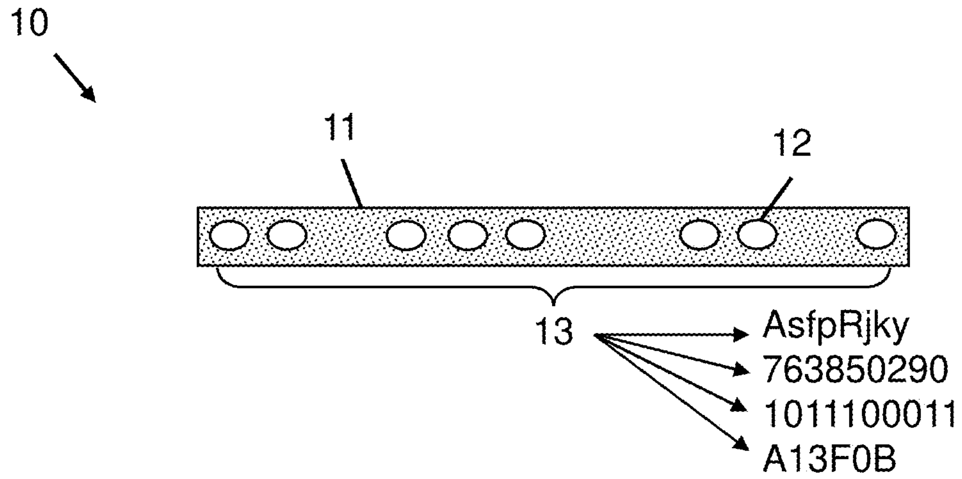
FIG. 1 illustrates an example of an authentication element, according to illustrative embodiments of the present disclosure.

Disclosed herein are, inter alia, passive authentication elements that are imagable with at least one (non-visible-wavelength) imaging modality, such as one using x-rays, radio waves, sound waves, or more than one of these. Passive authentication elements may be used in authenticating objects. In some embodiments, an authentication element encodes at least a portion of an authentication code. (A portion of an authentication code may itself be an authentication code.) In some embodiments, an authentication element encodes an authentication code. In some embodiments, an authentication element encodes an entire authentication code. In some embodiments, an authentication element encodes a complete authentication code. An authentication code may correspond to a particular person or organization (e.g., company). An authentication code may be unique. In some embodiments, an authentication code is only used for one object and never reused. A same authentication code may be used for objects of a same type (e.g., manufacturer and/or model). An authentication element may encode a distinct portion of an authentication code. An authentication element may be a portion of an object.

Authentication Elements

Authentication elements disclosed herein (e.g., that include one or more encoding portions that are radiopaque and/or attenuate sound waves to encode at least a portion of an authentication code) may be located covertly. For example, an authentication element can be covered, embedded in an object, disposed internally to an object, disposed on or in an interior of an object, or disposed on or in an internal component of an object and still be used for authentication purposes. Such authentication elements need not be physically viewable by an unaided human viewer in order for an object to be authenticated.

Authentication elements disclosed herein may alternatively or additionally be of a size or construction such that they are not visible to an unaided human viewer (e.g., would not be recognized under reasonable scrutiny). For example, they may be too small to be noticeable or may be made of materials that make any encoded information undiscernible without magnification and/or viewed using the appropriate probe waves (e.g., using the appropriate imaging modality or modalities). Moreover, certain manners of encoding information may make an authentication element appear uniform unless viewed in the appropriate manner (e.g., magnification and/or imaging modality). For example, color of an authentication element in the visible spectrum may appear uniform but radiodensity varies. In some embodiments, at least a portion of an authentication code is encoded by an authentication element using one or more optically clear encoding portions, for example that include (e.g., are formed by) optically clear but radiodense ink or dye. Therefore, even if theoretically visible (e.g., because it is disposed on an exposed surface of an object), a viewer (e.g., prospective counterfeiter) may not appreciate that an authentication element is present. One or more non-encoding portions of an authentication element may be selected to hide that at least a portion of an authentication code is encoded by an authentication element (e.g., selected to have a similar visible color).

In some embodiments, an authentication element encodes at least a portion of multiple authentication codes (e.g., corresponding to different persons and/or organizations). An authentication element may encode at least a portion of one authentication code or at least a portion of each of multiple authentication codes. Multiple authentication codes in an authentication element may correspond to, for example, different person(s), organization(s), and/or component(s) within an object. An authentication element may encode multiple copies of at least a portion of an authentication code (e.g., multiple copies of an authentication code). For example, an authentication element may encode multiple copies of at least a portion of an authentication code along its length. An authentication element may encode multiple copies of at least a portion of an authentication code periodically (e.g., with or without any spacing between the copies, whether or not a start point and/or end point of each copy is indicated). An authentication element may encode multiple copies of at least a portion of an authentication code with or without any spacing between the copies (e.g., whether or not a start point and/or end point of each copy is indicated). An authentication element may encode at least a portion of an authentication code repeatedly (e.g., along its length). Encoding multiple copies of at least a portion of an authentication code by an authentication element may allow for easy reading of the authentication element, for example reducing sensitivity to position and/or orientation of the authentication element when performing the reading and/or allowing different portions of the authentication element to be read without needing to read a particular portion.

An authentication element may be physically associated with an object. For example, an authentication element may be embedded in, woven into, incorporated into, embroidered into, stitched into, braided into, integrated with, disposed on or in, and/or printed onto or into an object. As other examples, an authentication element physically associated with an object may be embedded in, woven into, incorporated into, embroidered into, stitched into, braided into, integrated with, disposed on or in, and/or printed onto or into packaging of the object. Such packaging may be tamper-proof. As other examples, an authentication element physically associated with an object may be embedded in, woven into, incorporated into, embroidered into, stitched into, braided into, integrated with, disposed on or in, and/or printed onto or into a label that is affixed to (e.g., adhered to) the object or (e.g., tamper-proof) packaging for the object. An authentication element physically associated with an object may be a portion of the object.

An authentication element may encode at least a portion of an authentication code using one or more encoding portions. An encoding portion may be radiopaque and/or sound-attenuating. An encoding portion may be readable using x-rays, radio waves (e.g., in combination with a magnetic field), sound waves, or a combination thereof (more than one of these). An encoding portion may produce signal in response to x-rays, radio waves (e.g., in combination with a magnetic field), sound waves, or a combination thereof. For example, an encoding portion may produce signal by absorption, attenuation, absorption and emission (e.g., down-conversion) (e.g., of a different characteristic particle or signal from an excitation particle or signal, for example fluorescence), reflection, refraction, or a combination thereof. For example, different produced signal may result in different contrast being visible in an image (e.g., a human-readable image). An encoding portion may be readable using an imaging modality, such as, for example, x-ray (e.g., dual-energy x-ray absorptiometry), computed tomography, magnetic resonance imaging, ultrasound, or a combination thereof (more than one of these). An authentication element may be readable using x-rays, radio waves (e.g., in combination with a magnetic field), sound waves, or a combination thereof (more than one of these) such that at least a portion of an authentication code can be determined from the authentication element (e.g., one or more encoding portions thereof). For example, x-ray imaging (e.g., dual-energy x-ray absorptiometry), magnetic resonance imaging (MRI), computed tomography (CT), and/or sonography (e.g., ultrasound) may be used to read an authentication element or one or more encoding portions. An authentication element may be readable only in one or more non-visible imaging modalities (e.g., CT, x-ray, MRI, and/or ultrasound).

An encoding portion may be radiopaque (e.g., to x-rays and/or radio waves) and/or attenuate sound waves. For example, an encoding portion may be a radiopaque thread, a radiopaque wire, a radiopaque string, a radiopaque cord, a radiopaque fiber, or a radiopaque filament. For example, an encoding portion may be a thread, a wire, a string, a cord, a fiber, or a filament that attenuates sound. An encoding portion may include one or more radiopaque contrasting agents, one or more metallic elements (for example, including gold and/or stainless steel), one or more radiopaque particles, one or more radiopaque dyes, one or more radiopaque inks (e.g., metallic ink(s)), one or more radiopaque pigments, or a combination thereof. An encoding portion may include one or more contrasting agents, one or more metallic elements (for example, including gold and/or stainless steel), one or more particles, one or more dyes, one or more inks (e.g., metallic ink(s)), one or more pigments, or a combination thereof that attenuate sound. In some embodiments, an encoding portion is optically clear. In some embodiments, an encoding portion includes one or more optically-clear radiopaque dyes, one or more optically-clear radiopaque inks, one or more optically-clear radiopaque pigments, or a combination thereof. In some embodiments, an encoding portion includes two (e.g., optically clear) radiopaque species (e.g., inks, dyes, pigments, or a combination thereof) of different radiodensities. For example, gadolinium, iodine, an oxide (e.g., iron oxide or titanium dioxide), barium (e.g., as barium sulfate), manganese salt (e.g., manganese chloride), aluminum, bismuth (e.g., elemental bismuth and/or as bismuth oxychloride or bismuth trioxide), titanium, or a combination thereof may be used in an encoding portion. A portion of an authentication element may be radiopaque (e.g., to x-rays and/or radio waves) and/or attenuate sound waves. Radiopaque does not necessarily mean that all incident x-rays and/or radio waves are blocked (e.g., absorbed). A sound-attenuating encoding portion may be discernable in an imaging modality that uses sound waves based on how the encoding portion attenuates sound waves. In some embodiments, an entirety of a fiber or filament (e.g., along its entire length and/or cross sectional area) of an encoding portion is radiopaque and/or sound attenuating. For example, an encoding portion may be a fiber or filament made of gold or stainless steel (e.g., that is braided into an authentication element or used as a core of a thread or fiber of an authentication element). An encoding portion may be discernable (e.g., against background) in CT imaging, MRI imaging, x-ray imaging (e.g., fluoroscopy or two-energy x-ray absorptiometry imaging), or sonography (e.g., ultrasound imaging). An encoding portion may be visible only in one or more non-visible imaging modalities (e.g., CT, x-ray, MRI, and/or ultrasound) (e.g., not visible under any visible wavelength imaging modality).

An encoding portion may include a radiopaque ink, pigment and/or dye, for example integrated with a filament or fiber. An encoding portion may include particles integrated with, for example embedded in, a filament or fiber. An encoding portion may be incorporated in an authentication element. An encoding portion may be integrated into an authentication element. An encoding portion may be, for example, one or more particles or one or more dyes, inks, and/or pigments (e.g., one or more fluorophores) disposed in or on a thread, string, fiber, cord, wire, or filament. Certain materials, such as ultrahigh molecular weight polyethylene, are hard to coat and/or impregnate with dye, ink, or pigment, and therefore it may be preferable to use particles integrated with (e.g., embedded in) such material. Such incorporation may occur through an extrusion, printing, or spinning (e.g., electrospinning) process of forming material (e.g., a polymer fiber or filament). Such incorporation may occur post formation, for example after a polymer fiber or filament has been formed or after a thread or fiber made of more than one fiber and/or more than one filament (e.g., braided together) has been formed. Such incorporation may occur during braiding of fibers and/or threads. An encoding portion may be formed using compounding, for example of particles with a matrix (e.g., polymer), for example thereby resulting in a radiopaque and/or sound attenuating fiber or filament. The use of embedding or weaving or braiding may be preferable for a material because incorporating encoding portion would be difficult or impossible.

In some embodiments, an authentication element includes one or more encoding portions that are radiopaque such that the one or more encoding portions are discernable against background (e.g., an object and/or label) using x-rays and/or radio waves (e.g., in x-ray and/or MRI, respectively). In some embodiments, an authentication element includes one or more encoding portions that attenuate sound waves such that the one or more encoding portions are discernable against background (e.g., an object and/or label) using sound waves (e.g., in a sonography modality). In some embodiments, an authentication element includes one or more encoding portions that enhance visibility in one or more imaging modalities. In some embodiments, an authentication element includes a first encoding portion that is radiopaque such that it is discernable from a second radiopaque encoding portion included in the authentication element using x-rays and/or radio waves, for example based on wavelength and/or intensity. In some embodiments, an authentication element includes a first encoding portion that attenuates sound waves such that, using sound waves, it is discernable from a second encoding portion included in the authentication element that attenuates sound waves. An encoding portion may have variable radiodensity or constant radiodensity (or variable attenuation or constant attenuation to sound waves). An encoding portion may have variable attenuation of sound waves or constant attenuation of sound waves.

An authentication element may encode at least a portion of an authentication code using, for example, one or more contrasting agents, one or more particles, one or more metallic elements, one or more dyes, one or more fluorophores, one or more inks (e.g., metallic ink(s)), one or more threads (e.g., one or more monofilament threads, one or more multi-filament threads, or a combination thereof), one or more fibers (e.g., one or more monofilament fibers, one or more multi-filament fibers, or a combination thereof), one or more filaments, one or more wires, one of more strings, one or more cords, one or more ribbons, or a combination thereof. An encoding portion of an authentication element may be, for example, one or more contrasting agents, one or more particles, one or more metallic elements, one or more dyes, one or more fluorophores, one or more inks (e.g., metallic ink(s)), one or more threads (e.g., one or more mono-filament threads, one or more multi-filament threads, or a combination thereof), one or more fibers (e.g., one or more mono-filament fibers, one or more multi-filament fibers, or a combination thereof), one or more filaments, one or more wires, one or more strings, one or more cords, or one or more ribbons. For example, gadolinium, iodine, an oxide (e.g., iron oxide or titanium dioxide), barium (e.g., as barium sulfate), manganese salt (e.g., manganese chloride), aluminum, bismuth (e.g., elemental bismuth and/or as bismuth oxychloride or bismuth trioxide), titanium, or a combination thereof may be used in an authentication element (e.g., one or more encoding portions thereof). In some embodiments, an authentication element encodes at least a portion of an authentication code using one or more optically-clear radiopaque dyes, one or more optically-clear radiopaque inks, or both. In some embodiments, an authentication element encodes at least a portion of an authentication code using two (e.g., optically clear) radiopaque species (e.g., inks, dyes, or an ink and a dye) of different radiodensities. Such different radiodensity materials may be able to be distinguished during imaging (e.g., x-ray imaging, such as dual-energy x-ray absorptiometry). An authentication element may encode at least a portion of an authentication code using one or more fibers that are braided into a thread (e.g., with or without one or more other fibers). An authentication element, such as a thread, filament, or fiber, may include one or more polymer materials, such as one or more silicones, one or more nylons, one or more polyethylenes (e.g., ultra-high-molecular-weight polyethylene (UHMWPE)), one or more polypropylenes, one or more polyesters, one or more polytetrafluoroethylenes (PTFEs), or a combination thereof. An encoding portion may be a tracer line. An authentication element may encode at least a portion of an authentication code using a single encoding portion, for example a single filament or single fiber.

An encoding portion may be embedded in an authentication element. An encoding portion may be woven into an authentication element. An encoding portion may be embroidered into an authentication element. An encoding portion may be braided into an authentication element. For example, an authentication element may be or include a single filament that is an encoding portion that encodes at least a portion of an authentication code that is braided, woven, and/or embroidered into the authentication element. For example, an authentication element may be or include a multifilament fiber where one or more of the filaments in the fiber are encoding portion(s) that encode at least a portion of an authentication code. A multifilament authentication element may include a core (e.g., including one or more filaments) and/or a sheath (e.g., itself including one or more filaments) and, optionally, the core and/or the sheath may (each) include one or more encoding portions. An encoding portion may be or include filament, thread, or fiber that is braided. One or more encoding portions may be included in a braiding pattern of an authentication element, for example a braiding pattern of a sheath, a braiding pattern of a core, or both. For example, one or more encoding portions that is (are) filament(s) may be braided with one or more filament(s) that are not encoding portions, for example as a sheath or core of a fiber or thread. Relative position of one or more encoding portions in a braiding pattern for an authentication element may encode at least a portion of an authentication code.

For example, an authentication element may be or include a multifilament fiber including a core where the core is an encoding portion that encodes at least a portion of an authentication code. For example, an authentication element may be or include a multifilament fiber where the sheath is encoding portion(s) that encode at least a portion of an authentication code. For example, an authentication element may be or include a multifilament fiber where the core and the sheath are encoding portion(s) that encode at least a portion of an authentication code. An authentication multi-filament fiber include an alternating pattern of filaments that are encoding portions and filaments that are non-encoding portions. For example, an authentication element may be or include a multifilament fiber where the core and/or the sheath include an alternating pattern of filaments that are encoding portions and filaments that are non-encoding portions. For example, the core and the sheath may include similar alternating pattern. For example, the core and the sheath may include different alternating patterns. For example, an authentication element may be or include a single fiber thread that is encoding portion(s) that encode at least a portion of an authentication code. For example, an authentication element may be or include a multifiber thread where one or more of the fibers in the thread are encoding portion(s) that encode at least a portion of an authentication code. Such a multifilament or multifiber authentication element may include a core (e.g., including one or more filaments or one or more fibers, respectively) and/or a sheath (e.g., including one or more filaments or one or more fibers, respectively) (e.g., may be coreless). For example, an authentication element may be or include a multifiber thread where the core is encoding portion(s) that encode at least a portion of an authentication code. For example, an authentication element may be or include a multifiber thread where the sheath is encoding portion(s) that encode at least a portion of an authentication code. For example, an authentication element may be or include a multifiber thread where the core and the sheath are encoding portion(s) that encode at least a portion of an authentication code. An authentication multifiber thread include an alternating pattern of fibers that are encoding portions and fibers that are non-encoding portions. For example, an authentication element may be or include a multifiber thread where the core and/or the sheath include an alternating pattern of fibers that are encoding portions and fibers that are non-encoding portions. The core and the sheath may, for example, include similar alternating pattern. The core and the sheath may, for example, include different alternating patterns.

An authentication element may encode at least a portion of an authentication code using one or more braided elements (e.g., radiopaque braided element(s)). An encoding portion may be a braided element. An authentication element may encode at least a portion of an authentication code using one or more woven elements (e.g., radiopaque woven element(s)). An encoding portion may be a woven element. In some embodiments, an encoding portion is or is included in a core of an authentication element (e.g., a core of a fiber or thread). In some embodiments, an encoding portion is or is included in a sheath of an authentication element (e.g., a sheath of a fiber or thread) (e.g., whether or not a core is present).

An encoding portion may have different radiodensity (whether variable or constant) than other material in an authentication element (e.g., other fiber(s) and/or filament(s)) and/or an object. In some embodiments, a radiopaque portion of an authentication element (e.g., an encoding portion) has a radiodensity that is at least 1.1×, at least 1.2×, at least 1.3×, at least 1.4×, at least 1.5×, at least 2×, at least 3×, at least 4×, at least 5×, or at least 10× a radiodensity of an object physically associated with the authentication element. In some embodiments, a radiopaque portion of an authentication element (e.g., an encoding portion) has a radiodensity that is at least 1.1×, at least 1.2×, at least 1.3×, at least 1.4×, at least 1.5×, at least 2×, at least 3×, at least 4×, at least 5×, or at least 10× a radiodensity of a label that includes the authentication element. In some embodiments, a radiopaque portion of an authentication element (e.g., an encoding portion) has a radiodensity that is at least 1.1×, at least 1.2×, at least 1.3×, at least 1.4×, at least 1.5×, at least 2×, at least 3×, at least 4×, at least 5×, or at least 10× a radiodensity of a label that includes the authentication element and a radiodensity of an object that the label is physically associated with.

In some embodiments, an authentication element includes one or more portions that indicate a start point and/or end point of the at least a portion of an authentication code encoded in the authentication element (e.g., of an authentication code). In some embodiments, an authentication element includes one or more portions that encode information indicating a start point and/or end point of the at least a portion of an authentication code encoded in the authentication element (e.g., of an authentication code). In some embodiments, an authentication element includes one or more portions that encode information indicating a start point and/or end point of a region of an authentication element that encodes at least a portion of an authentication code (e.g., that encodes an authentication code). For example, one or more portions indicating a start point may precede a portion of an authentication element that corresponds to (e.g., encodes) a first character in an authentication code. For example, one or more portions indicating an end point may succeed a portion of an authentication element that corresponds to (e.g., encodes) a last character in an authentication code.

In some embodiments, different encoding portions of an authentication element are spatially separated from each other such that different portions (e.g., characters) of an authentication code are discretely encoded in an authentication element. For example there may be blank space in an authentication element in which no encoding portion is present between portions of the authentication element. The size, shape, and/or spacing (e.g., pattern of spacings) of such blank space (that is, the size, shape, and/or spacing between distinct encoding portions) may itself act to encode at least a portion of an authentication code. For example, an encoding may be based not only on characteristics within encoding portions but also how the encoding portions are separated and/or sized relative to each other.

An authentication element may encode only a portion of an authentication code or more than only a portion of an authentication code, for example an entire authentication code. In some embodiments, when an authentication element encodes only a portion of an authentication code, the remainder of the authentication code may be provided from elsewhere. For example, documentation, an invoice, or a physical or electronic file, a person's memory (e.g., an owner's memory), or a combination thereof for an object may include the remainder of an authentication code (e.g., as a watermark, metadata, or plaintext). In some embodiments, multiple authentication elements together encode only a portion of an authentication code. The remainder of the authentication code may be provided from elsewhere (e.g., documentation, an invoice, a physical or electronic file, for example in a watermark, in metadata, or as plaintext print). Thus, in some embodiments, to determine authenticity (e.g., of an object), the authentication element or the multiple authentication elements must be read and then a portion of an authentication code discernable from the reading is combined with the remainder of the authentication code from elsewhere in order to complete the verification. In some embodiments, a portion of an authentication code read from an authentication element may be combined (e.g., concatenated or interspersed) with another portion of the authentication code as part of an authentication (e.g., verification) process.

In some embodiments, an authentication element encodes at least a portion of an authentication code two-dimensionally, for example as a QR code. In some embodiments, an authentication element encodes at least a portion of an authentication code one-dimensionally, for example as a barcode. (A barcode may be present as a two-dimensional element but generally only one-dimension of spacing encodes information in a barcode.) In some embodiments, an authentication element encodes at least a portion of an authentication code three-dimensionally. For example, an arrangement of encoding portions of an authentication element in three dimensions may correspond to at least a portion of an authentication code. In some embodiments, an authentication element that encodes at least a portion of an authentication code may be read using perpendicular probes (x-rays).

An object may be physically associated with multiple authentication elements. In some embodiments, each one of multiple authentication elements encodes a portion of a common authentication code. The portion may be a distinct portion. For example, each of four authentication elements may encode a quarter of an authentication code or a quarter of a specific portion of an authentication code. The portion may not be a distinct portion in that there may be some overlap. Such overlap may provide additional security because it can be known what the extent of overlap should be and/or whether the overlap should be considered or discarded in reading an authentication element to determine at least a portion of an authentication code. In some embodiments, multiple authentication elements together encode an entirety of an authentication code. In some embodiments, each of multiple authentication elements encodes a same authentication code or encodes a same portion of an authentication code. Thus, multiple authentication elements physically associated with an object may be redundant to each other. Such redundancy may reduce the impact of intentional or unintentional damage to an object or packaging for an object that degrades or destroys one or more of the authentication elements and/or provide additional security as described below. In some embodiments, each of multiple authentication elements encodes at least a portion of a distinct authentication code (e.g., an entire distinct authentication code).

Multiple authentication elements physically associated with an object may be physically associated with different portions of the object. For example, one authentication element may be disposed on an outer surface and one authentication element may be disposed on an inner surface. As another example, different authentication elements may be disposed at different edges, different surfaces, or different corners of an object. As another example, different authentication elements may be physically associated with different components of an object. Different authentication elements physically associated with an object may be physically separated.

Different portions of an authentication element physically associated with an object may be physically associated with different portions of the object. For example, one portion of an authentication element may be disposed on an outer surface and another portion may be disposed on an inner surface. As another example, different portions of an authentication element may be disposed at different edges, different surfaces, or different corners of an object. As another example, different portions of an authentication element may be physically associated with different components of an object. Different portions of an authentication element physically associated with an object may be physically separated.

An authentication element may be tamper-proof. An authentication element may be included in a tamper-proof mechanism. An authentication element may be unable to be read if a tamper-proof mechanism has been tampered with. In some embodiments, a tamper-proof mechanism (e.g., label) includes an authentication element that encodes at least a portion of the authentication code, which cannot be obtained from the authentication element if the tamper-proof mechanism has been tampered with. An authentication element may be included in a label, for example a product label (e.g., that includes information about an object) or a security or authenticity label. Such a label may be affixed to (e.g., adhered to) an object or packaging in which an object is packaged (e.g., shrink wrap). An authentication element may be included in packaging. An authentication element may be included in shrink wrap. In some embodiments, an authentication element is included in (e.g., embedded in) a tamper evident portion of a tamper-proof mechanism (e.g., label). A tamper-proof mechanism may be a seal or lock or label. A tamper-proof label may be a seal. An object may be packaged by a packaging [e.g., box (e.g., cardboard box) or shrink-wrap] where the packaging includes an authentication element. Such packaging may be tamper-proof. Alternatively or additionally, the authentication element may be included in a tamper-proof portion of the packaging.

A tamper-proof mechanism, for example that includes an authentication element, may be structured to degrade upon exposure to one or more particular chemical species, for example upon exposure to oxygen and/or humidity. A tamper-proof mechanism may be chemically sensitive, for example such that an authentication element degrades upon exposure to one or more particular chemical species. In some embodiments, a tamper-proof mechanism is constructed such that an authentication element becomes unreadable (e.g., obfuscated) upon exposure to one or more chemical species, such as, for example, oxygen and/or humidity. For example, a tamper-proof mechanism may attenuate sound waves in a manner such that an authentication element is readable unless the tamper-proof mechanism is exposed to one or more particular chemical species that alter a manner in which the tamper-proof mechanism attenuates sounds waves such that the authentication element is no longer discernable against altered portion(s) of the tamper-proof mechanism. As another example, a similar scheme may be used for analogous MRI-based embodiments, for example where tampering results in an authentication element no longer being discernable in MRI.

Likewise, a tamper-proof mechanism that includes an authentication element may be physically sensitive, for example such that the authentication element is physically degraded (e.g., broken and/or torn) if the tamper-proof mechanism is tampered with. Likewise, a tamper-proof mechanism, for example that includes an authentication element, may be structured to degrade upon exposure to a specific temperature or range of temperature. A tamper-proof mechanism may be thermosensitive, for example such that an authentication element degrades upon exposure to a specific temperature or range of temperature or to temperature outside of a specific range. In some embodiments, a tamper-proof mechanism is constructed such that an authentication element becomes unreadable (e.g., obfuscated) upon exposure to a specific temperature or range of temperature or to temperature outside of a specific range. Similarly, a tamper-proof mechanism, for example that includes an authentication element, may be structured to degrade upon exposure to light. A tamper-proof mechanism may be photosensitive, for example such that an authentication element degrades upon exposure to certain amount of light and/or to one or more wavelengths within the visible light spectrum. In some embodiments, a tamper-proof mechanism is constructed such that an authentication element becomes unreadable (e.g., obfuscated) upon exposure to certain amount of light and/or to one or more wavelengths of light (e.g., within the visible light spectrum). A tamper-proof mechanism may be chemically sensitive, physically sensitive, thermosensitive, photosensitive, or a combination thereof.

An authentication element may be embedded into an object. An authentication element may be integrated with (e.g., within) an object. An authentication element may be a portion of an object. An authentication element may be covered, for example by a label, by packaging, or by a portion of an object (e.g., by paint of a painting). An authentication element may be printed (e.g., inkjet printed) onto an object. An authentication element may be disposed on an interior of an object. An authentication element may be disposed on a surface of an object. An authentication element may be internal to an object. An authentication element may be covered from view by unaided human eyes, for example by a portion of an object. An authentication element may be affixed (e.g., adhered) to an object. An object may contain an authentication element. Distinct portions of an authentication element may be disposed on (e.g., printed onto, embedded in, integrated with, or woven into) different portions of an object. An authentication element may not be visible to unaided human eyes. For example, an authentication element may be covered (e.g., by a portion of an object) or may be constructed such that it blends into an object or label affixed to an object (e.g., due to material selection and/or size). An authentication element may be integrated with an object in that it is not removable without noticeably damaging the object. An authentication element may be woven into a substrate of an object (e.g., woven into a canvas of an artwork). An authentication element may have been applied to an object (e.g., printed on the object) after the object has been at least partially formed. In some embodiments, an authentication element has been applied to a substrate that is subsequently processed, for example applied to (e.g., woven into) a canvas (e.g., during fabrication of the canvas) that is then made into an artwork. An authentication element may be deposited, for example printed, such as inkjet printed, onto an object or a label physically associated with an object (e.g., disposed on the object or on packaging for the object). An authentication element may be deposited on a surface of an object or a label physically associated with an object.

An authentication element may be incorporated into an object. An authentication element may be embedded into an object. An authentication element may be braided into an object. An authentication element may be woven into an object. An authentication element may be a thread that is colored. An authentication element may be a string that is colored. An authentication element may be a cord that is colored. An authentication element may be a yarn that is colored. An authentication element may be a wire that is colored. An authentication element may be a thread that is dyed with a visible color. An authentication element may be a string that is dyed with a visible color. An authentication element may be a cord that is dyed with a visible color. An authentication element may be a yarn that is dyed with a visible color. An authentication element may be a wire that is dyed with a visible color. An authentication element may be braided into a textile or fabric. An authentication element may be embroidered into a textile or fabric. For example, an authentication element may be embroidered into a textile as a logo. An authentication may be woven into a textile or fabric. For example, an authentication element may be woven into a textile as a logo.

In some embodiments, an authentication element is shaped into a readable pattern (e.g., forming one or more characters, such as one or more letters and/or one or more numbers) that is discernable (e.g., only discernable) using x-rays, radio waves (e.g., in combination with a magnetic field), sound waves, or a combination thereof. For example, an authentication element may be embroidered. Such a readable pattern may or may not encode at least a portion of an authentication code. An authentication element may be or include a logo, tag, patch, emblem, badge, crest, seal, or token, for example included in or on (e.g., embroidered onto) an object, such as textile. One or more encoding portions of an authentication element may be incorporated into a logo, tag, patch, emblem, badge, crest, seal, or token. For example, a logo or branding patch may include one or more encoding portions. Since one or more encoding portions may not be visible to and/or may be covered by one or more non-encoding portions of an authentication element, an observer may not be able to tell that there is an authentication element present in a logo, tag, patch, emblem, badge, crest, seal, or token. Moreover, alternatively or additionally, because an authentication element may be or include a fiber or thread (e.g., one or more encoding portions that is/are one or more fibers and/or one or more threads), such an authentication element may be easily integrated into a standard manufacturing process for a logo, tag, patch, emblem, badge, crest, seal, or token. For example, a standard embroidery process that applies a logo to an object (e.g., textile) may be adapted to also use a radiopaque thread or fiber such that an authentication element is incorporated into the logo during the embroidery of the object.

An authentication element may include one or more encoding portions that are spatially arranged and constructed to form a secondary logo, tag, patch, emblem, badge, crest, seal, or token different from a primary, human visible logo, tag, patch, emblem, badge, crest, seal, or token (e.g., for a brand). For example, a secondary logo, tag, patch, emblem, badge, crest, seal, or token may form a radiopaque and/or sound attenuating pattern (e.g., text) that is readable using an appropriate imaging modality (e.g., x-ray, MRI, CT, or ultrasound). For example, a secondary logo, tag, patch, emblem, badge, crest, seal, or token may form a radiopaque and/or sound attenuating pattern (e.g., text) that is discernable using x-rays, radio waves (e.g., in combination with a magnetic field), sound waves, or a combination thereof. For example, a brand logo may be applied as embroidery to an article of clothing (e.g., a chest area of a shirt) using a radiopaque thread that forms a secondary pattern within the logo that identifies the article of clothing as authentic. As another example, radiopaque and/or sound attenuating particles may be applied during patch construction in a manner that encodes at least a portion of an authentication code within the patch and the patch may be subsequently applied (e.g., stitched into) an article of clothing or fashion accessory (e.g., handbag).

In some embodiments, at least a portion of an authentication code is encoded in an authentication element by combination of (i) a readable pattern in which the authentication element is shaped [e.g., that is discernable (e.g., only discernable) using x-rays, radio waves (e.g., in combination with a magnetic field), sound waves, or a combination thereof] and (ii) a particular spatial arrangement, spatial distribution, phase, position, orientation, size, construction to produce a responsive signal, or combination thereof of one or more encoding portions one or more encoding portions within the authentication element.

In some embodiments, an authentication element is shaped into a readable pattern (e.g., forming one or more characters, such as one or more letters and/or one or more numbers) to act as a decoy. Thus, in some embodiments, an authentication element is shaped into a readable pattern that does not encode at least a portion of an authentication code. For example, an authentication element may be shaped into a readable pattern in order to lead potential counterfeiters to believe that the readable pattern is what provides security even though a different aspect of the authentication element is what encodes at least a portion of an authentication code (e.g., a spatial arrangement and/or distribution of one or more encoding portions of the authentication element). In general, a readable pattern may be at a larger size scale (e.g., on the order of the size of the authentication element) than an encoding mechanism (or another encoding mechanism) that encodes at least a portion of an authentication code. For example, an authentication element may be shaped into a readable pattern that is approximately centimeter scale while at least a portion of an authentication code is encoded based on a particular spatial arrangement, spatial distribution, phase, position, orientation, size, construction to produce a responsive signal, or combination thereof of one or more encoding portions that is on a millimeter or submillimeter scale. For example, at least a portion of an authentication code may be encoded by spacing in a braiding pattern of one or more encoding portions in a thread or fiber where the thread or fiber may be shaped (e.g., due to how it is stitched or embroidered) into a readable pattern. The readable pattern may show up in one or more non-visible imaging modalities but not serve to encode any portion of an authentication code and, moreover, depending on the magnification used, may appear to be of constant radiodensity and/or sound attenuation. One would need to know to look at a smaller scale (higher magnification) in order to read the at least a portion of the authentication code from the authentication element.

In some embodiments, an authentication element is no more than 10 cm, no more than 5 cm, no more than 4 cm, no more than 3 cm, no more than 2 cm, no more than 1 cm, or no more than 0.5 cm in at least one dimension (e.g., a length dimension). In some embodiments, an authentication element is at least 0.5 cm, at least 1 cm, at least 2 cm, at least 3 cm, at least 4 cm, or at least 5 cm in at least one dimension (e.g., a length dimension). In some embodiments, an authentication element is no more than 1 cm, no more than 5 mm, no more than 4 mm, no more than 3 mm, no more than 2 mm, no more than 1 mm, or no more than 0.5 mm in at least one dimension (e.g., a width dimension or a diameter dimension). In some embodiments, an authentication element is at least 0.5 mm, at least 1 mm, at least 2 mm, at least 3 mm, at least 4 mm, or at least 5 mm in at least one dimension (e.g., a width dimension or a diameter dimension). In some embodiments, an authentication element has an aspect ratio (e.g., a length to width or length to diameter aspect ratio) of at least 2:1, at least 3:1, at least 4:1, at least 5:1, at least 10:1, or at least 20:1 and, optionally, no more than 100:1. In some embodiments, an authentication element (e.g., encoding at least a portion of an authentication code in a barcode or a QR code) occupies an area of no more than 25 $cm^2$, no more than 20 $cm^2$, no more than 15 $cm^2$, no more than 10 $cm^2$, no more than 5 $cm^2$, or no more than 2 $cm^2$, or no more than 1 $cm^2$. In some embodiments, an authentication element occupies a volume of no more than 10 $cm^3$ (e.g., no more than 10 $cm^3$, no more than 5 $cm^3$, no more than 2 $cm^3$, no more than 1 $cm^3$, no more than 0.5 $cm^3$, no more than 0.25 $cm^3$, no more than 0.1 $cm^3$, no more than 0.05 $cm^3$, no more than 0.01 $cm^3$, or no more than 0.001 $cm^3$). In some embodiments, an authentication element has a largest surface and a surface area of the largest surface is no more than 50 $cm^2$ (e.g., no more than 40 $cm^2$, no more than 30 $cm^2$, no more than 20 $cm^2$, no more than 10 $cm^2$, no more than 5 $cm^2$, no more than 4 $cm^2$, no more than 3 $cm^2$, no more than 2 $cm^2$, no more than 1 $cm^2$, no more than 0.5 $cm^2$, or no more than 0.1 $cm^2$).

In some embodiments, an encoding portion is no more than 10 cm, no more than 5 cm, no more than 4 cm, no more than 3 cm, no more than 2 cm, no more than 1 cm, or no more than 0.5 cm in at least one dimension (e.g., a length dimension). In some embodiments, an encoding portion is at least 0.5 cm, at least 1 cm, at least 2 cm, at least 3 cm, at least 4 cm, or at least 5 cm in at least one dimension (e.g., a length dimension). In some embodiments, an encoding portion is no more than 1 cm, no more than 5 mm, no more than 4 mm, no more than 3 mm, no more than 2 mm, no more than 1 mm, or no more than 0.5 mm in at least one dimension (e.g., a width dimension or a diameter dimension). In some embodiments, an encoding portion is at least 0.5 mm, at least 1 mm, at least 2 mm, at least 3 mm, at least 4 mm, or at least 5 mm in at least one dimension (e.g., a width dimension or a diameter dimension). In some embodiments, an encoding portion has an aspect ratio (e.g., a length to width or length to diameter aspect ratio) of at least 2:1, at least 3:1, at least 4:1, at least 5:1, at least 10:1, or at least 20:1 and, optionally, no more than 100:1. In some embodiments, an encoding portion (e.g., encoding at least a portion of an authentication code in a barcode or a QR code) occupies an area of no more than 25 $cm^2$, no more than 20 $cm^2$, no more than 15 $cm^2$, no more than 10 $cm^2$, no more than 5 $cm^2$, or no more than 2 $cm^2$, or no more than 1 $cm^2$.

In some embodiments, an authentication element encodes information that is not an authentication code. An authentication element may encode such information using one or more encoding portions. An authentication element may encode information describing an object. For example, an authentication element may encode a serial number, a title, author/creator, creation date, dimensions of an object, or combination thereof.

In some embodiments, an authentication element includes one or more secondary authentication features (e.g., security feature(s)). For example, a label may include one or more secondary authentication features in addition to one or more radiopaque and/or sound attenuating encoding portions that are included in the authentication element. One or more encoding portions of an authentication element may be integrated with (e.g., embedded in, woven in, and/or laminated in) one or more secondary authentication features. For example, a radiopaque thread may be woven into a secondary authentication feature or radiopaque particles may be embedded and/or laminated into a secondary authentication feature, such as a security label or sticker. A secondary authentication feature, for example, may include a light shift feature, a holographic feature, a UV security feature, an infrared security feature, or a combination thereof. A secondary authentication feature may be visible to an unaided human, for example be a particular design and/or include optically variable ink. In some embodiments, at least a portion of particles of an authentication element are interspersed within a secondary authentication feature. One or more encoding portions of an authentication element may be covered by a secondary authentication feature. Because encoding portion(s) may be small and/or not visible to an unaided human (e.g., visibly transparent), such encoding portion(s) may be integrated with one or more secondary security features without interfering with performance of the one or more secondary security features (e.g., without obfuscating or otherwise altering visual appearance of the one or more secondary security features).

Authentication Codes

Authentication codes may be complex (e.g., long), for example when an object is high-value or simple (e.g., short), for example where authenticity concerns exist but complexity may incur prohibitive cost, such as with certain low-value objects, or where an encoding scheme limits the amount of information that can be reliably encoded. Additionally, form of an object may lend itself to using a particular complexity of authentication code. For example, QR codes or barcodes can generally encode larger amounts of information but are more amenable to being used with certain objects (e.g., that include a flat surface) than others (e.g., certain textiles). An authentication code may be unique such that it uniquely authenticates a single object. Such authentication codes may be useful for high-value objects, such as artwork. An organization (e.g., manufacturer or producer) or person (e.g., creator or owner) may use a same unique authentication code for multiple objects such that the authentication code uniquely identifies them. A manufacturer may use a same authentication code for a set of objects (e.g., a lot or batch) or for every object of a certain model.

An authentication code may be unique to, or uniquely identify, an object (e.g., be a serial number). An authentication code may be unique to or correspond to a type of object, for example may correspond to a model, a lot, or a batch. An authentication code may be unique to or correspond to a manufacturer of an object. An authentication code may be unique to or correspond to an organization (e.g., company or hospital) (e.g., manufacturer). An authentication code may identify a manufacturer and/or model of an object. An object may be identifiable based on an authentication code. In some embodiments where an authentication code is not unique to a particular object, an authentication code may be relatively short or simple, for example where it is used for multiple objects (e.g., each of a batch or lot or every one of a certain model).

An authentication code may be multiple digits. An authentication code may be multiple characters. An authentication code may include one or more letters and/or one or more numbers. An authentication code may be unique to an object (e.g., particular artwork) or to a type of object (e.g., a stock keeping unit (SKU)). An authentication code may be unique to a person (e.g., a creator of an object or an authenticator, such as an appraiser or owner). An authentication code may be unique to an organization (e.g., company) (e.g., a manufacturer). An authentication code may be an alphanumeric string, a PIN, a serial number, a passcode, a password, a passphrase, or a combination thereof. An authentication code may include, be derived from, or correspond to information describing an object (e.g., a title, author, creation date, or combination thereof). An encoding portion may encode a single character (e.g., letter or number) of an authentication code. Multiple encoding portions may together encode a single character (e.g., letter or number).

One or more encoding portions of an authentication element may be spatially arranged, spatially distributed, phased, positioned, oriented, shaped, sized, constructed to produce a responsive signal, or a combination thereof to encode one or more characters (e.g., letter(s) and/or number(s)) of an authentication code. For example, a spacing between adjacent encoding portions may correspond to a character (e.g., a 1 or a 0 in a binary authentication code or an authentication code encoded as a binary code). For example, a spacing between adjacent portions of one or more braided elements (e.g., between adjacent braided elements or portions thereof) may encode at least a portion of an authentication code. One or more encoding portions may be phased (e.g., relative to each other) to encode at least a portion of an authentication code, for example a phase difference between portions of an encoding portion and/or between different encoding portions. Such phasing may be applied using, for example, spiraled elements (e.g., braided elements). An encoding portion may be constructed to produce a responsive signal in that the responsive signal has a specific wavelength (e.g., due to down-conversion and/or fluorescence and/or amount of attenuation) and/or intensity (e.g., based on radiodensity of the encoding portion and/or amount of attenuation). An encoding portion may produce a responsive signal by, for example, absorption, attenuation, absorption and emission (e.g., down-conversion) (e.g., of a different characteristic particle or signal from an excitation particle or signal, for example fluorescence), reflection, refraction, or a combination thereof. At least a portion of an authentication code may be encoded by a spatial distribution, position, and/or size of one or more encoding portions of an authentication element. An encoding portion may encode at least a portion of a character of more than one authentication code. For example, a size of an encoding portion (e.g., particle) may correspond to a first authentication code and orientation (or shape or spacing) of the encoding portion may correspond to a second authentication code. As another example, a size of an encoding portion (e.g., particle) may encode a first portion of an authentication code and orientation (or shape or spacing) of the encoding portion may encode a second portion of the authentication code.

An authentication code may be encoded using an ASCII code. An authentication code may be at least 10 (e.g., at least 20, at least 30, or at least 50) characters long. An authentication code may be at least 64 bits (e.g., at least 128 bits, at least 256 bits, or at least 512 bits). An authentication element may encode at least a portion of an authentication code in a base that is not base 10. For example, an authentication element may encode at least a portion of an authentication code in binary (base 2) or in hexadecimal. An authentication code may be encoded in binary using, for example, two types of encoding portions having different radiodensities. An authentication element may encode at least a portion of an authentication code not in plaintext. An authentication code may be encoded as a readable pattern (e.g., a QR code or barcode). An authentication element may encode at least a portion of an authentication code as a QR code or barcode.

An authentication element may encode at least a portion of an authentication code in an encrypted manner. A one-way cryptographic cypher may be used to encode at least a portion of an authentication code in an encrypted manner. For example, at least a portion of an authentication code may be encoded using a secure hashing algorithm (SHA) encryption (e.g., SHA-256) or pretty good privacy (PGP) encryption. Thus, in some embodiments, verification of an object with an associated authentication element may include a person with knowledge of a correct authentication code producing a SHA encrypted version of the authentication code and comparing that to information read from the authentication element.

In some embodiments, where a PGP encryption scheme is used, at least a portion of an authentication code may be encoded in an encrypted manner with a public key and then only those with a corresponding private key can unencrypt it to verify authenticity using the authentication code itself. In some embodiments, a version of a public key encrypted at least a portion of an authentication code may be made publicly accessible. A public key encrypted at least a portion of an authentication code read from an authentication element may be compared to the publicly available version as an intermediate verification of authenticity. This can be performed without compromising the underlying authentication code which can only be unencrypted with the private key (e.g., possessed by one or more parties related to the document). Thus, those with the private key can make a final verification of authenticity (e.g., after accessing the related object). For example, a document sender (e.g., one party to a contract) may use the public key of a document receiver (e.g., another party to a contract) to encrypt an authentication code that is then encoded in an authentication element physically associated with the document before the document is sealed in a security envelope and also given to a logistics company. The logistics company can then use the public key encrypted authentication code to track the document in an authenticated manner without accessing the envelope (intermediate authentication), in this case even though it does not have access to the public key, and the document receiver can verify the ultimate authenticity by confirming the authentication code encoded on the document as received is correct using its private key. A cipher key (e.g., public or private key) for an authentication code that is encoded in an authentication element physically associated with an object in an encrypted manner may be provided separately, for example on documentation or an invoice for the object (e.g., as a watermark or plaintext print) or a physical or electronic file (e.g., as metadata) corresponding to the object, or stored in a registry in which the object is registered.

By encoding authentication codes in an encrypted manner, counterfeiters can be further deterred because they will not know the ultimate authentication code even if they are able to read one or more authentication elements. Encryption details can be changed, for example, between lots or batches of objects that would render old authentication elements useless without needing to change authentication codes. So long as appropriate entities are kept apprised of current encryption details (e.g., keys), the same authentication codes can be reused while staying ahead of counterfeiters.

An authentication code may be a particular arrangement (e.g., pattern) of one or more encoding portions. Thus, an authentication code need not necessarily correspond to a set (e.g., string) of characters (e.g., a string of letters and/or numbers). For example, an authentication code may be a particular spatial arrangement, spatial distribution, phase, position, orientation, size, construction to produce a responsive signal, or combination thereof of one or more encoding portions. For example, a person, organization, or object may use an authentication code that is a particular spiral arrangement (e.g., pattern) (e.g., that produces a particular signal in response to x-rays) and an authentication element that includes one or more encoding portions with characteristics that correspond to the spiral arrangement (e.g., when x-rays are applied) therefore encodes the authentication code. Such a spiral arrangement may be based on phase, for example such that one or more encoding portions are phased relative to each other to encode at least a portion of an authentication code. In some embodiments, for example where an authentication code is a string (e.g., of letter(s) and/or number(s)), a mapping is used to correspond arrangements (e.g., patterns) to a character set used for the string.

As another example, a set of ordered spacings of encoding portions or a set of ordered spacings of a single encoding portion may be used as an authentication code without the set corresponding to certain characters (e.g., letter(s) or number(s)). For example, a Morse code type arrangement of particles or clusters of particles or of spiral spacing and/or phase in a fiber, thread, a string, a cord, or filament, may be used as an authentication code whether or not the arrangement actually corresponds to a password, passcode, or PIN represented in Morse code. In some embodiments, an interpretation threshold may be applied when determining at least a portion of an authentication code when reading an authentication element. In some embodiments, a mixed-integer programming (MIP) algorithm can be applied to threshold differences in radiodensity. In some embodiments, a spacing between adjacent portions of an encoding portion or adjacent portions of two different encoding portions above a first threshold may be interpreted differently than a spacing below a second threshold. The first threshold need not be the same as the second threshold. In some embodiments, an authentication code corresponds to a certain arrangement (e.g., pattern) of above threshold and below threshold spacings.

In some embodiments, different encoding portions with different radiodensities may be used as an arrangement (e.g., pattern) that encodes at least a portion of an authentication code. In some embodiments, an arrangement may be formed by a particular (e.g., ordered) sequence of one or more encoding portions different radiodensities. For example, a particular sequence of one or more particles/cluster of particles or one or more filaments (e.g., in a spiral) may be used as an authentication code (or portion thereof). For example, a certain alternation of two or more (e.g., three or four) encoding portion(s) of different radiodensities may be used, like an AB-type sequence (e.g., AABABBABB) or ABC-type sequence (e.g., ABBCBAAC).

In some embodiments, a variable radiodensity may be used as an arrangement (e.g., pattern) that is an authentication code. For example, a length over the variation occurs and/or a function of intensity over distance may define an arrangement that is an authentication code. In some embodiments, such an authentication code may be distinguishable as authentic or inauthentic based on whether radiodensity is too high or too low at one or more given points along an encoding portion of an authentication element that encodes the authentication code. In some embodiments, an arrangement that is an authentication code is a QR code or barcode. For example, in some embodiments, a QR code or barcode itself is an authentication code.

In some embodiments, radiodensity may be used as part of encoding an authentication code. For example, radiodensity being too high or too low (e.g., as observed in a human readable image formed by applying appropriate waves to an authentication element that encodes the authentication code) may be an indication that an object is inauthentic and/or an authentication element is fake. In this way, particular material selection, which may be hard to determine from examination of an object, may play a role in producing secure. For example, an authorized person may know the appropriate material to use for an encoding portion of an authentication element such that it appears to be of correct radiodensity when verifying authenticity whereas a potential counterfeiter does not such that, even if the potential counterfeiter gains access to an authentication code itself, he or she could not produce a suitable counterfeit. In some embodiments, an encoding of an authentication code may be agnostic to radiodensity so long as an arrangement is correct, for example as long the correct spacing, shape, and/or size of encoding portions is correct.

In some embodiments, an image (e.g., a human-readable image) of an authentication element is an authentication code encoded by the authentication element against which other images can be compared for authentication purposes. Thus, an authentication code may be a fingerprint (e.g., a radiological fingerprint) that can be compared against for future authentication purposes. A fingerprint may be based on using one or more predetermined conditions (e.g., one or more predetermined imaging conditions, such as x-ray machine setting(s)). A registry may include one or more registered fingerprints. A fingerprint of an authentication element may be registered before and/or after the authentication element has been physically associated with an object. In some embodiments, a registration of a fingerprint may only be made under certain conditions, for example if a registrant pays a fee to register his/her object (e.g., artwork).

Additional Security Features

Multiple authentication elements may also provide additional (or alternative) (e.g., secondary) security to an object beyond the ability to verify the object using one or more authentication codes. In some embodiments, multiple authentication elements have an arrangement (e.g., spatial distribution and/or orientation) that corresponds to an object being authentic (e.g., is verifiable). For example, an arrangement may be spatial distribution of multiple authentication elements within and/or on (e.g., a surface of) an object. An arrangement may be relative to each other and/or relative to an object, such as a fixed point of the object, a corner, an edge, or a combination thereof. For example, an arrangement may correspond to a verifiable pattern. Therefore, it may be possible to determine that an object is not authentic based on how multiple authentication elements are arranged, whether or not the authentication elements encode at least a portion of one or more correct authentication codes that would authenticate the object. In this way, even if an authentication code is compromised, a counterfeiter would still need to know the correct arrangement for multiple authentication elements to create a forgery of the object. Aspects of an arrangement of multiple authentication elements may be irrelevant to authenticity, for example location may matter but orientation does not, or relative orientation and absolute position may matter but relative position and absolute orientation may not. Different arrangements of multiple authentication elements may be used to ensure authenticity for different objects (e.g., different copies of a same type of object) even if an authentication code is reused. Such complex schemes can further reduce the ability of a counterfeiter to produce counterfeit objects.

Similarly, a single authentication element may also provide additional (or alternative) (e.g., secondary) security to an object beyond the ability to verify the object using one or more authentication codes. In some embodiments, has an arrangement (e.g., spatial distribution and/or orientation) that corresponds to an object being authentic (e.g., is verifiable). The arrangement may relative to an object, such as a fixed point of the object, a corner, an edge, or a combination thereof. Therefore, it may be possible to determine that an object is not authentic based on how a single authentication element is arranged relative to an object, whether or not the authentication element encodes at least a portion of one or more correct authentication codes that would authenticate the object. In this way, even if an authentication code is compromised, a counterfeiter would still need to know the correct arrangement for an authentication element relative to an object to create a forgery of the object. Aspects of an arrangement of an authentication element may be irrelevant to authenticity, for example location may matter but orientation does not. Different arrangements of a single authentication element may be used to ensure authenticity for different objects (e.g., different copies of a same type of object) even if an authentication code is reused. Such complex schemes can further reduce the ability of a counterfeiter to produce counterfeit objects, even when using only a single authentication element.

Security schemes using multiple authentication elements can also provide a first, fast means to determine authenticity. For example, in some embodiments, if multiple authentication elements are not disposed in a correct absolute and/or relative arrangement, then an associated object is not authentic. Therefore, simply checking the arrangement first may be sufficient to determine a lack of authenticity without needing to actually read the authentication elements. Multiple authentication elements that encode only a rudimentary authentication code (e.g., a 1 or a 0) may be used in an arrangement (e.g., relative to each other or relative to an object) to provide simple security to an object. In some embodiments, multiple radiopaque elements are physically associated with (e.g., disposed on or in, embedded in, adhered to, integrated with) an object in an arrangement that corresponds to an object being authentic (e.g., is verifiable); such radiopaque elements may be constructed like an authentication element or encoding portion disclosed herein but need not be an authentication element or encoding portion (e.g., there may be no authentication code encoded). Nonetheless, arrangement of such simple authentication elements may not provide sufficient security, for example for high-value objects. Generally, in many applications, authentication elements that encode at least a portion of one or more complex authentication codes are preferred for additional security.

One or more additional security (e.g., error detection) techniques may be applied in connection with an authentication element that encodes at least a portion of an authentication code. Examples of additional security (e.g., error detection) techniques that may be used include parity bit, checksum, and check digit. For example, at least a portion of an authentication code may include a parity bit or a check digit. As another example, in some embodiments, at least a portion of an authentication code read from an authentication element may be verified as authentic or not based on a checksum, a parity bit, or a check digit. As another example, at least a portion of an authentication code may be verified, at least in part, by a checksum (e.g., of two or more characters in the at least a portion of an authentication code). An authentication element may encode at least a portion of an authentication code including a check digit and/or parity bit thereof. An authentication element may encode (i) at least a portion of an authentication code and (ii) a check digit or parity bit. In some embodiments, one or more additional security techniques may be used whether an authentication code is characters (e.g., alphanumeric characters) or a pattern.

In some embodiments, radiodensity and/or sound wave attenuation is used as a type of parity bit and/or check digit. For example, in some embodiments, an authentication element encodes at least a portion of an authentication code as a QR code or barcode where a portion of the QR code or barcode (e.g., one or more bits of the QR code or one or more bars of the barcode) has a certain radiodensity and/or sound wave attenuation (e.g., higher or lower than one or more other bits of the QR code or one or more other bars of the barcode) that allows verification of authenticity of the at least a portion of the authentication code. In some embodiments, a portion that has a certain radiodensity is a particular predetermined portion (e.g., always a certain bit or bits of a QR code or always certain bar(s) of a barcode). In some embodiments, a portion that has a certain radiodensity is a portion selected by a person or organization to whom an authentication code pertains (e.g., is only known to that person or organization). In some embodiments, if one or more additional security techniques are used with an authentication element that encodes at least a portion of an authentication code, it can be determined that an object or label physically associated with the authentication element is not authentic (e.g., is counterfeit) even if the authentication code itself, determined at least in part by reading the authentication element, appears authentic. For example, an authentication code read from an authentication element (e.g., a QR code) may appear authentic but radiodensity of a certain portion of the authentication element (e.g., one or more certain bits of the QR code) is not correct and therefore an object physically associated with the authentication element can be determined to be counterfeit.

Using one or more such additional security techniques provides an additional layer of security in that even if a potential counterfeiter comes into possession of an authentication code, the counterfeiter may not know that one or more additional security techniques are being employed. Similarly, a counterfeiter that comes into possession of a genuine object for which a forgery or counterfeit copy is intended to be made may identify an authentication element is present and be able to copy the authentication element in the attempted forgery or counterfeit copy but not know or appreciate by simple inspection (e.g., with x-rays, radio waves, or sound waves) that an additional security technique is being employed. For example, the counterfeiter may not know the correct parity bit, check digit, or check sum. The counterfeiter may therefore fail to incorporate that into the attempted forgery or counterfeit copy, such that security of the original is maintained. Similarly, a counterfeiter may try to incorporate an authentication element with an object that encodes at least a portion of a fake authentication code where the fake authentication code does not include the correct parity bit, check digit, or checksum for that object or type of object such that it can be determined that the forged or counterfeit object(s) are detectable as not authentic.

pH Sensitive Authentication Elements

In some embodiments, an authentication element is structured to be readable to indicate a pH of a local environment. For example, an authentication element may be coated with a pH sensitive coating that causes a change in state of the authentication element upon a change in local pH near the authentication element. An authentication element may be pH sensitive. In some embodiments, a conformational state of an authentication element (e.g., size, shape, and/or spacing) may change upon change of local pH. In some embodiments, spacing of one or more encoding portions of an authentication element may change in response to changes in local pH. In some embodiments, radial dimension of encoding portions of the authentication element may change in response to changes in local pH. In some embodiments, an authentication may be used to determine safety or quality of a food product in addition to or alternatively to authentication of the food product. Determining safety may include determining a relative pH relative to a baseline, for example a baseline that corresponds to a safe or acceptable food product (e.g., the food product is safe to be consumed) (e.g., quality of the food meets desired standards). Because an authentication element may be able to be read without being visible, a pH sensitive authentication element may be able to be covered by food or beverage or packaging for the food or beverage and still serve its intended function. An authentication element may be disposed on an interior of food or beverage packaging such that it is in contact with a local environment for the food or beverage (e.g., in contact with the food or beverage) to be able to usefully indicate pH and therefore food safety. In some embodiments, a pH sensitive element is not also an authentication element. Such a pH sensitive element may include one or more pH sensitive subelements analogous to encoding portion(s) disclosed herein (e.g., previously in this paragraph) notwithstanding that no portion of an authentication code is encoded thereby.

In some embodiments, an authentication element may be used to indicate wine quality. When wine is exposed to oxygen for a long time, the alcohol within the wine changes into acetic acid, also known as wine turning, and therefore, higher acidity (i.e., lower pH level) may be an indicator of a spoiled wine. An authentication element that is pH sensitive may be used to determine a relative pH level of a bottle of wine. For example, an authentication element may be embedded into or integrated with an interior surface of a bottle of wine. For example, an authentication element may be affixed or adhered to an interior surface of a bottle of wine. For example, an authentication element may be embedded into or integrated with a cork that is used to seal a bottle of wine. For example, an authentication element may be affixed or adhered to a cork that is used to seal a bottle of wine. When a bottle of wine is prepared, an authentication element indicates a baseline pH level that corresponds to desired wine quality. When wine turns (e.g., changes into acetic acid), an authentication element changes to indicate a lower pH level relative to the baseline. For example, an authentication element may indicate a wine has turned while the bottle of wine is sealed. Thus, such an authentication element may be able to be read without accessing the wine.

In some embodiments, an authentication element may be used to indicate safety of mayonnaise. Higher acidity (i.e., lower pH level) of mayonnaise is associated with spoilage (e.g., mayonnaise is not safe to be consumed). An authentication element that is pH sensitive may be used to determine a relative pH level of mayonnaise. For example, an authentication element may be embedded into or integrated with an interior surface of a mayonnaise container, such as, for example, a jar, a bottle, a packet. For example, an authentication element may be affixed or adhered to an interior surface of a mayonnaise container. For example, an authentication element may be embedded into or integrated with a lid of a mayonnaise container. For example, an authentication element may be affixed or adhered to a lid of a mayonnaise container. When mayonnaise is packaged, an authentication element indicates a baseline pH level that corresponds to a safe-to-consume mayonnaise. When mayonnaise spoils, an authentication element changes to indicate a lower pH level relative to the baseline. For example, an authentication element may indicate mayonnaise is spoiled while the packaging is intact.

Verification Methods

Authentication elements disclosed herein may be used in methods of verifying authenticity of one or more objects. In some embodiments, a method includes receiving an authentication code for an object that has been obtained, at least in part, by reading a passive authentication element physically associated with the object that encodes at least a portion of the authentication code. For example, reading an authentication element may produce an authentication code. In some embodiments, a method includes verifying authenticity of an object using a received authentication code, for example solely based on the authentication code or based further on other information and/or observation(s) (e.g., nature of the object and/or source of the object) (e.g., location and/or position of the authentication element).

In some embodiments, a method includes receiving information potentially corresponding to an authentication code for an object. For example, at least a portion of the information may be received from an (e.g., passive) authentication element physically associated with (e.g., included in) the object (e.g., by reading the authentication element). The method may further include determining whether the information sufficiently corresponds to the authentication code. For example, it may be determined that the information sufficiently corresponds to the authentication code because the information at least approximates (e.g., matches) the authentication code. Alternatively or additionally, it may be determined that the information sufficiently corresponds to the authentication code because the information could not correspond to any other authentication code. Alternatively or additionally, it may be determined that the information sufficiently corresponds to the authentication code because the information could only correspond to one authentication code. In some embodiments, the method includes determining that the information corresponds to the authentication code for the object. In some embodiments, the method includes determining that the information does not correspond to the authentication code for the object (e.g., corresponds to an authentication code for a different object. The object may be authenticated based on the determination, for example solely based on the authentication code or based further on other information and/or observation(s) (e.g., nature of the object and/or source of the object) (e.g., location and/or position of the authentication element). If it is determined that the information does not correspond to the authentication code, it may be concluded that the object is counterfeit.

In some embodiments, a method includes obtaining an authentication code, for example by reading an authentication element. In some embodiments, a portion of an authentication code is obtained by reading an authentication element and another portion of the authentication code is obtained elsewhere, as described previously herein. In some embodiments, reading an authentication element includes applying x-rays, radio waves (e.g., in combination with a magnetic field), or sound waves to the authentication element and receiving a signal in response. For example, an image may be formed using applied x-rays, radio waves, or sound waves. In some embodiments, reading an authentication element includes forming a human readable image (e.g., an x-ray image, a CT image, an ultrasound image, or an MRI image). A human readable image is interpretable by a human, whether or not the image is ultimately processed or interpreted by a human or a computer. Thus, in some embodiments, signal received in response to applied waves may be translated into at least a portion of an authentication code.

As described above, location and/or position of one or more authentication elements, relative to each other and/or relative to an object, may be used as a secondary security measure. Accordingly, in some embodiments, a method includes determining a location and/or orientation of an authentication element relative to (e.g., on or in) an object. In some embodiments, a method includes determining a location and/or orientation of two or more authentication elements relative to (e.g., on or in) each other. Authenticity of an object may be determined based at least in part on location and/or orientation of one or more authentication elements.

In some embodiments, a method is performed in-line. In some embodiments, authenticity of one or more objects is determined (e.g., verified) in-line. In some embodiments, a method is performed during a logistics process, for example during a sorting process (e.g., a document or postal sorting process), a package routing process, a package sorting process, a shipping process, a warehouse process, and/or a distribution process. In some embodiments, authenticity of one or more objects is determined (e.g., verified) during a logistics process, for example during a sorting process (e.g., a document or postal sorting process), a package routing process, a package sorting process, a shipping process, a warehouse process, and/or a distribution process. In some embodiments, authenticity of one or more objects is determined (e.g., verified) while an outer container, in which the one or more objects are disposed inside, is being transferred (e.g., using one or more conveyor belts). In some embodiments, a method is performed while an outer container, in which the one or more objects are disposed inside, is being transferred (e.g., using one or more conveyor belts). In some embodiments, authenticity of an object is determined (e.g., verified) while the object is being transferred (e.g., using one or more conveyor belts). In some embodiments, a method is performed while an object is being transferred (e.g., using one or more conveyor belts).

A method of verifying authenticity of an object may be performed or caused to be performed by, for example, an appraiser for the object, an employee of an auction house, a dealer for the object, a seller for the object, a prospective buyer of the object, a creator of an object, or an owner of the object.

In some embodiments, a method registers a fingerprint of an object. A method may include receiving an object physically associated with an authentication element, obtaining a fingerprint of the authentication element, and registering the fingerprint with the object in a registry. In some embodiments, a fingerprint is obtained by reading an authentication element using x-rays, radio waves (e.g., in combination with a magnetic field), or sound waves, for example to form a human-readable image such as a radiological image. A method of registering may be performed or caused to be performed by an appraiser for the object, an employee of an auction house, a dealer for the object, an owner of the object, or a creator of the object.

In some embodiments, a method verifies authenticity of an object using fingerprints. For example, comparing a fingerprint stored in a registry, which is assured to be authentic, against a comparative fingerprint obtained from an object, to determine whether they sufficiently correspond (e.g., match). A method may include obtaining a comparative fingerprint for an authentication element physically associated with an object; receiving, from a registry, a copy of an authentic fingerprint for the object, wherein the object has been registered with the registry; and verifying authenticity of the object by, at least in part, comparing the comparative fingerprint to the authentic fingerprint. In some embodiments, obtaining a comparative fingerprint includes reading an authentication element using x-rays, radio waves (e.g., in combination with a magnetic field), or sound waves. Such a method of verifying may be performed or caused to be performed by an appraiser for the object, an employee of an auction house, a dealer for the object, an owner of the object, a prospective buyer, or a seller of the object.

In some embodiments, a fingerprint is a radiological fingerprint. In some embodiments, a fingerprint is an image. In some embodiments, an authentication element includes one more encoding portions and the one or more encoding portions are discernable in a fingerprint. In some embodiments, an authentication code is determinable from a fingerprint.

In some embodiments, an object being registered or authenticated using a registry is an artwork. In some embodiments, the artwork is a completed artwork. In some embodiments, obtaining a fingerprint includes identifying an orientation mark that identifies an authentication element of which the fingerprint will be taken. In some embodiments, an authentication element is unique to an owner or creator of the object.

In some embodiments, a registry is owned and/or maintained by an auction house, an appraisal firm, a gallery, or a dealer.

In some embodiments, an authentication element can only be successfully read to determine at least a portion of an authentication code at a predetermined orientation (e.g., angle), within a predetermined range of orientations (e.g., angles), or at one or more of a set of predetermined orientations (e.g., angles). Knowledge of which predetermined orientation or orientations can be used can therefore act as a secondary security feature. In some embodiments, a first portion of at least a portion of an authentication code encoded by an authentication element can be successfully read at a first predetermined orientation (e.g., angle), within a first predetermined range of orientations (e.g., angles), or at a first one or more of a set of predetermined orientations (e.g., angles) and a second portion of the at least a portion of the authentication code can be successfully read at a second predetermined orientation (e.g., angle), within a second predetermined range of orientations (e.g., angles), or at a second one or more of a set of predetermined orientations (e.g., angles). In some embodiments, an authentication element is readable at a first orientation and at a second orientation but only one of the two orientations corresponds to the at least a portion of an authentication code that is encoded by the authentication element. For example, a spatial arrangement and/or distribution and/or spacing of one or more encoding portions of an authentication element may appear one way at a first orientation and a different way at a second orientation, where only one of the two ways actually encodes at least a portion of an authentication code. Such embodiments may make fabricating counterfeit authentication elements more difficult, for example because attempted counterfeiters will not know which orientation or orientations matter. In some embodiments, both orientations encode separate portions of at least a portion of an authentication code.

Many objects have well defined shapes that lend themselves to easily being oriented correctly relative to a source and/or detector (e.g., for a non-visible imaging modality) (e.g., of an x-ray machine, a CT machine, a MRI machine, or an ultrasound machine). For example, packaged objects that are in boxes are easy to orient correctly. It may be easier, for example when working in-line, to use a machine that has an orientable source and/or detector in order to achieve a desired orientation between an authentication element and a source and/or detector. In some embodiments, a source and/or detector are rotatable about an authentication element (e.g., about an object physically associated with the authentication element) and may be so rotated in order to read the authentication element. In some embodiments, an object physically associated with an authentication element is rotated relative to a source and/or detector in order to read the authentication element.

Contained Objects and Associated Methods of Authentication

An object (e.g., physically associated with an authentication element) may be removably disposed in an outer container. An object may be referred to as an "inner object" when it is in an outer container and/or still after it has been removed from the outer container. That is, an object need not be in an outer container at a given instant to be referred to as an inner object. An object may be removably disposed inside of an outer container. An object may be disposed entirely or only partially in (e.g., inside of) an outer container. An object may be removably enclosed in an outer container. An outer container may be enclosed (e.g., with one or more objects inside). An outer container may be opaque. An object may be disposed inside of an opaque outer container (e.g., such that the object is not visible unless the outer container is opened). An outer container may be opaque. An outer container may be a box, such as a cardboard box, or an envelope. An outer container may be packaging (e.g., for packaged objects) (e.g., a box or shrink wrap). An outer container may be disposable. An outer container may be secure, for example secured by a seal or lock. An outer container may orient and/or position one or more objects physically associated with authentication element(s) such that the authentication element(s) may be properly read. In some embodiments, an authentication element physically associated with an object disposed inside an outer container is readable without accessing inside of the outer container, such as without opening and/or unsecuring (e.g., unsealing) the outer container.

An outer container may be secured with a tamper-proof mechanism (e.g., a seal or lock). An outer container may be secured with a (e.g., tamper-proof) mechanism that itself can be authenticated. A tamper-proof mechanism may be structured to indicate tampering upon exposure to one or more particular chemical species, for example upon exposure to oxygen and/or humidity. A tamper-proof mechanism may be chemically sensitive. Likewise, a tamper-proof mechanism may be structured to indicate tampering upon exposure to a specific temperature or range of temperature or to temperature outside of a specific range. A tamper-proof mechanism may be thermosensitive. Similarly, a tamper-proof mechanism may be structured to indicate tampering upon exposure to certain amount of light and/or to one or more wavelengths of light (e.g., within the visible light spectrum). A tamper-proof mechanism may be photosensitive. A tamper-proof mechanism may be chemically sensitive, physically sensitive, thermosensitive, photosensitive, or a combination thereof. A tamper-proof mechanism may be physically sensitive, for example such that the tamper-proof mechanism physically degrades if the mechanism is tampered with.

One or more objects, for example each being physically associated with an authentication element, may be removably disposed in (e.g., inside of) an outer container. For example, the one or more objects may be a batch or a lot of objects. For example, an outer container may be packaging for shipping and/or storage purposes, such as an outer box in which products (objects) are stored in a warehouse or shipped by freight. In some embodiments, objects are ordered in an outer container, for example ordered by serial number. Each object in a set contained in an outer container (e.g., enclosed outer container) may be physically associated with an authentication element that encodes at least a portion of a unique authentication code (e.g., corresponding to a unique serial number). In some embodiments, objects are layered in an outer container, for example stacked on top of each other. In some embodiments, objects are flat, for example pieces of paper (e.g., a document or currency notes). In some embodiments, an authentication element is flat. Thus, systems and methods disclosed herein can be used to track and/or authenticate objects while in their natural packaging during shipping and/or storage, whether in a warehouse, a truck, a container ship, a shipyard, a shipping facility, or in transit.

In some embodiments, an object physically associated with an authentication element is disposed in an outer container where distinct portions of the authentication element are disposed in or on different portions of the object and the authentication element is readable (e.g., with x-rays, radio waves, and/or sound waves) based on a manner in which the object is distorted. For example, the authentication element may be readable based on how the object is folded. The outer container may be enclosed, such as an envelope (e.g., a security envelope). The outer container may be sealed or otherwise secured, for example with a tamper-proof mechanism (e.g., seal) to maintain security of the object. The object may be a piece of paper. The authentication element may encode at least a portion of an authentication code two-dimensionally, for example as a QR code, or one-dimensionally, for example as a barcode, where the QR code or barcode is only readable as such while the object is in the outer container when the object is folded. For example, a piece of paper could have different portions of a radiopaque QR code or barcode printed (e.g., inkjet printed) onto different corners or regions along an edge of the paper such that when the paper is folded, for example in a bi-fold or tri-fold, the authentication element is readable, for example using an x-ray machine, to determine at least a portion of an authentication code without opening the envelope. By breaking up an authentication element into distinct spatially separate portions that are only readable with a certain folding, it may not be apparent what function the portions serve even if the authentication element is visible to a human viewer. In some embodiments, an authentication element is readable based on an object having a particular arrangement within an outer container. In some embodiments, an authentication element is readable only if an object has a particular arrangement within an outer container. Such systems may be particularly useful for currency notes and/or other sensitive and/or high value documents.

In some embodiments, a plurality of objects are removably disposed inside an outer container. Each of the objects may be associated with an authentication element encoding at least a portion of an authentication code (e.g., an entire authentication code). In some embodiments, the authentication element can be read (e.g., to determine the authentication code) without accessing inside of the outer container. In some embodiments, the authentication code is a unique authentication code for the object. In some embodiments, the authentication code is a common authentication code used all of the objects. In some embodiments, the authentication element of the objects together encode an entirety of the authentication code. In some embodiments, the authentication element of the objects together encode an entirety of the authentication code such that a viewer can determine whether a complete set of objects is present inside of the container. In some embodiments, for each of the objects, the authentication element encodes at least a portion of (e.g., an entire) distinct authentication code. In some embodiments, each of the multiple authentication elements encodes an entire authentication code and the entire authentication code is the same for each of the multiple authentication elements. In some embodiments, the multiple authentication elements are associated with (e.g., disposed in and/or on) different portions of the object.

In some embodiments, a system includes an outer container and objects and a composite authentication element physically associated with the objects. Each object may be physically associated with a different (e.g., distinct) portion of the composite authentication element. In some embodiments, a composite authentication element physically associated with objects is readable without accessing an outer container. In some embodiments, objects are not authenticatable using a composite authentication element unless an entire set of objects is present, in some embodiments only when in an ordered manner. For example, different pages (e.g., pieces of paper) for a multi-page document may each be physically associated with a different (e.g., distinct) portion of a composite authentication element such that the composite authentication element is only readable if the entire document is present. Even so, it may be that the pages must be properly ordered. An ordering may refer to page order and/or with correct orientation and/or position of objects (e.g., pages). For example, the correct corners of pages may need to be aligned in order for a composite authentication element to be readable, for example if different portions of a composite authentication element are disposed on or in (e.g., printed on) a particular corner of pages of a document (e.g., each page of a document).

Distinct portions of a composite authentication element may be disposed on (e.g., printed onto, embedded in, integrated with, or woven into) different objects such that the distinction portions form at least a portion of a composite authentication element. In some embodiments, each object contained in an outer container (e.g., piece of paper in a multi-page document) includes a portion of a composite authentication element. In some embodiments, only a subset of objects contained in an outer container (e.g., every other page) includes a portion of a composite authentication element. In some embodiments, a composite authentication element is readable based on objects having a particular arrangement within an outer container. In some embodiments, a composite authentication element is readable only if objects have a particular arrangement within an outer container. In some embodiments, objects are arranged in a flat manner. In some embodiments, a composite authentication element is flat. In some embodiments, a composite authentication element is invisible to an unaided human viewer.

A composite authentication element may encode at least a portion of an authentication code two-dimensionally, for example as a QR code. In certain imaging modalities, such as x-ray imaging, even though a composite authentication element (e.g., QR code or barcode) is present in three dimensions (e.g., with different portions on different objects, such as sheets of paper, in a stack), the composite authentication element is readable as a two-dimensional element. That is, in some embodiments, an imaging modality acts to effectively "flatten" a composite authentication element when it is read. For example, a composite authentication element may appear two-dimensionally (e.g., as a two-dimensional feature) in an image (e.g., a human-readable image) formed when reading the composite authentication element. In some embodiments, different portions of a QR code or barcode is only readable as such while the object is in the outer container when the object is folded. For example, pieces of paper could have different portions of a radiopaque QR code or barcode printed (e.g., inkjet printed) onto different corners or regions along an edge of the papers such that, when the papers are stacked, a composite authentication element is readable, for example using an x-ray machine, to determine at least a portion of an authentication code without opening an envelope in which the papers are contained (e.g., secured). In some embodiments, objects are arranged in an outer container such that a composite authentication element read from a predetermined angle (e.g., within a predetermined range of acceptable angles). For example, in some embodiments, a QR code or barcode may only be readable when viewed from an angle that is substantially front facing (e.g., not side facing). By breaking up a composite authentication element into distinct portions that are only readable when each of a set of objects is present (e.g., in a correct position and/or orientation), it may not be apparent what function the portions serve even if the authentication element is visible to a human viewer. Such systems may be particularly useful for currency notes and/or other sensitive and/or high value documents.

In some embodiments, a composite authentication element encodes at least a portion of a composite authentication code two-dimensionally, for example as a QR code. In some embodiments, a composite authentication element encodes at least a portion of a composite authentication code one-dimensionally, for example as a barcode. (A barcode may be present as a two-dimensional element but generally only one-dimension of spacing encodes information in a barcode.) In some embodiments, a composite authentication element encodes at least a portion of a composite authentication code three-dimensionally. For example, an arrangement of encoding portions of composite authentication element in three dimensions may correspond to at least a portion of an authentication code. In some embodiments, a composite authentication element that encodes at least a portion of an authentication code may be read using perpendicular probes (x-rays).

In some embodiments, an outer container may be constructed to properly orient and/or position objects to promote or ensure proper alignment, for example due to its size and/or shape. For example, an envelope may be sized and shaped to ensure that pages in a multi-page document are flat and properly aligned (e.g., matching corners), requiring at most that pages are inserted in the correct manner (e.g., each page facing the same way). In some embodiments, for example where the different portion of a composite authentication element for an object is disposed in multiple locations on the object, it may not be necessary for objects to be inserted in a correct manner in order to read the composite authentication element, only that the objects are properly oriented and/or positioned relative to each other. In some embodiments, some page shift can be tolerated (e.g., relative to size of QR code or barcode pixels) as a mixed-integer programming (MIP) algorithm can be applied to each pixel in an image of an authentication element to render at least a portion of an authentication code encoded by the authentication element as interpretable (e.g., to render a QR code processable).

Methods for authenticating objects disclosed elsewhere herein may be applied to authenticating one or more objects disposed in an outer container as now discussed. Because embodiments of authentication elements disclosed herein are readable with non-visible wavelengths, it is possible to authenticate objects through an outer container, even if the outer container is opaque. In various embodiments, x-rays, radio waves, and sound waves can be used to that effect. In some embodiments, an authentication element physically associated with an object may be read through an outer container.

In some embodiments, a method of authenticating objects includes reading a composite authentication element physically associated with objects removably disposed in (e.g., inside) an outer container through the outer container, for example using x-rays, radio waves (e.g., in combination with a magnetic field), or sound waves. The composite authentication element may be read without accessing the outer container. In some embodiments, a method of authenticating objects includes reading a composite authentication element physically associated with objects removably disposed in (e.g., inside) an outer container without accessing the outer container, for example using x-rays, radio waves (e.g., in combination with a magnetic field), or sound waves. Each of the objects in an outer container may be physically associated with a portion (e.g., a distinct portion) of the composite authentication element. The method may include verifying authenticity of the objects based on an authentication code, at least a portion of which is encoded by the composite authentication element. In some embodiments, reading the composite authentication element allows there to be a determination that no object is missing (e.g., from the outer container) because if any object were missing, a portion of the composite authentication element would be missing and therefore it could not be read. In some embodiments, one or more of the objects are removed after determining that the objects are authentic and/or that no object is missing. Removing the one or more objects may include breaking a tamper-proof mechanism that secures the outer container. Removing the one or more objects may include compromising security of the outer container.

In some embodiments, a method of authenticating an object includes reading an authentication element physically associated with the object removably disposed in (e.g., inside) an outer container through the outer container, for example using x-rays, radio waves, or sound waves. The authentication element may be read without accessing the outer container. In some embodiments, a method of authenticating an object includes reading an authentication element physically associated with the object removably disposed in (e.g., inside) an outer container without accessing the outer container, for example using x-rays, radio waves, or sound waves. The method may include verifying authenticity of the object based on an authentication code, at least a portion of which is encoded by the composite authentication element. In some embodiments, the object is removed after determining that the object is authentic. Removing the object may include breaking a tamper-proof mechanism that secures the outer container. Removing the object may include compromising security of the outer container.

In some embodiments, a method of authenticating an object or objects disposed in an outer container is performed in-line. For example, such a method may be performed during a logistics process, such as a sorting process (e.g., a document or postal sorting process), a package routing process, a package sorting process, a shipping process, a warehouse process, and/or a distribution process. In some embodiments, a method is performed while an outer container is being transferred (e.g., using one or more conveyor belts). In some embodiments, a method of authenticating an object or objects disposed in an outer container is performed during a logistics process, such as during a sorting process (e.g., a document or postal sorting process), a package routing process, a package sorting process, a shipping process, a warehouse process, and/or a distribution process.

In some embodiments, a method includes orienting an outer container before reading an authentication element physically associated with an object in the outer container or a composite authentication element physically associated with objects disposed in the outer container. In some embodiments, a method includes positioning an outer container before reading an authentication element physically associated with an object in the outer container or a composite authentication element physically associated with objects disposed in the outer container.

In some embodiments, an outer container is enclosed during reading of an authentication element physically associated with an object in the outer container or a composite authentication element physically associated with objects disposed in the outer container. In some embodiments, an outer container is secure during reading of an authentication element physically associated with an object in the outer container or a composite authentication element physically associated with objects disposed in the outer container (e.g., secured by a tamper-proof mechanism). In some embodiments, an object or objects are disposed inside of an outer container during reading of an authentication element physically associated with an object in the outer container or a composite authentication element physically associated with objects disposed in the outer container, respectively.

One or more additional security (e.g., error detection) techniques may be applied in connection with a composite authentication element that encodes at least a portion of an authentication code. Examples of additional security (e.g., error detection) techniques that may be used include parity bit, checksum, and check digit. For example, at least a portion of an authentication code may include a parity bit or a check digit. As another example, in some embodiments, at least a portion of an authentication code read from a composite authentication element may be verified as authentic or not based on a checksum, a parity bit, or a check digit. As another example, at least a portion of an authentication code may be verified, at least in part, by a checksum (e.g., of two or more characters in the at least a portion of an authentication code). A composite authentication element may encode at least a portion of an authentication code including a check digit and/or parity bit thereof. A composite authentication element may encode (i) at least a portion of an authentication code and (ii) a check digit or parity bit. In some embodiments, one or more additional security techniques may be used whether an authentication code is characters (e.g., alphanumeric characters) or a pattern.

In some embodiments, radiodensity and/or sound wave attenuation is used as a type of parity bit and/or check digit. For example, in some embodiments, a composite authentication element encodes at least a portion of an authentication code as a QR code or barcode where a portion of the QR code or barcode (e.g., one or more bits of the QR code or one or more bars of the barcode) has a certain radiodensity and/or sound wave attenuation (e.g., higher or lower than one or more other bits of the QR code or one or more other bars of the barcode) that allows verification of authenticity of the at least a portion of the authentication code. In some embodiments, a portion that has a certain radiodensity is a particular predetermined portion (e.g., always a certain bit or bits of a QR code or always certain bar(s) of a barcode). In some embodiments, a portion that has a certain radiodensity is a portion selected by a person or organization to whom an authentication code pertains (e.g., is only known to that person or organization).

In a composite authentication element, overlapping portions of radiodense material (e.g., ink) may cause one or more portions (e.g., bits) of the authentication element (e.g., QR code) to appear as more radiodense than others and therefore be used as an additional security feature. For example, if different portions of a QR code are printed using radiodense ink on different pages of a multipage document, one or more certain bits may be printed on multiple pages such that the QR code has one or more bits that appear more radiodense than one or more other bits when read, thereby acting like a parity bit or check digit for the QR code and/or for at least a portion of an authentication code encoded by the QR code. Similarly, in an authentication element that is readable based on how an object is arranged (e.g., folded), overlapping portions of radiodense material (e.g., ink) may cause one or more portions (e.g., bits) of the authentication element (e.g., QR code) to appear as more radiodense than others and therefore be used as an additional security feature.

In some embodiments, if one or more additional security techniques are used with a composite authentication element that encodes at least a portion of an authentication code, it can be determined that an object or label physically associated with the composite authentication element is not authentic (e.g., is counterfeit) even if the authentication code itself, determined at least in part by reading the composite authentication element, appears authentic. For example, an authentication code read from a composite authentication element (e.g., a QR code) may appear authentic but radiodensity of a certain portion of the composite authentication element (e.g., one or more certain bits of the QR code) is not correct and therefore an object physically associated with the composite authentication element can be determined to be counterfeit.

Using one or more such additional security techniques provides an additional layer of security in that even if a potential counterfeiter comes into possession of an authentication code, the counterfeiter may not know that one or more additional security techniques are being employed. Similarly, a counterfeiter that comes into possession of a genuine object for which a forgery or counterfeit copy is intended to be made may identify a composite authentication element is present and be able to copy the composite authentication element in the attempted forgery or counterfeit copy but not know or appreciate by simple inspection (e.g., with x-rays, radio waves, or sound waves) that an additional security technique is being employed. For example, the counterfeiter may not know the correct parity bit, check digit, or check sum. The counterfeiter may therefore fail to incorporate that into the attempted forgery or counterfeit copy, such that security of the original is maintained. Similarly, a counterfeiter may try to incorporate a composite authentication element with an object that encodes at least a portion of a fake authentication code where the fake authentication code does not include the correct parity bit, check digit, or checksum for that object or type of object such that it can be determined that the forged or counterfeit object(s) are detectable as not authentic.

In some embodiments, a method is performed in-line. In some embodiments, authenticity of one or more objects is determined (e.g., verified) in-line. In some embodiments, a method is performed during a logistics process, for example during a sorting process (e.g., a document or postal sorting process), a package routing process, a package sorting process, a shipping process, a warehouse process, and/or a distribution process. In some embodiments, authenticity of one or more objects is determined (e.g., verified) during a logistics process, for example during a sorting process (e.g., a document or postal sorting process), a package routing process, a package sorting process, a shipping process, a warehouse process, and/or a distribution process. In some embodiments, authenticity of one or more objects is determined (e.g., verified) while an outer container, in which the one or more objects are disposed inside, is being transferred (e.g., using one or more conveyor belts). In some embodiments, a method is performed while an outer container, in which the one or more objects are disposed inside, is being transferred (e.g., using one or more conveyor belts). In some embodiments, authenticity of an object is determined (e.g., verified) while the object is being transferred (e.g., using one or more conveyor belts). In some embodiments, a method is performed while an object is being transferred (e.g., using one or more conveyor belts).

A method of verifying authenticity of an object may be performed or caused to be performed by, for example, an appraiser for the object, an employee of an auction house, a dealer for the object, a seller for the object, a prospective buyer of the object, or an owner of the object.

Cipher Elements Encoding Cipher Keys

The foregoing description has focused on authentication elements that encode at least a portion of an authentication code, generally that are physically associated with an object that can be authenticated using the authentication code. Also contemplated are cipher elements that encode cipher keys that can be used to decrypt encrypted authentication codes (or encrypt authentication codes) for authentication purposes. For example, an encrypted authentication code may be provided on documentation or an invoice for an object (e.g., as a watermark or in plaintext print) or in an electronical or physical file (e.g., as metadata) corresponding to an object and a cipher key for a cipher used to encrypt the authentication code may be encoded in a cipher element physically associated with the object. In this way, even though an authentication code may not be physically associated with an object (e.g., using an authentication element), the authentication code can still be used to verify authenticity of the object since the authentication code may only be able to be verified using a cipher key encoded by a cipher element physically associated with the object. If an incorrect cipher key were encoded with a cipher element physically associated with an object, then an authentication code may not be able to be properly decrypted, signifying that the object is counterfeit. Moreover, because cipher keys may, in some embodiments, be simpler than authentication codes (e.g., fewer characters), it may be easier to encode a cipher key into a cipher element than it would be to encode a corresponding encrypted authentication code into an authentication element. Therefore, using cipher elements may allow simpler, more reliable, and/or easier to interpret encoding schemes to be used while also facilitating use of complicated authentication codes to enhance overall security. Even if an attempted counterfeiter could somehow surreptitiously read a cipher element, without the corresponding authentication code, the counterfeiter could not create a passable counterfeit, for example could not create an accurate invoice that matches the cipher element.

In some embodiments, one party may possess an authentication code and another party may possess a cipher key and cipher. For example, a party shipping or storing an object may provide an authentication code and a shipping or storage company may provide (e.g., generate) a cipher key to encrypt the authentication code and then include the encrypted authentication code in documentation or a file for the shipment or storage and provide (e.g., produce) a cipher element that encodes the cipher key and physically associate it with the object. In some embodiments, a party shipping or storing an object provides the object physically associated with a cipher element that encodes a cipher key and separately provides (e.g., sends or mails) or maintains an encrypted authentication code. When receiving or retrieving the object, the cipher element can be read to determine the cipher key and decrypt the authentication code to verify authenticity.

In some embodiments, an object is physically associated with a cipher element. A cipher element may encode a cipher key like an authentication element encodes at least a portion of an authentication code, for example using one or more encoding portions as described herein. To avoid unnecessary duplication of text herein, it is expressly contemplated that the present disclosure includes embodiments of cipher elements and composite cipher elements that correspond to expressly described embodiments of authentication elements and composite authentication elements, respectively, except that the cipher elements and composite cipher elements encode cipher keys whereas the authentication elements and composite authentication elements encode at least a portion of authentication codes. Any object described as being physically associated with one or more authentication elements may be additionally or alternatively physically associated with one or more analogous cipher elements.

In some embodiments, an object is physically associated with a cipher element that encodes a cipher key. A cipher key may be used to decrypt the encrypted authentication code using a cipher. A cipher element may encode a cipher key using one or more encoding portions as disclosed herein. A cipher key may correspond to an encrypted authentication code corresponding to one or more objects. A cipher key may be for an encrypted authentication code corresponding to one or more objects. A cipher key may be used to decrypt an encrypted authentication code corresponding to one or more objects. An encrypted authentication code may be provided elsewhere than one or more objects corresponding to the authentication code. For example, documentation, an invoice, or a physical or electronic file, a person's memory (e.g., an owner's memory), a registry, or a combination thereof for one or more objects may include an encrypted authentication code. In some embodiments, a passive cipher element encodes a cipher key for an encrypted authentication code (e.g., corresponding to an object). In some embodiments, a plurality of cipher elements encode a cipher key for an encrypted authentication code (e.g., corresponding to an object); each of the cipher elements may encode a portion (e.g., a distinct portion) of the cipher key. In some embodiments, a plurality of cipher elements each encode a different cipher key of a set of cipher keys corresponding to an encrypted authentication code (e.g., for an object).

A method of determining authenticity of an object may include reading a cipher element physically associated with an object to determine a cipher key. A method may further include decrypting an encrypted authentication code for the object using the cipher key. A method may further include determining that the object is authentic based on the decrypted authentication code.

One or more cipher elements may be used in combination with one or more authentication elements. For example, an object may be physically associated with an authentication element and a cipher element. As another example, a set of objects may include (i) a first object physically associated with an authentication element that encodes an authentication code in a manner encrypted with a cipher and (ii) a second object physically associated with a cipher element that encodes a cipher key for the cipher, thereby allowing both objects in the set to be mutually authenticated by reading the authentication element and the cipher element in order to decrypt and verify the authentication code.

A cipher key may be short, for example no more than 10 characters (e.g., no more than ten binary digits), no more than 8 characters, no more than 6 characters, or no more than 4 characters.

Images for Authentication and/or Verification of Authenticity

A non-transitory image of an authentication element disclosed herein, for example physically associated with an object or a label, may be used for authentication and/or verification of authenticity. Likewise, a non-transitory image of a composite authentication element disclosed herein, for example physically associated with objects that may be disposed in (e.g., enclosed in) an outer container, may be used for authentication and/or verification of authenticity.

In some embodiments, an authentication element is discernable in a non-transitory image, for example based on one or more encoding portions included in the authentication element. The authentication element may be physically associated with an object where the object is authenticatable using the image.

In some embodiments, a composite authentication element is discernable in a non-transitory image, for example based on one or more encoding portions included in the composite authentication element. The composite authentication element may be physically associated with objects where the objects are authenticatable using the image.

An object may be discernable in an image, for example because the object is radiodense. An object may not be discernable (may be undiscernible) in an image, for example because the object is not radiodense. In some embodiments, a label includes an authentication element and the label is discernable in an image, for example because the label is radiodense. In some embodiments, a label includes an authentication element and the label is not discernable (may be undiscernible) in an image, for example because the label is not radiodense.

An image may be a radiological image. An image may be a sonogram (e.g., an ultrasound image). An image may be a tomographic image, such as an x-ray tomography image and/or a CT image (e.g., CT scan). An image may be an x-ray image. An image may be a dual energy x-ray absorptiometry image.

An image may be a printed image. An image may be a film image. One or more images may be stored on one or more non-transitory computer-readable media.

A method may include acquiring an image. For example, an image may be acquired from outside of an outer container. Acquiring an image may include providing (e.g., directing) x-rays, radio waves (e.g., in combination with a magnetic field), or sound waves to an authentication element and/or an object physically associated with the authentication element and/or a label physically associated with the authentication element. For example, acquiring an image may include providing (e.g., directing) x-rays, radio waves (e.g., in combination with a magnetic field), or sound waves to an authentication element (e.g., through an outer container). An image may be acquired using x-rays, radio waves (e.g., in combination with a magnetic field), or sound waves. A method may include rendering, by a processor of a computing device, an image. A method may include displaying, by a processor of a computing device, an image. A method may include constructing (e.g., by a processor of a computing device) an image. A method may include developing an image. One or more non-transitory computer-readable media may have instructions (e.g., one or more programs) stored thereon that, when executed by a processor, cause the processor to perform any such method or methods.

Objects

An object may be an item. An object may be or include a fashion object, such as, for example, clothing (e.g., an article of clothing), an accessory, a handbag, a shoe. An object may be or include jewelry, such as, for example, an earring, a ring, a necklace, or a bracelet. An object may be or include a textile (e.g., fabric), such as, for example, leather (faux (e.g., plastic and/or vegan) or genuine), nylon, silk (shantung), canvas, cotton twill, cotton (e.g., shirting), denim, or a combination thereof. An object may be or include a thread. An object may be or include a string. An object may be or include a cord. An object may be or include a yarn. An object may be or include a wire. An object may be or include food packaging, such as, for example, a container, a bottle, a jar, a can, a carton, a tub, a box, a bag, a sac, or a combination thereof. An object may be or include beverage packaging, such as, for example, a container, a bottle, a carton, or a combination thereof. An object may be or include a label. A label may be a food label. A label may be a beverage label. An object may be or include a logo. An object may be or include a patch (e.g., a logo patch) (e.g., an embroidered patch). An object may be or include embroidery. An object may be or include an emblem, badge, crest, seal, or token. An object may be or include an artwork, for example a painting, a print, or a photograph. An object may be or include a canvas. An object may be or include a sculpture. An object may be or include a substrate, for example a canvas, paper, or board (e.g., wood board), for example for an artwork or document. An object may be unfinished (e.g., a blank canvas). An object may be or include an antique. An object may be or include a weapon or ammunition for a weapon. An object may have the form a sheet-like layer, for example a currency note. An object may be or include a piece of paper, such as a document, lottery ticket or betting slip, or currency note. Objects may be or include multiple pieces of paper, such as objects that are together at least a portion of a document (e.g., a complete document) or at least a portion of a set of documents (e.g., a complete set of documents). An object may be or include a single page document or a multi-page document. A document may be, for example, a contract or agreement (e.g., insurance contract, an invoice, a purchase agreement, a non-disclosure agreement), a financial instrument (e.g., stock certificate, bearer bond, options contract, derivative contract), a lottery ticket or betting slip, a deed, an assignment, a legal document (e.g., a warrant, a will, a trust certificate), a corporate record (e.g., a record of one or more trade secrets), or a certificate of authenticity. An object may be or include a document or currency note. A document (e.g., a complete document) may include one or more objects. An object may be or include a currency note. Objects may be a set. For example, objects may be units of a single stock keeping unit (SKU). Objects may be a set of multiple SKUs. An object may be an inner object, for example when disposed inside of an outer container or when it has been removed from being disposed inside of an outer container.

Exemplary Applications to Artwork

Advances in simulation of age-appropriate paints and other media have made authentication of artwork more difficult, even as non-destructive dating and other analysis methods have improved. In some embodiments, an object is a new work of art or a previously completed one. An authentication element for such an object may be a thread encoding an authentication code that is applied to a substrate (e.g., canvas or paper) of the artwork, either under paint or varnish. The authentication element may be provided in an unobtrusive location. The thread may be documented via x-ray (e.g., dual-energy x-ray absorptiometry) or another imaging modality. The authentication code may be kept as a secret by the artist or registration authority of the artwork. In the future, this piece (or a copy) can be similarly scanned via x-ray and a determination made whether the codes sufficiently correspond (e.g., match). An authentication element used in such an application may include (e.g., optically clear) radiopaque ink, preferably that does not limit the ability of the media to uptake additional inks, dyes, paints or artistic media. The authentication element may be applied to the front or back of a substrate (e.g., canvas or paper or other media). Such substrates may be sold for making art. In some embodiments, an orientation mark is included to orient an authentication element (e.g., for a person desiring to authenticate an object).

In some embodiments, once an artist has finished a piece of art and desires to register the artwork, a x-ray is taken (e.g., under predetermined conditions). The radiographic fingerprint of that canvas (e.g., aligned with an orientation mark) may be recorded. The fingerprint may then be attested to by the artist as being linked to that original art. The registration process may have an additional cost, as not all canvases or papers will result in final works intended for display. There may be a maintenance of certification fee for storage of the fingerprint (e.g., radiographic signature). When the artwork is being bought, sold, moved to a new location, for example where the transportation may have compromised the authenticity of the artwork, or at any time desired by the claimed owner, a radiological image can be taken (e.g., at the location of the artwork). By comparing the registered radiographic file with the original artists attested master file image, the object in question can be authenticated.

In some embodiments, an authentication element could be applied to the front of the canvas either before painting has begun or partway through, such that evidence that a special thread has been applied is no longer visible to the casual observer. In some embodiments, it may be the presence of or location and/or orientation of an authentication element, alternatively or additionally to an authentication code, that provides sufficient evidence of authenticity. In some embodiments, it may be the relative location and/or orientation of an authentication element to some other radiodense part of an object (e.g., artwork), such as a metallic foil or even a portion of a frame for the object, which, alone or in combination, provides evidence of authenticity. In some embodiments, an authentication element is incorporated directly into a canvas itself as part of a manufacturing process rather than being added to the canvas later. In some embodiments, an authentication element is physically associated with a frame instead of a canvas.

Exemplary Applications to Document Security

Documents, such as high security documents, may need to be authenticated and verified from time to time. However, current methods of authentication and verification requires direct inspection of the documents and thereby likely exposure of the sensitive content, for example to inspect watermarks or similar security features. Additionally, the authentication may require specialized knowledge that is considered proprietary and knowing what to look for in and of itself may decrease the security of the process. Systems disclosed herein mitigate these risks.

In some embodiments, a composite authentication element is physically associated with a document (e.g., multipage document) or set of documents, for example in such a way as to be able to verify the completeness of the document or set of documents and/or the authenticity without exposing the document or set of documents to direct inspection. For example, the document or set of documents can be disposed in a secure, enclosed, and/or opaque outer container, such as an envelope.

In some embodiments, optically-clear radiopaque ink that does not limit the ability of the document media to uptake additional inks, dyes, varnishes or coatings is used. Such ink may be applied as a composite authentication element to a document or set of documents in such a way as to uniquely identify/authenticate the document. The composite authentication element may be distributed among the pages of the document or set of documents in such a way to be able to verify the completeness of the document or set of documents.

In some embodiments, when verification is required, an x-ray image of a document can be obtained to read a composite authentication element. In some embodiments, an encrypted authentication code (e.g., encrypted with a public key) for the document can be compared with the public-key encrypted version obtained from the x-ray image. Accordingly, a match can be ensured without exposing the private key of the document. Such schemes allow for verification of authenticity and/or completeness without the need to remove a document or set of documents from an outer container (e.g., security envelope), which could or would expose contents of the document or set of documents to the inspecting party. In some embodiments, different inks with different radiopaque materials (e.g., optically clear and radiopaque materials) are used such that dual energy x-ray can be used to decipher what material is used for which pixel in a QR code or barcode based authentication element. In some embodiments, some page shift can be tolerated given the size of QR code or barcode pixels as a mixed-integer programming (MIP) algorithm can be applied to each pixel.

An authentication element or composite authentication element can be applied to an otherwise blank sheet or blank sheets (e.g., before document text is written or printed). An authentication element or composite authentication element can be applied after document text is written or printed, for example as a second print layer or varnish layer. An authentication element or composite authentication element may be applied using one or more optically clear and radiopaque material so that a document appears blank before text is added (or so there is no interference with existing text).

In some embodiments, a machine approximately the size of a countertop copy machine is employed with a printer and a "reader" together. A document to be secured may be fed into the machine and an authentication element or composite authentication element applied. For an incoming document, the lid could be lifted and a security envelope placed in a chamber of the machine. The lid may contain an x-ray DR plate, and a source would move on a gantry to expose the entire chamber from a series of exposures. A series of exposures may be preferred due to the proximity of the source to a detector and the field of view (FOV) of the image. A small source, such as dental x-ray, could be used and repeated and then stitched together to create the entire image. The devices could be synched so that only a document created on a certified device would produce a positive match.

Additional Exemplary Embodiments

The present disclosure also provides, inter alia, systems and devices for utilizing visibility-enhancing elements. According to some embodiments of the present disclosure, a visibility-enhancing system may include at least one visibility-enhancing element configured to be at least temporarily affixed to, integrated with, or embedded within at least one portion of at least one item. In some implementations, at least one internal component may include at least one visibility-enhancing element, wherein the visibility-enhancing element may be at least temporarily affixed to, integrated with, or embedded within at least one portion of the internal component before the internal component itself may be at least temporarily affixed to, integrated with, or embedded within at least one portion of at least one item.

In some embodiments, the internal component may be configured for use in one or more various applications, such as facilitating medical treatment or authenticating a good, product label, or document. The at least one visibility-enhancing element may include a form including one or more of: at least one contrasting agent, an amount of at least one elongated fibrous material in a structural weaving configuration, an amount of at least one elongated fibrous material configured as a tracer line, one or more substantially rigid particles or pieces, one or more metallic elements, or an amount of at least one hydrogel. In some aspects, the at least one visibility-enhancing element may be at least partially visible in one or more imaging modalities, such as x-radiation (x-ray) imaging, MRI, CT scan, or sonography (e.g., ultrasound). In some embodiments, the at least one visibility-enhancing element may be added to the at least one internal component during one or more stages of the manufacturing process of the internal component, or the at least one visibility-enhancing element may be added to at least one existing internal component after the manufacturing process has been completed.

In some embodiments, an authentication element is or includes an internal component. An internal component may be any structure, element, composition, device, or mechanism that may be configured, integrated, or embedded at least partially within an internal portion of an object or something associated with an object, for example one or more of: a good, a product, a label, an item, a article, or a document. In some embodiments, an internal component may be configured at least partially within an internal portion at least one good or item including one or more of: a handbag; product packaging; food packaging; artwork, such as a painting, canvas, or sculpture; currency; one or more bullets or other ammunition; a protection device; an article of clothing, or a piece of jewelry.

In some embodiments, an encoding portion is or includes a visibility-enhancing element. An visibility-enhancing element may include any element, structure, substance, composition, or material that may be affixed to, integrated with, embedded within, or otherwise added to at least one internal or external portion of at least one internal component, wherein the visibility-enhancing element may be at least partially visible via at least one imaging modality. By way of example, a visibility-enhancing element may include one or more of: at least one contrasting agent, an amount of at least one fibrous material in a structural weaving configuration, an amount of at least one fibrous material configured as a tracer line, one or more substantially rigid particles or pieces, one or more metallic elements, or an amount of at least one hydrogel that may be integrated with, embedded within, or affixed or applied to one or more internal or external portions of at least one internal component.

In some embodiments, an additive may include any element that may be added to one or more internal or external portions of at least one internal component for one or more purposes other than or in addition to facilitating at least partial visibility of the internal component in one or more imaging modalities. By way of example, an additive may include one or more antibiotics, vitamins (such as, vitamin E in the form of one or more tocopherols or one or more tocotrienols), an amount of titanium, an amount of iron oxide, an amount of barium sulfate, an amount of manganese chloride or other manganese salt, an amount of aluminum, or one or more nanoparticles including any combination thereof. In some embodiments, while an additive may not be exclusively intended to facilitate at least partial visibility in one or more imaging modalities of at least one internal component to which it may be added, an additive may be at least partially visible in at least one imaging modality.

In some embodiments, imaging may include any imaging modality that may be used to view one or more internal portions configured at least partially within one or more of: an object, a good, a product, a label, an item, an article, a document, or other tangible entity. By way of example, imaging may include x-radiation, MRI, CT, or sonography (e.g., ultrasound).

In some embodiments, a fibrous material may include any substance, material, or member that includes at least one fiber. In some embodiments, a fibrous material may include one or more of: an amount of thread, an amount of wire, an amount of cord, or an amount of string.

FIG. 1 illustrates an example of an authentication element 10 that encodes at least a portion of an authentication code, according to some embodiments of the present disclosure. The authentication element 10 may include a thread 11 and one or more encoding portions 12. The one or more encoding portions 12 encode the at least a portion of an authentication code 13. The authentication code 13 may include an alphanumeric code. The alphanumeric code, for example, may only include numbers (e.g., a decimal number, a binary number). In another example, the alphanumeric code may only include letters. In another example, the alphanumeric code may include combinations of letters and numbers. In another example, the alphanumeric code may be represented in hexadecimal or another base that is not base 10. In some embodiments, the authentication code 13 may include a 2-dimensional code. The 2-dimensional code, for example, may include a QR code. The encoding portions 12 may include several ways to encode the at least a portion of authentication code 13, as further described herein in connection with FIGS. 2A-D and FIGS. 3A-D.

Figure 2A:
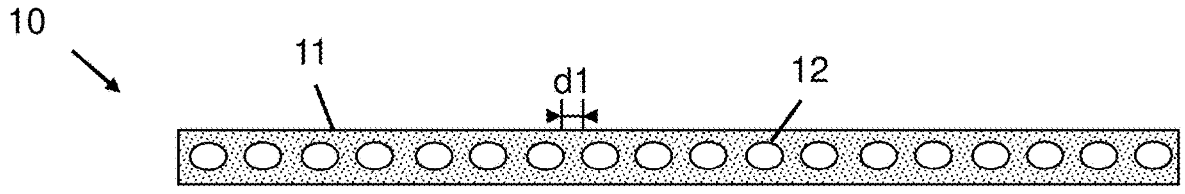
FIG. 2A illustrates an example of an authentication element, according to illustrative embodiments of the present disclosure.
Figure 3A:
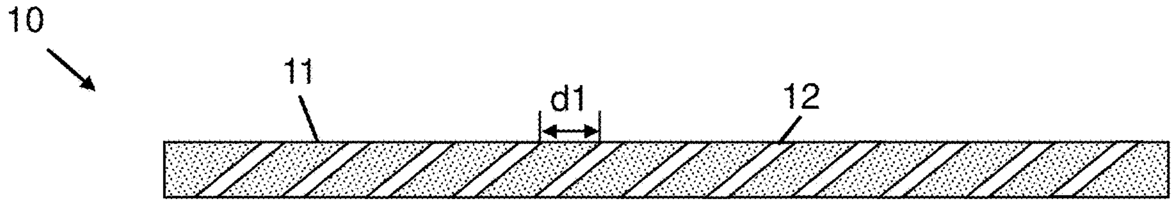
FIG. 3A illustrates an example of an authentication element, according to illustrative embodiments of the present disclosure.

FIG. 2A illustrates an example of an authentication element 10 that encodes at least a portion of an authentication code. In this example, the authentication element 10 includes a thread 11 that includes encoding portions 12. The encoding portions are particles and/or clusters of particles. In some embodiments, the encoding portions 12 may be evenly distributed with a spacing d1 between two successive encoding portions 12. In this case, the authentication code is a simple code that is set by a combination of encoding portion size, encoding portion shape (e.g., particulate), and spacing d1. In some embodiments, one or two of these may be irrelevant to the authentication code. For example, encoding portion size may be irrelevant and the authentication code is derived from only spacing and shape or shape is irrelevant and the authentication code is derived from only spacing and size or neither shape nor size matters and the authentication code is derived only from spacing. In some embodiments, when fewer characteristics are used to encode an authentication code, more precise tolerances may be used (e.g., the authentication code may be encoded by a more precise spacing if size and shape are not considered and a less precise spacing if size and/or shape is considered). FIG. 3A illustrates a related exemplary embodiment where there are one or more encoding portions 12 that is/are filament(s) or fiber(s) woven or braided into the thread 11.

Figure 2B:
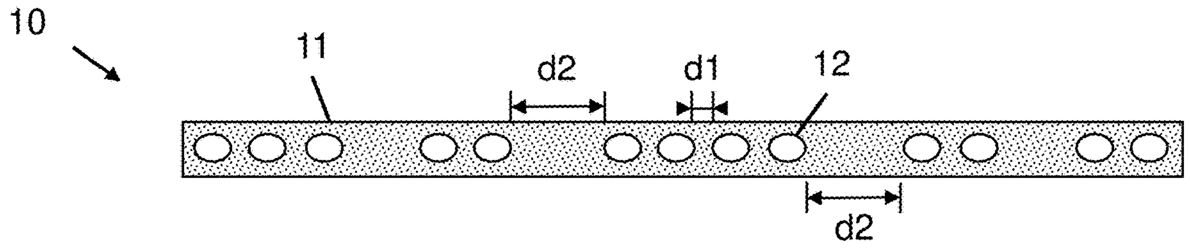
FIG. 2B illustrates an example of an authentication element, according to illustrative embodiments of the present disclosure.
Figure 3B:
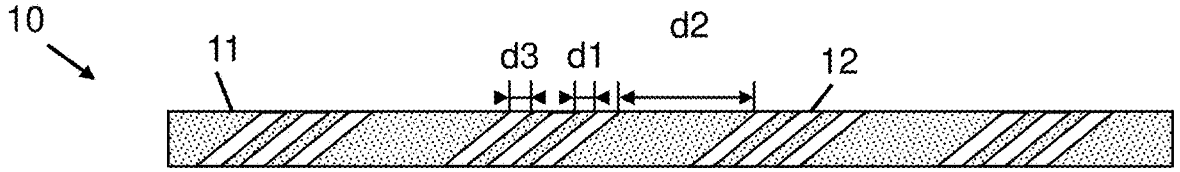
FIG. 3B illustrates an example of an authentication element, according to illustrative embodiments of the present disclosure.

FIG. 2B illustrates an example of an authentication element 10. Authentication element 10 includes a thread 11 and encoding portions 12. The encoding portions are particles and/or clusters of particles. The encoding portions 12 are distributed unevenly, resulting in varying spacings d1, d2 between the encoding portions 12, which contributes to the encoding of at least a portion of an authentication code. For example, different spacings may correspond to different characters in the authentication code 13. In another example, the number of similarly spaced encoding portions before a larger gap may correspond to different characters in the authentication code 13 (e.g., the number of encoding portions separated by distance d1 before separation by a larger distance d2). FIG. 3B illustrates a related exemplary embodiment where encoding portions 12 are filament(s) or fiber(s) woven or braided into a thread 11. Still referring to FIG. 3B, different spacings and/or phase between blocks of spirals may correspond to different characters in the authentication code 13 or the number of spirals of one or more encoding portions 12 before a larger gap d2 may correspond to different characters in the authentication code 13. Each encoding portion 12 may have a same dimension d3 (e.g., thickness) (as shown) or a different dimension.

Figure 2C:
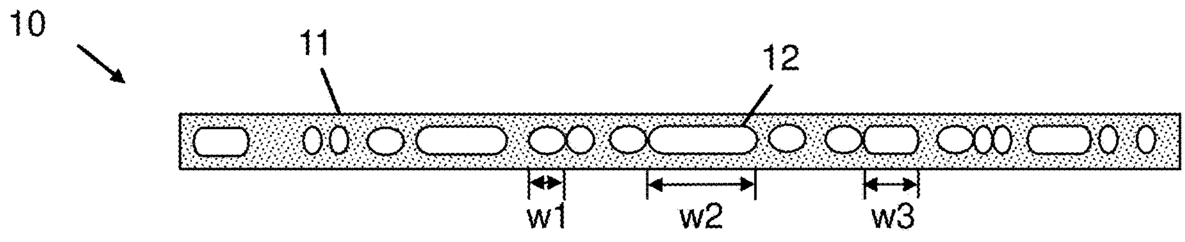
FIG. 2C illustrates an example of an authentication element, according to illustrative embodiments of the present disclosure.

FIG. 2C illustrates an example of an authentication element 10. The authentication element 10 includes a thread 11 and encoding portions 12. The encoding portions are particles and/or clusters of particles. The encoding portions 12 include different sizes (e.g., widths w1, w2, w3) and different spacings, which contribute to the encoding of at least a portion of an authentication code. For example, different sizes of encoding portions 12 may correspond to different characters in the authentication code 13. For example, a Morse code type encoding scheme may be used using different sizes (e.g., regardless of spacings). The encoding portions 12, for example, may represent a barcode. In some embodiments, different sizes are used with constant spacings.

Figure 2D:
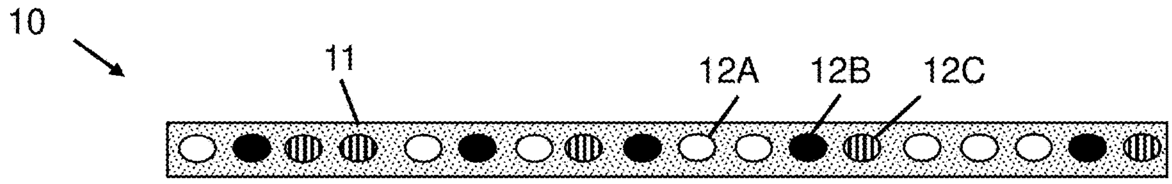
FIG. 2D illustrates an example of an authentication element, according to illustrative embodiments of the present disclosure.
Figure 3C:
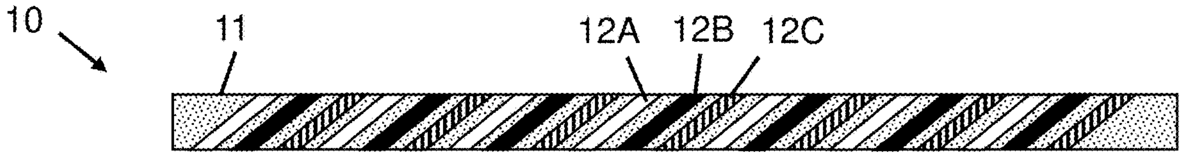
FIG. 3C illustrates an example of an authentication element, according to illustrative embodiments of the present disclosure.
Figure 3D:
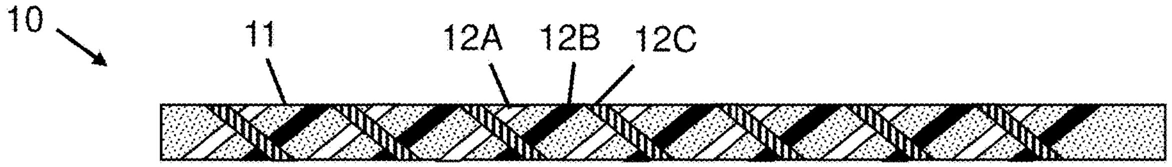
FIG. 3D illustrates an example of an authentication element, according to illustrative embodiments of the present disclosure.

FIG. 2D illustrates an example of an authentication element 10. The authentication element 10 includes a thread 11 and encoding portions of different radiodensities 12A, 12B and 12C. The encoding portions are particles and/or clusters of particles. The encoding portions of different radiodensities 12A-C may appear as different contrasts in an image, for example, a two-energy x-ray absorptiometry image or fluoroscopic image. The encoding portions 12A-C may be arranged in a pattern that encodes an authentication codes. In some embodiments, the pattern corresponds to different characters in the authentication code 13. For example, a base three authentication code may be used if three different radiodensities of encoding portions are use. FIGS. 3C-D illustrates a related exemplary embodiment where the encoding portions 12A-C are filament(s) or fiber(s) woven or braided into the thread 11. FIG. 3C illustrates encoding portions 12A-C an ABC pattern (but the pattern need not be repetitious as illustrated), in this case where all of the encoding portions 12A-C are spiraled in a same orientation (e.g., direction). FIG. 3D illustrates a similar pattern as FIG. 3C but here encoding portion 12C is spiraled in a different orientation (e.g., direction) from encoding portions 12A-B.

Figure 4A:
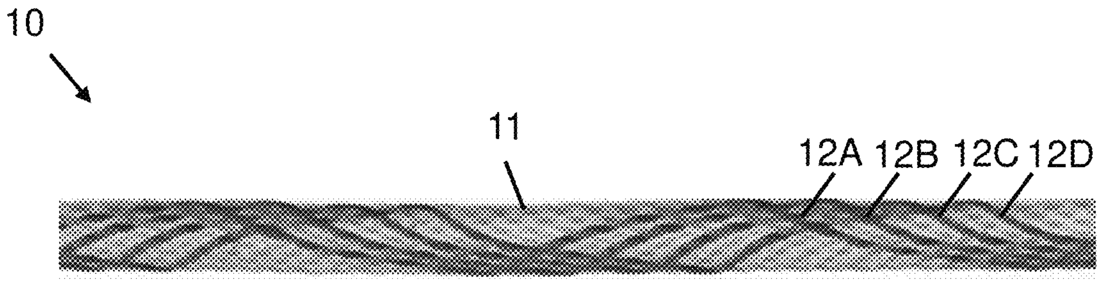
FIG. 4A is a brightfield image of an example of an authentication element, according to illustrative embodiments of the present disclosure.
Figure 4B:
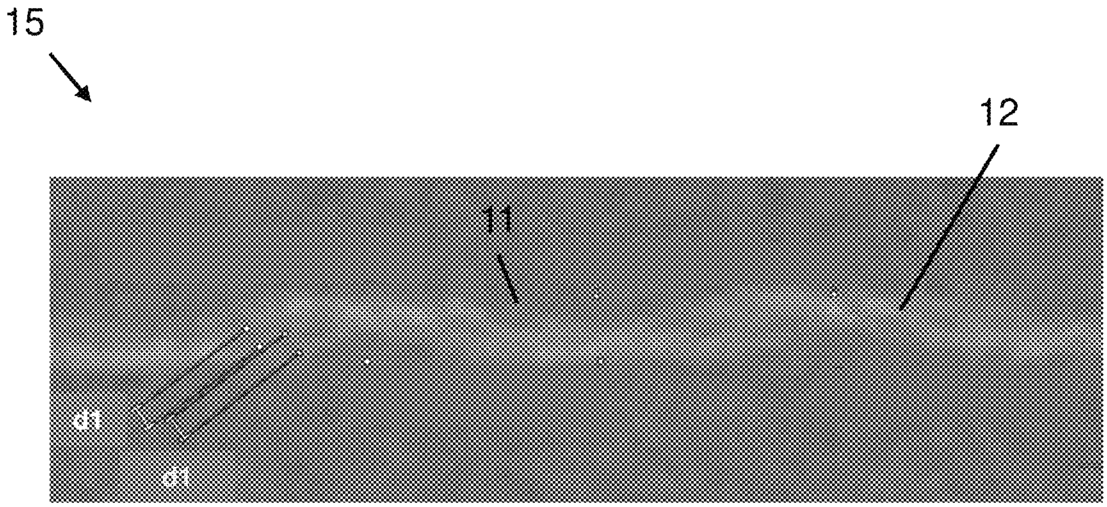
FIG. 4B is an x-ray image of an authentication element, according to illustrative embodiments of the present disclosure.

FIG. 4A is a brightfield image of an exemplary authentication element 10 that has been constructed. The authentication element 10 is a thread 11 and radiopaque encoding portions 12A-D are woven into the thread 11. In this example, there are four similar encoding portions 12A-D that are spiraled in a same orientation with a spacing between each of the spirals. The encoding portions 12A-D are discernable from the rest of the authentication element 10 in the brightfield image, at least in the magnified view shown (they may be undiscernible or less discernable in an unmagnified view). FIG. 4B shows an x-ray image 15 of the authentication element 10 of FIG. 4A showing that the different encoding portions are discernable. The parts of the authentication element 10 that are not the encoding portions 12A-D are not radiopaque (and are optically clear as seen in FIG. 4A) and therefore do not show up against background in the x-ray image. The spacing d1 between successive encoding portions 12A-D is about 0.6 mm in this example. In some embodiments, there are different spacings between different adjacent pairs of the encoding portions 12.

Figure 5A:
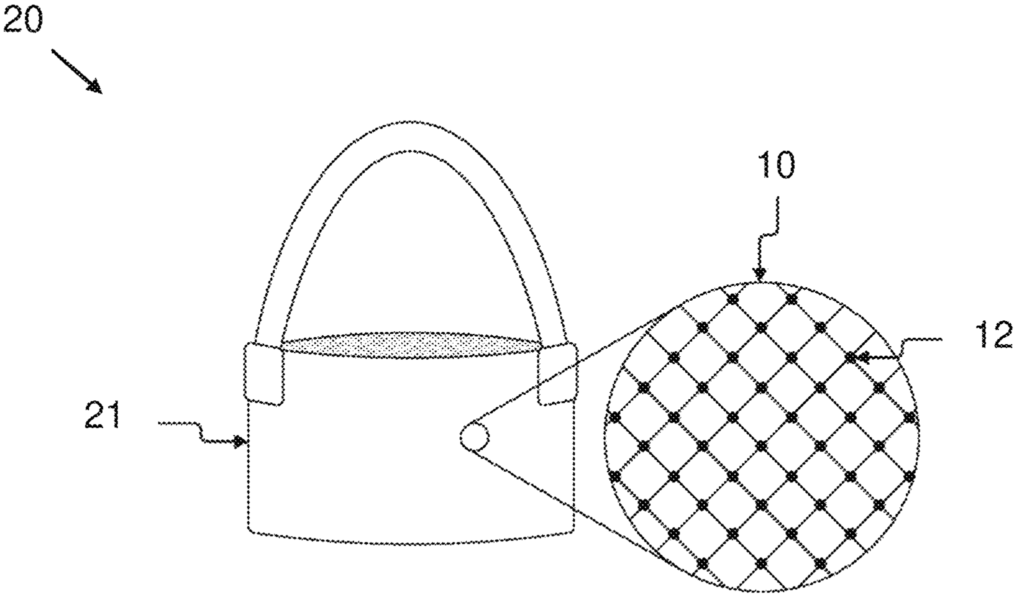
FIG. 5A illustrates an exemplary visibility-enhancing system including an item including at least one visibility-enhancing element, according to illustrative embodiments of the present disclosure.
Figure 5B:
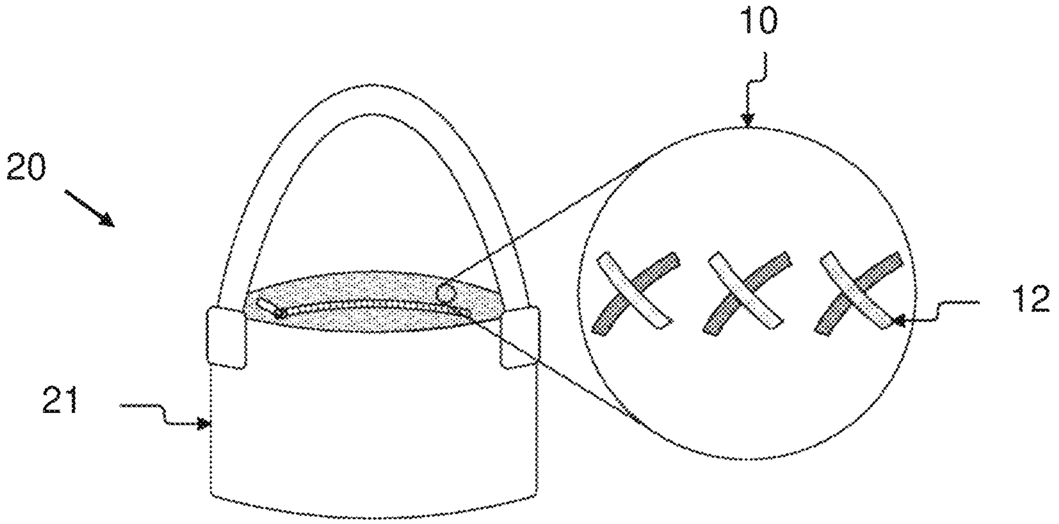
FIG. 5B illustrates an exemplary visibility-enhancing system including an item including at least one visibility-enhancing element, according to illustrative embodiments of the present disclosure.

Referring to FIGS. 5A and 5B, an exemplary visibility-enhancing system 20 including an item 21 including at least one visibility-enhancing element 12, according to some embodiments of the present disclosure, is illustrated. In some embodiments, at least one visibility-enhancing element 12 may be at least temporarily secured within or upon or may be at least temporarily integrated with or embedded within at least one portion of at least one item 21, wherein the item 21 may include at least one good, product, or document, such as, a handbag, product packaging, food packaging, artwork, currency, a product label, one or more bullets or other ammunition, a protection device, an article of clothing, or a piece of jewelry.

In some embodiments, at least one visibility-enhancing element 12 may include at least one fibrous material, such as, an amount of thread or amount of string, wherein at least a portion of the fibrous material may be doped or embedded with at least one contrasting agent before being at least temporarily secured to, integrated with, or embedded within at least one portion of at least one item 21 to facilitate the detection or visibility of the fibrous material in one or more imaging modalities, such as, an x-ray, MRI, or CT scan.

In some embodiments, the fibrous material may include at least one unique structural configuration, arrangement, or pattern, wherein the unique configuration may be formed by using one or more various stitching or threading techniques or styles, or by arranging the fibrous material as a unique patch or similar material structure, for example. In some embodiments, by forming a unique structural configuration using the fibrous material, a manufacturer, producer, or other source of the item 21 may integrate a unique design, symbol, pattern, or similar identification feature with the item 21 that may be substantially imperceptible by unassisted human eyesight, but may be detectable via at least one imaging modality. In some implementations, this may allow the item 21 to be authenticated as having been produced, manufactured, or otherwise provided by an indicated source when at least one imaging modality confirms the presence of the visibility-enhancing element 12 at an expected location in an expected orientation, position, or configuration. In some embodiments, the expected location, orientation, position, or configuration of the visibility-enhancing element 12 may be unknown to any entity other than the source of the item 21 due to the substantially imperceptible nature of the visibility-enhancing element 12 without the use of at least one imaging modality.

At least one visibility-enhancing element 12 may be at least partially integrated with at least one internal or external portion of an item 21, such as a handbag, wherein the visibility-enhancing element 12 may be integrated via stitching, sewing, or weaving, for example. In some embodiments, the location, orientation, position, and configuration of the visibility-enhancing element 12 may be detectable or observable via at least one imaging modality, such as x-ray imaging. In some embodiments, the visibility-enhancing element 12 integrated with the handbag 21 may include a unique structural weaving or mesh configuration or unique stitching pattern that may indicate that the handbag 21 was produced by an indicated manufacturer. In some embodiments, this may allow a purchaser of the handbag 21 to be able to confirm that the handbag 21 originated from the indicated source by scanning one or more portions of the handbag 21 using an x-ray imaging device to reveal or detect the unique configuration of the visibility-enhancing element 12 associated with the indicated source. In some embodiments, this may allow consumers to verify that one or more goods available for purchase are likely to have originated from the indicated source and are not counterfeit or copycat products.

In some embodiments, the visibility-enhancing element 12 may be substantially unobservable or undetectable without the utilization of at least one imaging device. In some implementations, the visibility-enhancing element 12 may include a unique identifier for at least one item 21. In some embodiments, the discrete nature of the visibility-enhancing element 12 may at least partially deter or hinder the item 21 associated therewith from being easily replicated or copied, which may at least partially facilitate a reduction in the unauthorized use or distribution of goods or products and may deter the production of counterfeit items 21.

In some embodiments, at least one visibility-enhancing element 12 may be added to one or more internal or external portions of at least one internal component 10 to facilitate the ability of the internal component 10 to be seen in one or more types of imaging, wherein one or more internal components 10 may be at least temporarily affixed to, integrated with, or embedded within at least one portion of at least one item 21. In some embodiments, this may allow the internal component 10 to include at least one visibility-enhancing element 12 in a structural configuration that includes at least one unique identifier that may be difficult or impossible to view or detect without at least one imaging device, making the structural configuration of the visibility-enhancing element 12 difficult to replicate.

In some embodiments, a visibility-enhancing element 12 may include a form that includes one or more of: at least one contrasting agent, an amount of at least one elongated fibrous material in a structural weaving configuration, an amount of at least one elongated fibrous material configured as a tracer line, one or more substantially rigid particles or pieces (such as, one or more metallic particles or beads), one or more metallic elements (such as, metallic particles or staples), or an amount of at least one hydrogel. In some embodiments, in aspects wherein the visibility-enhancing element 12 may include at least one contrasting agent, the contrasting agent may include an amount of gadolinium, an amount of iodine, or a combination thereof. In some embodiments, at least one visibility-enhancing element 12 in the form of at least one contrasting agent may be added to one or more internal or external portions of an existing internal component 10 or may be integrated into or affixed upon one or more internal or external portions of an internal component 10 during one or more stages of the manufacturing process of the internal component 10 before the internal component 10 may be affixed to, integrated with, or embedded within at least one portion of at least one item 21.

In some embodiments, at least one visibility-enhancing element 12 may be added as a coating to at least one internal component 10, wherein the visibility-enhancing element 12 may be applied to the internal component 10 while in a liquid, resin, or gel form and may solidify to form a coating upon one or more portions of the surface of the internal component 10 as it dries. In some implementations, an amount of at least one visibility-enhancing element 12 in a liquid, resin, or gel form may be placed in at least one container, and the container may then be inserted within an internal portion of the internal component 10 prior to being affixed to, integrated with, or embedded within at least one portion of at least one item 21.

In some embodiments, an amount of thread, cord, string, or similar elongated fibrous material may be doped or embedded with at least one visibility-enhancing element 12 in the form of at least one contrasting agent, and the elongated fibrous material may be used to form structural weaving or braiding that may be integrated with at least one internal component 10 such as, via stitching or sewing, wherein the structural weaving may include one or more of a plurality of different patterns or configurations upon and/or within the internal component 10. In some embodiments, the visibility-enhancing mechanism 12 may be woven into the internal component 10 either during or after the manufacturing of the internal component 10, whereafter the internal component 10 may be at least temporarily affixed to, integrated with, or embedded within at least one portion of at least one item 21.

In some embodiments, at least one visibility-enhancing element 12 may interact with a secondary design element, wherein the interaction may confirm the identity of the at least one item 21. For example, a visibility-enhancing element 12 may include an oval, and a secondary design element may include a metallic logo design located on the exterior of the item 21. When scanned with imaging technology, the metallic logo design may be centered within the oval. As an example, the secondary design element may include hardware, such as buckles, rivets, or chain links.

In some embodiments, at least one visibility-enhancing element 12 may be intentionally oriented and located within the item 21 to display known images or patterns through imaging systems from a predefined angle of view. For example, when properly aligned with an imaging system, at least one visibility-enhancing element 12 may include a predefined undistorted image. As another example, multiple visibility-enhancing elements 12 may interact with each other, wherein when properly viewed from a predefined angle, the multiple visibility-enhancing elements 12 may align to create a known composite image.

In some embodiments, a first view from a first angle may include a first composite image, and a second view from a second angle may include a second composite image. The first composite image may be taken from a standard scanning angle and may include a fake authentication that may be duplicated by counterfeiters. The second composite image may be viewable from a confidential angle or an angle specific to a batch of items 21, which may make it more difficult to create a counterfeit item.

Figure 5C:
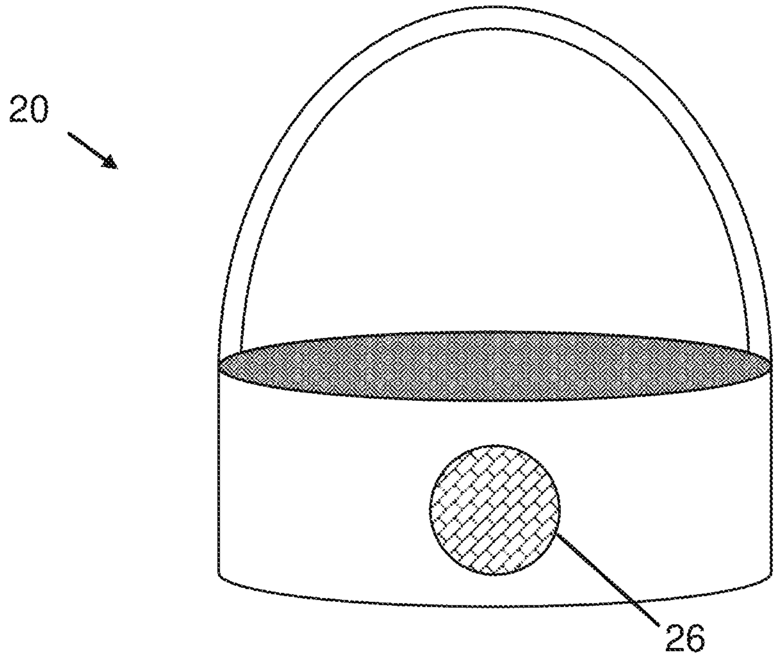
FIGS. 5C-D illustrate views of a purse physically associated with an authentication element, according to illustrative embodiments of the present disclosure.
Figure 5D:
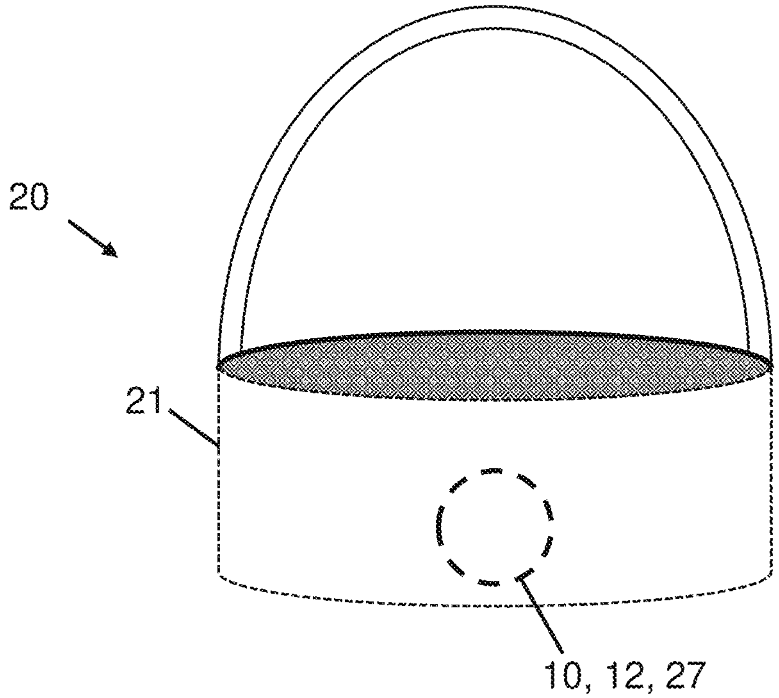

For example, a purse could be constructed with a metal medallion 26 containing a brand logo on one side of the purse and an authentication element that includes a stitched oval 27 on the other side (where the stitching is an encoding portion 12 of radio-opaque thread), as illustrated in FIGS. 5C-D (illustrating the two sides of the purse). This oval could be off-set below the level of the medallion such that when the purse is standing up, the two are not co-axial. An x-ray image of the purse parallel to the bottom of the purse would show both the logo and the oval, but not co-axial. However, if the x-ray was oriented at a specific angle, such as 30° from the plane parallel to the purse bottom, then the composite x-ray image would show the logo completely encircled by the radio-opaque thread.

In some embodiments, at least one encoding portion 12 may be intentionally oriented and located within an item 21 to display known images or patterns through imaging systems for a predefined relative orientations of two or more portions of the item 21. For example, when two or more portions of the item 21 are properly aligned, at least one encoding portion 12 may include a predefined undistorted image. As another example, multiple encoding portions 12 may interact with each other, wherein when two or more portions of the item 21 are properly aligned, the multiple encoding portions 12 may align to create a known composite image.

For example, a watch may be constructed with two authentication elements 10 stitched onto the strap, wherein the stitches are encoding portions 12 of radiopaque threads. An x-ray image of the watch would show the desired composite image, only if oriented properly. For example, if the watch is worn on a wrist, when the wrist is placed at a specific angle when imaged by an x-ray machine, the encoding portions 12 may align in a way that the predefined composite image is formed. In another example, the strap is placed on a mandrel of a predefined size which results in encoding portions to align in a way that the predefined composite image is formed. In some embodiments, the watch is set to a specific time, for an added security measure. Therefore, a watch may be authenticated if a predefined composite image is formed by x-ray and the watch shows a specific time. In some embodiments, an item 21 may include a size that may be swallowed in a material that may not be viewable on imaging systems, wherein at least one visibility-enhancing element 12 may allow a swallowed item 21 to be viewed on imaging systems. This may be particularly useful for human and pet toys that may be susceptible to swallowing by children and pets. For example, a small chew toy may include a material not visible through standard imaging systems and may include at least one visibility-enhancing element 12. If a dog swallows the chew toy, the at least one visibility-enhancing element 12 may allow a veterinarian to view where the chew toy may be located within the dog's body.

Figure 6:
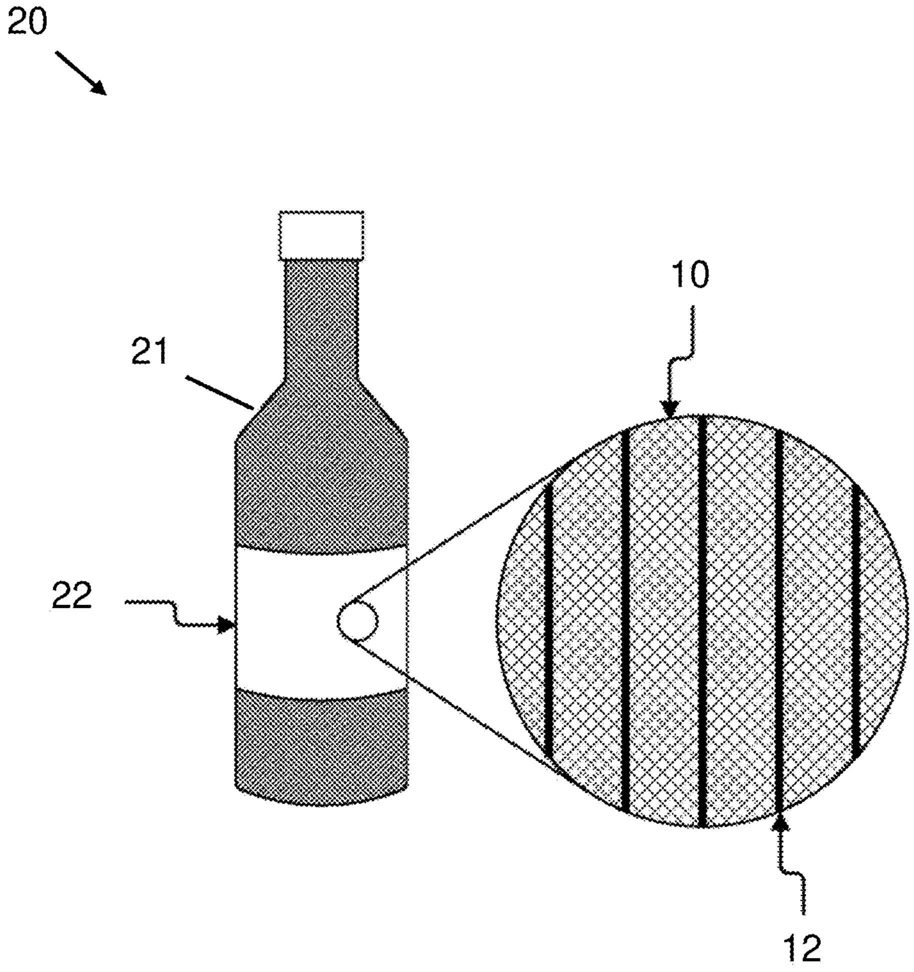
FIG. 6 illustrates an exemplary visibility-enhancing system including an item including at least one visibility-enhancing element, according to illustrative embodiments of the present disclosure.

Referring to FIG. 6, an exemplary visibility-enhancing system 20 including an item 21 including at least one visibility-enhancing element 12, according to some embodiments of the present disclosure, is illustrated. In some embodiments, at least one visibility-enhancing element 12 may be at least temporarily secured within or upon or may be at least temporarily integrated with or embedded within at least one portion of at least one item 21, wherein the item 21 may include at least one good, product, or document, such as, a handbag, product packaging, food packaging, artwork, currency, a product label, one or more bullets or other ammunition, a protection device, an article of clothing, or a piece of jewelry.

In some embodiments, at least one visibility-enhancing element 12 may include at least one fibrous material, such as, an amount of thread or amount of string, wherein at least a portion of the fibrous material may be doped or embedded with at least one contrasting agent before being at least temporarily secured to, integrated with, or embedded within at least one portion of at least one item 21 to facilitate the detection or visibility of the fibrous material in one or more imaging modalities, such as, an x-ray, MRI, or CT scan.

In some embodiments, the fibrous material may include at least one unique structural configuration, arrangement, or pattern, wherein the unique configuration may be formed by using one or more various stitching or threading techniques or styles, or by arranging the fibrous material as a unique patch or similar material structure, as non-limiting examples. In some embodiments, by forming a unique structural configuration using the fibrous material, a manufacturer, producer, or other source of the item 21 may integrate a unique design, symbol, pattern, or similar identification feature with the item 21 that may be substantially imperceptible by unassisted human eyesight, but may be detectable via at least one imaging modality.

In some embodiments, at least one visibility-enhancing element 12 may be added to one or more internal or external portions of at least one internal component 10 to facilitate the ability of the internal component 10 to be seen in one or more types of imaging, wherein one or more internal components 10 may be at least temporarily affixed to, integrated with, or embedded within at least one item 21. In some embodiments, this may allow the internal component 10 to include at least one visibility-enhancing element 12 in a structural configuration that includes at least one unique identifier that may be difficult or impossible to view or detect without at least one imaging device, making the structural configuration of the visibility-enhancing element difficult to replicate.

For example, at least one internal component 10 may be at least partially affixed to, integrated with, or embedded within at least one item 21, such as, the label 22 of a wine bottle 21. In some embodiments, the internal component 10 may include at least one visibility-enhancing element 12 that allows the internal component 10 to be observable or detectable via at least one imaging modality, such as x-ray imaging. In some embodiments, the label 22 of the wine bottle 21 may include a unique internal component 10 in the form of a mesh structure that may include at least one visibility-enhancing element 12 integrated therewith, wherein the unique configuration of the internal component 10 may indicate that the wine within the labeled bottle was produced by an indicated source.

By way of example, the internal component 10 including a mesh structure may include at least one visibility-enhancing element 12 in the form of at least one elongated fibrous material in a structural weaving configuration or configured as a tracer line, wherein at least a portion of the elongated fibrous material may be doped or embedded with at least one contrasting agent to facilitate its detection or visibility in one or more imaging modalities. In some embodiments, the presence of the unique internal component 10 may allow a purchaser of the wine to be able to confirm that the wine originated from the indicated source by scanning the label 22 of the wine bottle 21 with an x-ray imaging device to detect the expected location, position, orientation, and configuration of the unique internal component 10 associated with the indicated source. In some embodiments, this may allow consumers to verify that one or more purchased or otherwise obtained goods or products are likely to have been provided from the indicated source and are unlikely to be counterfeit or copycat items 21.

Figure 7A:
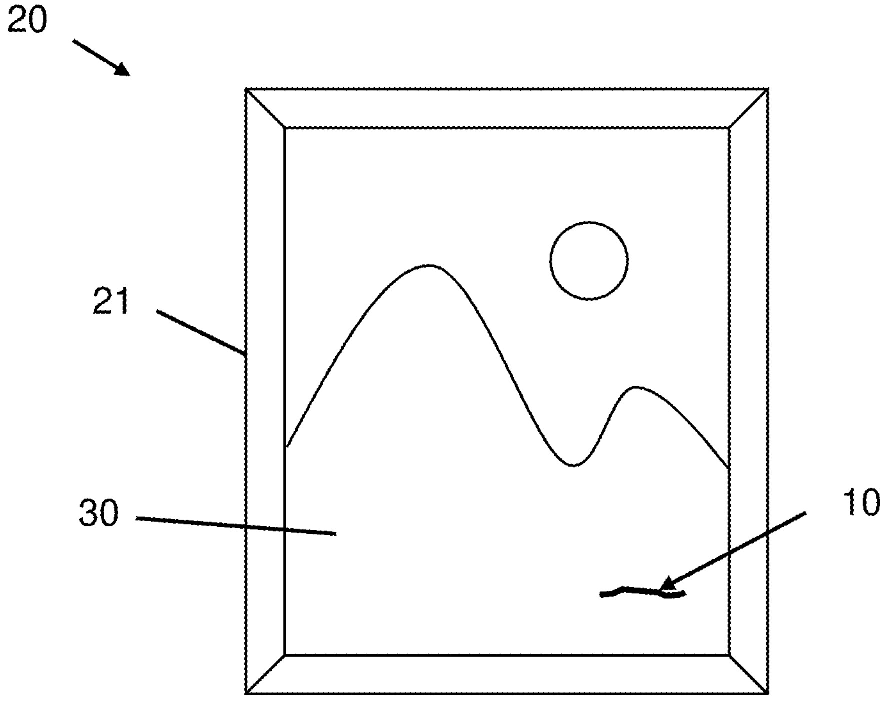
FIG. 7A illustrates an exemplary visibility-enhancing system including an item including at least one visibility-enhancing element, according to illustrative embodiments of the present disclosure.
Figure 7B:
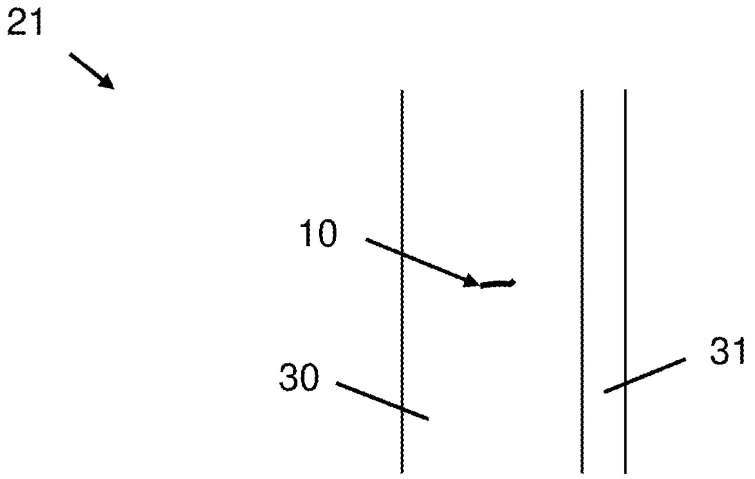
FIG. 7B shows an example of a cross section of the item including the authentication element, according to illustrative embodiments of the present disclosure.

Referring to FIG. 7A, an exemplary visibility-enhancing system 20 including an item 21 including at least one visibility-enhancing element 12, according to some embodiments of the present disclosure, is illustrated. FIG. 7B shows an example of a cross section of the item 21 including the authentication element 10. The item 21 includes a painting. The painting 21 includes a canvas 30 and a layer of paint 31. The authentication element 10 is integrated with or embedded within the canvas 30. In some embodiments, at least one visibility-enhancing element 12 may be at least temporarily affixed to, integrated with, or embedded within at least one portion of at least one item 21. In some embodiments, the visibility-enhancing element 12 may include at least one fibrous material, such as, an amount of thread or amount of string, wherein at least a portion of the fibrous material may be doped or embedded with at least one contrasting agent before being at least temporarily secured to, integrated with, or embedded within at least one portion of at least one item 21 to facilitate the detection or visibility of the fibrous material in one or more imaging modalities, such as, an x-ray, MRI, or CT scan.

In some embodiments, the fibrous material may include at least one unique structural configuration, arrangement, or pattern, wherein the unique configuration may be formed by using one or more various stitching or threading techniques or styles, or by arranging the fibrous material as a unique patch or similar material structure, as non-limiting examples. In some embodiments, by forming a unique structural configuration using the fibrous material, a manufacturer, producer, or other source of an item 21 may integrate a unique design, symbol, pattern, or similar identification feature with the item 21 that may be substantially imperceptible by unassisted human eyesight, but may be detectable via at least one imaging modality. In some embodiments, this may allow the item 21 to be authenticated as having been produced, manufactured, or otherwise provided by an indicated source when at least one imaging modality confirms the presence of the visibility-enhancing element 12 at an expected location in an expected orientation, position, or configuration. In some embodiments, the expected location, orientation, position, or configuration of the visibility-enhancing element 12 may be unknown to any entity other than the source of the item 21 due to the substantially imperceptible nature of the visibility-enhancing element 12 without the use of at least one imaging modality.

For example, at least one visibility-enhancing element 12 may be at least temporarily affixed to, integrated with, or embedded within at least one portion of at least one item 21, such as, a canvas painting 30. In some embodiments, the visibility-enhancing element 12 may be observable or detectable via at least one imaging modality, such as, via x-ray imaging. In some embodiments, the canvas 30 of the painting 21 may include a unique configuration of at least one visibility-enhancing element 12 in the form of at least one elongated fibrous material, such as, at least one thread, doped or embedded with at least one contrasting agent, wherein the visibility-enhancing element 12 may be used to partially form, for example the signature of the artist who produced the painting 21. In some embodiments, this may allow a purchaser of the painting 21 to be able to confirm that the painting 21 is likely an authentic, original work of the indicated artist by scanning the signature with an x-ray imaging device to reveal or detect the expected presence of the visibility-enhancing element 12 that may be associated with the indicated artist.

As an additional example, at least one visibility-enhancing element 12 may be at least temporarily affixed to, integrated with, or embedded within at least one portion of at least one item 21, such as crafting materials, for example embroidery activities. In some embodiments, the visibility-enhancing element 12 may be observable or detectable via at least one imaging modality, such as, via x-ray imaging. In some embodiments, a user may be equipped with a portable or wearable imaging device that may allow the user to view at least one imaging modality, such as x-ray imaging, of a viewing area when performing embroidery tasks, such that when a user may use at least one thread including a visibility-enhancing element 12 to sew or stitch within an item 21, the user may more easily view the thread including the visibility-enhancing element 12.

Figure 8A:
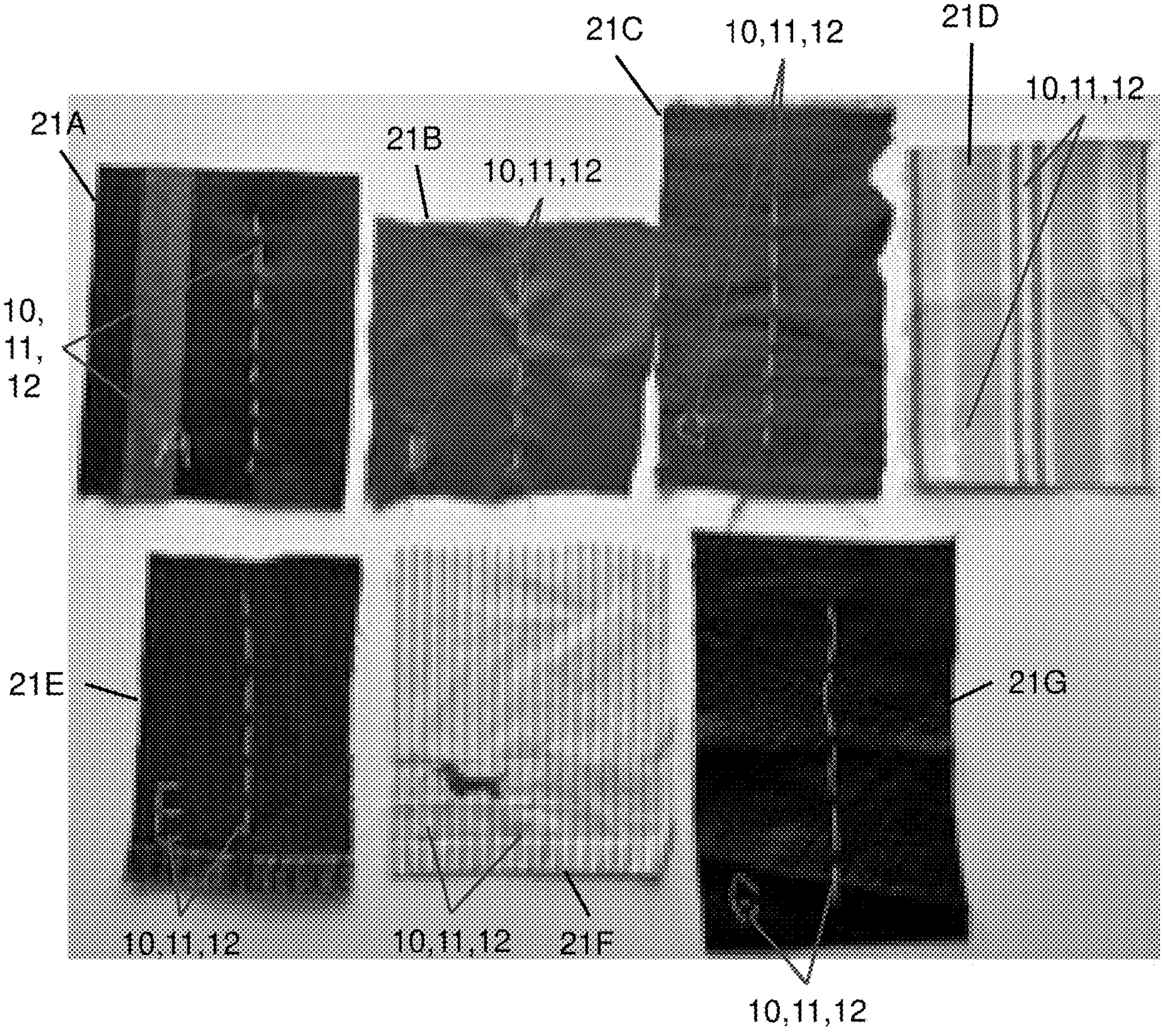
FIG. 8A shows multiple examples of items including authentication elements, according to illustrative embodiments of the present disclosure.
Figure 8B:
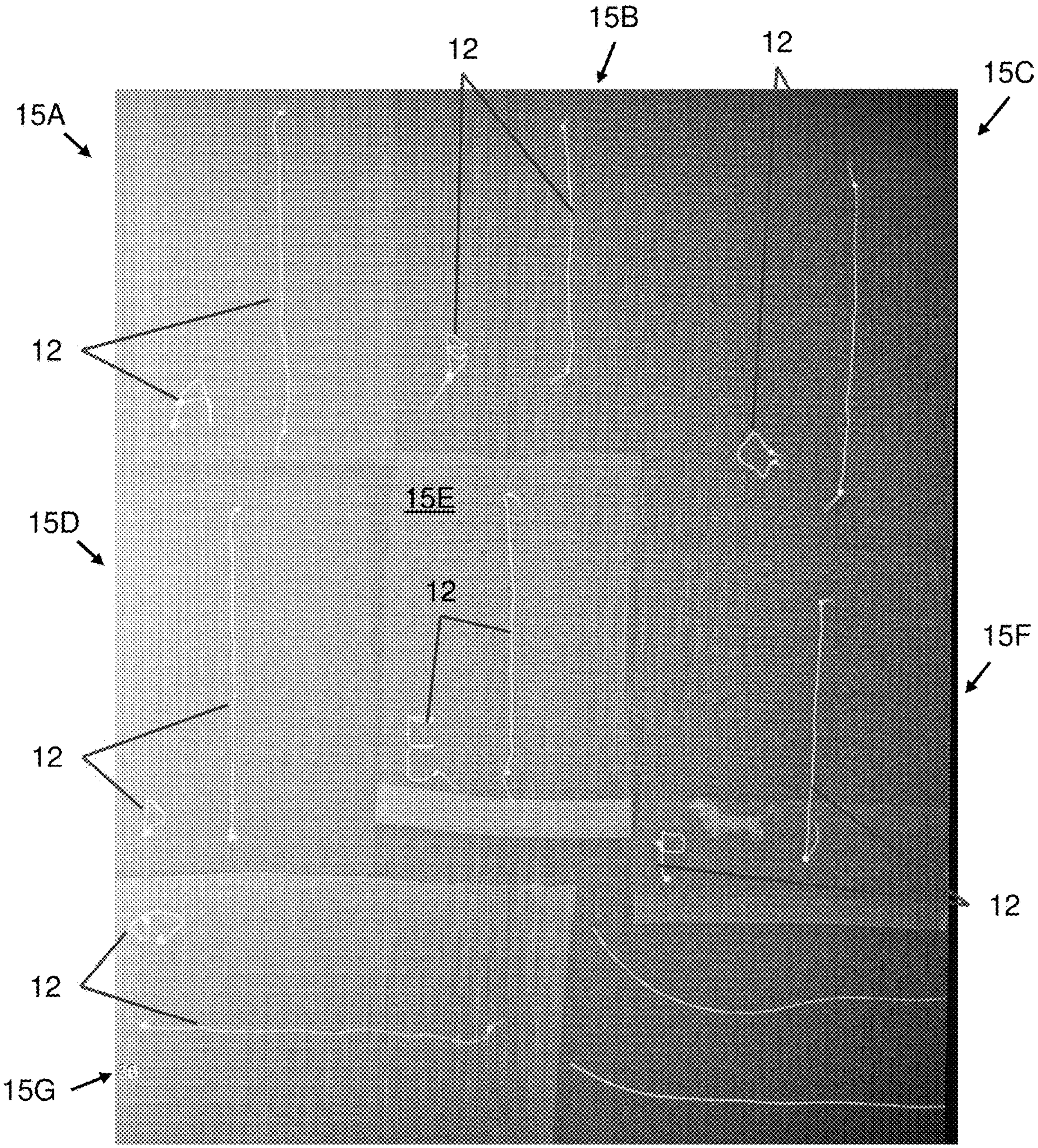
FIG. 8B shows x-ray images of the items including authentication elements of FIG. 8A.

Referring to FIG. 8A, multiple examples of items 21A-G including authentication elements 10 are illustrated. In these examples, the items 21A-G are varying types of textiles. The authentication elements 10 include threads 11 that are stitched into the textiles 21A-G. Each textiles 21A-G includes two threads 10, one stitched as a line and one stitched as a shape of a letter A to G. The radiopaque encoding portions 12 are woven into the threads 11. FIG. 8B shows x-ray images 15 of the textiles 21A-G of FIG. 8A. The threads 11 that include encoding portions 12 are much brighter and therefore discernable from the threads of the textile 12A-G. FIGS. 8A and B illustrate the use of authentication elements in textiles. For example, a thread that includes encoding portion 12 may be used when embroidering a logo onto a textile, and therefore the textile authenticated by the encoding portion of the logo that appears in an x-ray image. Textile 21A is a plastic faux leather ("pleather"). Textile 21B is nylon. Textile 21C is silk (shantung). Textile 21D is cotton twill (similar to canvas). Textile 21E is denim. Textile 21F is cotton (shirting). Textile 21G is genuine leather.

Figure 9A:
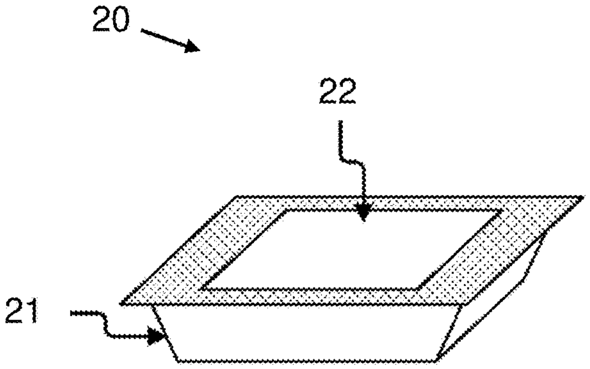
FIG. 9A illustrates an exemplary visibility-enhancing system including at least one item including at least one visibility-enhancing element, according to illustrative embodiments of the present disclosure.
Figure 9B:
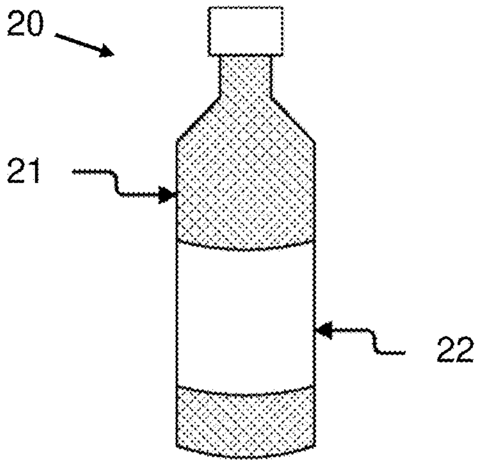
FIG. 9B illustrates an exemplary visibility-enhancing system including at least one item including at least one visibility-enhancing element, according to illustrative embodiments of the present disclosure.
Figure 9C:
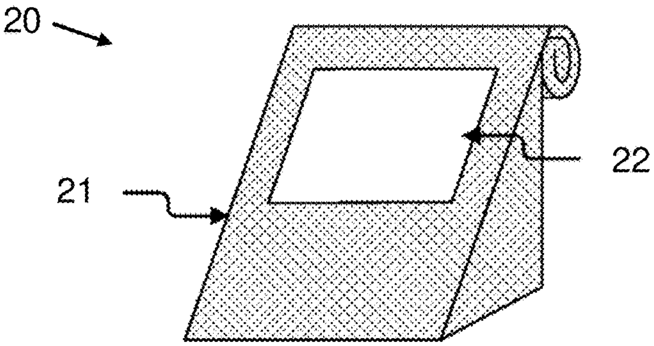
FIG. 9C illustrates an exemplary visibility-enhancing system including at least one item including at least one visibility-enhancing element, according to illustrative embodiments of the present disclosure.

Referring to FIGS. 9A-9C, exemplary visibility-enhancing systems 20 including at least one item 21 including at least one visibility-enhancing element 12, according to some embodiments of the present disclosure, are illustrated. In some embodiments, at least one visibility-enhancing element may be at least temporarily affixed to, integrated with, or embedded within at least one portion of least one item. In some embodiments, the visibility-enhancing element 12 may include at least one fibrous material, such as, an amount of thread or amount of string, wherein at least a portion of the fibrous material may be doped or embedded with at least one contrasting agent before being at least temporarily secured to, integrated with, or embedded within at least one portion of at least one item 21 to facilitate the detection or visibility of the fibrous material in one or more imaging modalities, such as, an x-ray, MRI, or CT scan.

In some embodiments, the fibrous material may include at least one unique structural configuration, arrangement, or pattern, wherein the unique configuration may be formed by using one or more various stitching or threading techniques or styles, or by arranging the fibrous material as a unique patch or similar material structure, as non-limiting examples. In some embodiments, by forming a unique structural configuration using the fibrous material, a manufacturer, producer, or other source of an item 21 may integrate a unique design, symbol, pattern, or similar identification feature with the item 21 that may be substantially imperceptible by unassisted human eyesight, but may be detectable via at least one imaging modality. In some embodiments, this may allow the item 21 to be authenticated as having been produced, manufactured, or otherwise provided by an indicated source when at least one imaging modality confirms the presence of the visibility-enhancing element 12 at an expected location in an expected orientation, position, or configuration. In some embodiments, the expected location, orientation, position, or configuration of the visibility-enhancing element 12 may be unknown to any entity other than the source of the item 21 due to the substantially imperceptible nature of the visibility-enhancing element 12 without the use of at least one imaging modality.

For example, at least one visibility-enhancing element 12 may be at least temporarily affixed to, integrated with, or embedded within at least one portion of at least one item 21, such as at least one portion of at least one type of packaging for one or more foodstuffs or beverages. In some embodiments, the visibility-enhancing element 12 may be observable or detectable via at least one imaging modality, such as, via x-ray imaging.

In some embodiments, the packaging 21 may include a unique configuration of at least one visibility-enhancing element 12 in the form of at least one elongated fibrous material, such as, at least one thread, doped or embedded with at least one contrasting agent, wherein the visibility-enhancing element 12 may be configured in a unique location, position, orientation, or configuration associated with and known by the indicated source of the foodstuff(s) or beverage(s) within the packaging 21. In some embodiments, this may allow a purchaser of the foodstuff(s) or beverage(s) to be able to confirm that the foodstuff(s) or beverage(s) were produced by or otherwise originated from the indicated source by scanning at least one portion of the packaging 21 with an x-ray imaging device to reveal or detect the expected presence of the at least one visibility-enhancing element 12 that may be associated with the indicated source.

Figure 10:
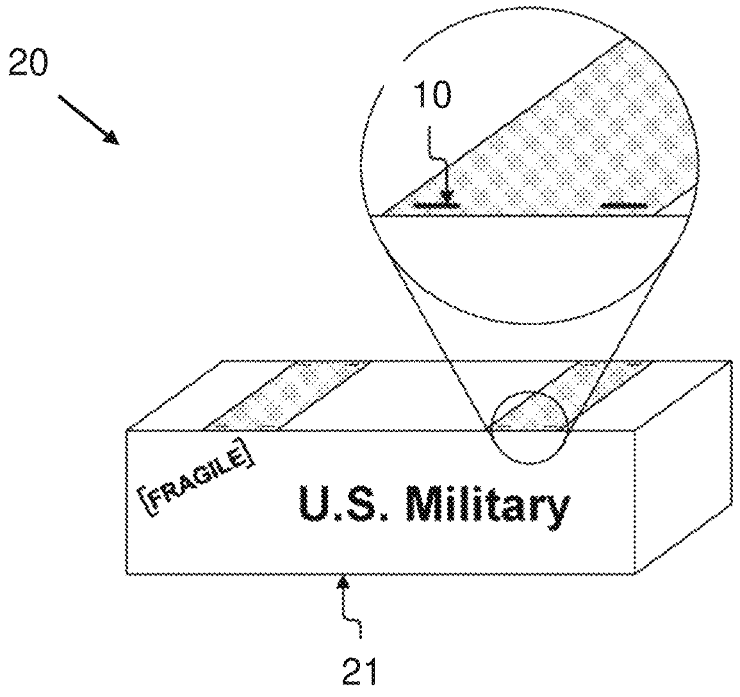
FIG. 10 illustrates an exemplary visibility-enhancing system including an item including at least one visibility-enhancing element, according to illustrative embodiments of the present disclosure.

Referring to FIG. 10, an exemplary visibility-enhancing system 20 including an item 21 including at least one visibility-enhancing element 10, according to some embodiments of the present disclosure, is illustrated. In some embodiments, at least one visibility-enhancing element 10 may be at least temporarily affixed to, integrated with, or embedded within at least one portion of at least one item 21. In some embodiments, the visibility-enhancing element 10 may include one or more substantially rigid particles or pieces or one or more metallic elements, such as, one or more staples or metallic particles, wherein the rigidity and/or material composition of the particles, pieces, or elements may facilitate the detection or visibility thereof in one or more imaging modalities, such as, an x-ray, MRI, or CT scan.

In some embodiments, the at least one visibility-enhancing element 12 may include at least one unique structural configuration, arrangement, or pattern, as non-limiting examples. In some embodiments, by forming a unique structural configuration using the visibility-enhancing elements 12, a manufacturer, producer, or other source of an item 21 may integrate a unique design, symbol, pattern, or similar identification feature with the item 21 that may be substantially imperceptible by unassisted human eyesight, but may be detectable via at least one imaging modality.

In some embodiments, this may allow the item 21 to be authenticated as having been produced, manufactured, or otherwise provided by an indicated source when at least one imaging modality confirms the presence of the visibility-enhancing element 12 at an expected location in an expected orientation, position, or configuration. In some embodiments, the expected location, orientation, position, or configuration of the visibility-enhancing element 12 may be unknown to any entity other than the source of the item 21 due to the substantially imperceptible nature of the visibility-enhancing element 12 without the use of at least one imaging modality.

For example, at least one visibility-enhancing element 12 may be at least temporarily affixed to, integrated with, or embedded within at least one portion of at least one item 21, such as, a shipment container 21 including one or more goods. In some embodiments, the visibility-enhancing element 12 may be observable or detectable via at least one imaging modality, such as, via x-ray imaging. In some embodiments, the shipment container 21 may include a unique configuration of at least one visibility-enhancing element 12 in the form of at least one substantially rigid metallic piece, such as, at least one staple, wherein the visibility-enhancing element 12 may be configured in a unique location, position, orientation, or configuration associated with the indicated source of the goods within the shipment container 21. In some embodiments, this may allow a customs agent or similar authority official to be able to confirm that the goods within the shipment container 21 were produced by or otherwise originated from the indicated source by scanning at least one portion of the shipment container 21 that includes the at least one visibility-enhancing element 12 with an x-ray imaging device to reveal or detect the expected presence of the visibility-enhancing element 12 that may be associated with the indicated source.

As another example, at least one visibility-enhancing element 12 may be at least temporarily affixed to, integrated with, or embedded within at least one portion of at least one item 21, such as, a shipment container 21 including one or more goods. In some embodiments, the visibility-enhancing element 12 may be observable or detectable via at least one imaging modality, such as, via x-ray imaging.

In some embodiments, one or more of the goods inside the shipment container 21 may also include at least one visibility-enhancing element 12, such that at least one imaging device, for example, an x-ray imaging device, may be used to determine the configuration or orientation of such goods within the shipment container 21. In some embodiments, this may allow a user to locate or identify each good within the shipment container 21 without having to open the shipment container 21, which may be convenient for the user or may facilitate more efficient productivity for the user, as non-limiting examples.

Figure 11:
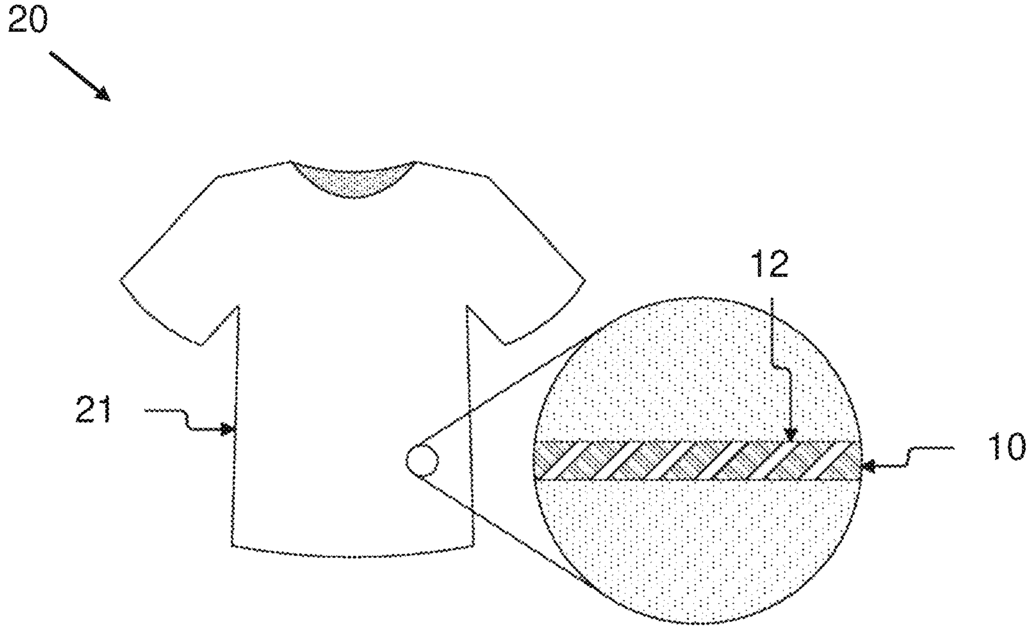
FIG. 11 illustrates an exemplary visibility-enhancing system including an item including at least one internal component including at least one visibility-enhancing element, according to illustrative embodiments of the present disclosure.

Referring to FIG. 11, an exemplary visibility-enhancing system 20 including an item 21 including at least one internal component 10 including at least one visibility-enhancing element 12, according to some embodiments of the present disclosure, is illustrated. In some embodiments, at least one visibility-enhancing element 12 may be temporarily affixed to, integrated with, or embedded within at least one portion of at least one item 21.

In some embodiments, the visibility-enhancing element 12 may include at least one fibrous material, such as, an amount of thread or amount of string, wherein at least a portion of the fibrous material may be doped or embedded with at least one contrasting agent before being at least temporarily secured to, integrated with, or embedded within at least one portion of at least one item 21 to facilitate the detection or visibility of the fibrous material in one or more imaging modalities, such as, an x-ray, MRI, or CT scan.

In some embodiments, the fibrous material may include at least one unique structural configuration, arrangement, or pattern, wherein the unique configuration may be formed by using one or more various stitching or threading techniques or styles, or by arranging the fibrous material as a unique patch or similar material structure, as non-limiting examples. In some embodiments, by forming a unique structural configuration using the fibrous material, a manufacturer, producer, or other source of an item 21 may integrate a unique design, symbol, pattern, or similar identification feature with the item 21 that may be substantially imperceptible by unassisted human eyesight, but may be detectable via at least one imaging modality.

In some embodiments, this may allow the item 21 to be authenticated as having been produced, manufactured, or otherwise provided by an indicated source when at least one imaging modality confirms the presence of the visibility-enhancing element 12 at an expected location in an expected orientation, position, or configuration. In some embodiments, the expected location, orientation, position, or configuration of the visibility-enhancing element 12 may be unknown to any entity other than the source of the item 21 due to the substantially imperceptible nature of the visibility-enhancing element 12 without the use of at least one imaging modality.

In some embodiments, at least one visibility-enhancing element 12 may be added to one or more internal or external portions of at least one internal component 10 to facilitate the ability of the internal component 10 to be seen in one or more types of imaging, wherein one or more internal components 10 may be at least temporarily affixed to, integrated with, or embedded within at least one item 21. In some embodiments, this may allow the internal component 10 to include at least one visibility-enhancing element 12 in a structural configuration that includes at least one unique identifier that may be difficult or impossible to view or detect without at least one imaging device, making the structural configuration of the visibility-enhancing element 12 difficult to replicate.

For example, at least one internal component 10 including at least one visibility-enhancing element 12 may be at least temporarily affixed to, integrated with, or embedded within at least one portion of at least one item 21, such as, an article of clothing 21. In some embodiments, the visibility-enhancing element 12 may allow the internal component 10 to be partially observable or detectable via at least one imaging modality, such as, via x-ray imaging.

In some embodiments, the article of clothing 21 may include at least one internal component 10 that includes a unique configuration of at least one visibility-enhancing element 12 in the form of at least one elongated fibrous material, such as, at least one thread, doped or embedded with at least one contrasting agent, wherein the internal component 10 may be configured in a unique location, position, orientation, or configuration upon or within the article of clothing 21 associated with the indicated source thereof. In some embodiments, this may allow a purchaser of the article of clothing 21 to be able to confirm that the article of clothing 21 was produced or manufactured by, or otherwise originated from the indicated source by scanning at least one portion of the article of clothing 21 including the at least one internal component 10 with an x-ray imaging device to reveal or detect the expected presence of the internal component 10 that may be associated with the indicated source.

As another example, at least one internal component 10 including at least one visibility-enhancing element 12 may be at least temporarily affixed to, integrated with, or embedded within at least one portion of at least one item 21, such as, an article of clothing. In some embodiments, the visibility-enhancing element 12 may allow the internal component 10 to be at least partially observable or detectable via at least one imaging modality, such as, via x-ray imaging. In some embodiments, the article of clothing 21 may include at least one internal component 10 that includes a unique configuration of at least one visibility-enhancing element 12 in the form of at least one elongated fibrous material, such as, at least one thread, doped or embedded with at least one contrasting agent, wherein the internal component 10 may be configured in a unique location, position, orientation, or configuration upon or within the article of clothing 21 associated with at least one predetermined aspect of the wearer thereof, such as military status, employment status, or other identity or authority indicating aspects. In some aspects, this may facilitate an identification and/or authority status of the wearer of the article of clothing 21, such as to identify an individual as being a member of a military unit or organization, wherein scanning at least one portion of a uniform including the article of clothing 21 including the internal component 10 using an imaging device, such as, an x-ray imaging device, may confirm the expected presence of the internal component 10 and thereby indicate that the wearer is likely to be a member of the military.

Figure 12:
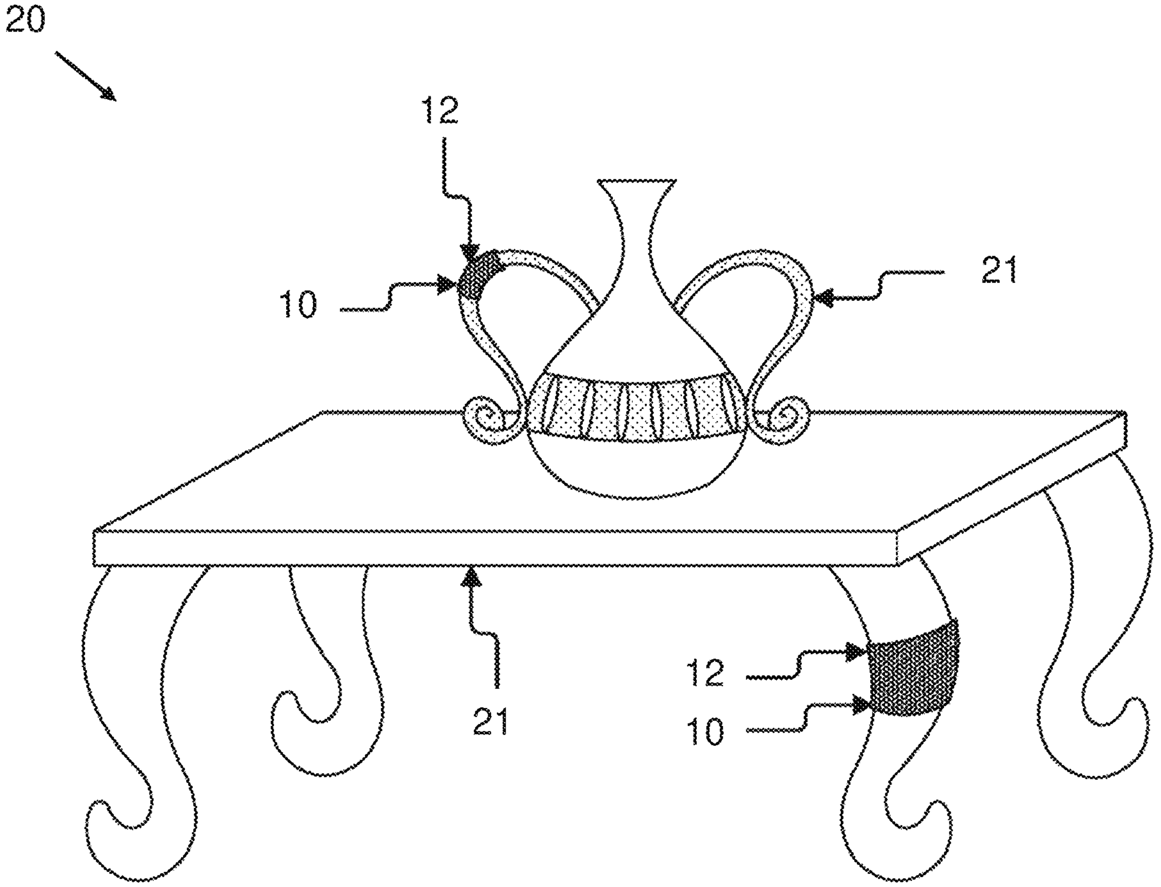
FIG. 12 illustrates an exemplary visibility-enhancing system including at least one item including at least one internal component including at least one visibility-enhancing element, according to illustrative embodiments of the present disclosure.

Referring to FIG. 12, an exemplary visibility-enhancing system 20 including at least one item 21 including at least one internal component including at least one visibility-enhancing element 12, according to some embodiments of the present disclosure, is illustrated. In this example, one item 21 is a table that includes a first internal component and one item 21 is an antique vase that includes a second internal component. In some embodiments, at least one internal component 10 may be at least temporarily affixed to, integrated with, or embedded within at least one portion of at least one item 21. In some embodiments, the internal component 10 may include at least one plastic material, such as, an amount of silicone, nylon, UHMWPE, or polypropylene, as non-limiting examples, wherein they plastic material may include a structure that includes a strip, strap, particle, nanoparticle, bead, sphere, elongated member, or any other appropriate configuration. In some embodiments, at least a portion of the internal component 10 may include with at least one visibility-enhancing element 12, wherein the visibility-enhancing element 12 may include one or more particles, substances, elements, or compounds to facilitate at least partial detection or visibility of at least one portion of the internal component 10 in one or more imaging modalities, such as, an x-ray, MRI, or CT scan.

In some embodiments, the internal component 10 including at least one visibility-enhancing element 12 may be substantially imperceptible via unassisted human eyesight, but may be detectable via at least one imaging modality. In some embodiments, this may allow at least one item 21 to be authenticated as having been produced, manufactured, or otherwise provided by an indicated source when at least one imaging modality confirms the presence of the internal component 10 including the visibility-enhancing element 12 at an expected location in an expected orientation, position, or configuration. In some embodiments, the expected location, orientation, position, or configuration of the visibility-enhancing element 12 of the internal component 10 may be unknown to any entity other than the source or provider of the item 21 due to the substantially imperceptible nature of the visibility-enhancing element without the use of at least one imaging modality.

As an example, at least one internal component 10 including at least one visibility-enhancing element 12 may be at least temporarily affixed to, integrated with, or embedded within at least one portion of at least one item 21, such as, at least one antique item. In some embodiments, the visibility-enhancing element 12 may allow the internal component 10 to be at least partially observable or detectable via at least one imaging modality, such as, via x-ray imaging.

In some embodiments, the antique item 21 may include at least one internal component 10 that includes at least one visibility-enhancing element 12, wherein the visibility-enhancing element 12 of the internal component 10 may be configured in a unique location, position, orientation, or configuration upon or within the internal component 10 associated with the indicated source or provider of the antique item 21, such as, an antique appraiser or other professional with similar expertise. In some embodiments, this may allow a purchaser of the antique item 21 to be able to confirm that the antique item 21 was deemed to be authenticate and valuable by an expert in the field by scanning at least one portion of the antique item 21 including the at least one internal component 10 with an x-ray imaging device to reveal or detect the expected presence of the visibility-enhancing element 12 that may be associated with the antique appraiser.

Figure 13:
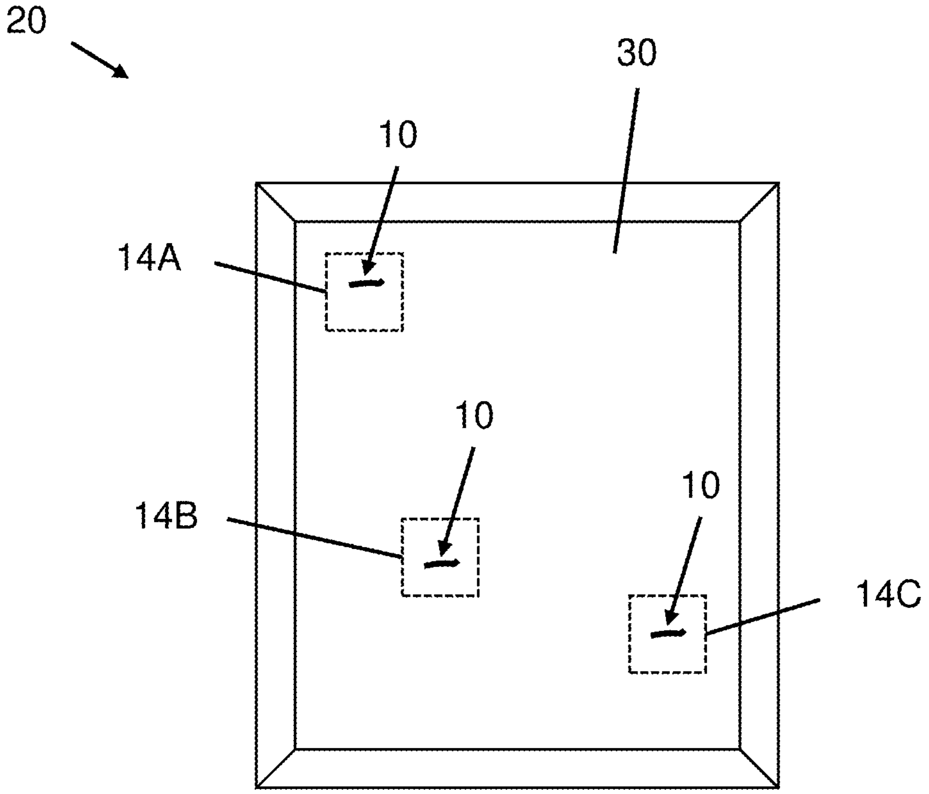
FIG. 13 shows an example of an authentication system including predefined locations for an authentication element, according to illustrative embodiments of the present disclosure.

FIG. 13 shows an example of an authentication system 20 including authentication elements 10 at different locations 14A-C for an authentication element 10. The authentication system 20 includes a painting canvas 30 and authentication elements 10 disposed at locations 14A-C. Each authentication element 10 may be identical (e.g., encoding a same at least a portion of an authentication code) or different ones may be different (e.g., each encoding a distinct portion of an authentication code). The number and positions of the locations 14A-C may be used as an additional security feature, for example corresponding to a specific art dealer or gallery or a specific artist (e.g., painter). For example, canvases 30 that are provided to one artist for use in making art may include authentication elements at a unique set of locations 14A-C which are different from locations 14A-C for canvases 30 that are provided to another artist, even if the at least a portion of an authentication code that is encoded by the authentication elements is the same for both artists (e.g., because the artists use the same gallery or registry for their works). In some embodiments, the set of locations 14A-C may only be disclosed to the buyer and/or receiver of the painting canvas to authenticate the painting.

Figure 14A:
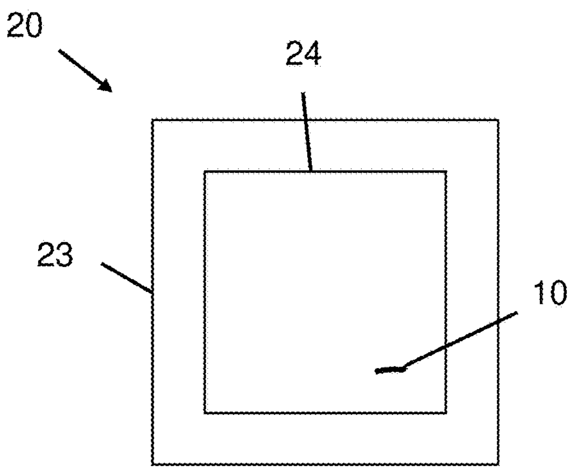
FIG. 14A shows an example of an authentication system including an outer container and an inner object, according to illustrative embodiments of the present disclosure.

FIG. 14A shows an example of an authentication system 20 including an outer container 23 and an inner object 24 disposed in the outer container 23. In this case, the outer container 23 is enclosed. There is an authentication element 10 physically associated with the inner object 24. In this example, the outer container 23 is an envelope and the inner object 24 is a document. The document may be folded (e.g., in a bi-fold or tri-fold). The document 24 may be authenticated while inside the envelope 23. As an example, the document 24 may include confidential information, and the authentication element 10 may enable authentication of the document 24 at different points of transit without the risk of information exposure. In some embodiments, the authentication element 10 may simply allow authentication without the inconvenience of having to open the outer container 23, thereby allowing in-line processing.

Figure 14B:
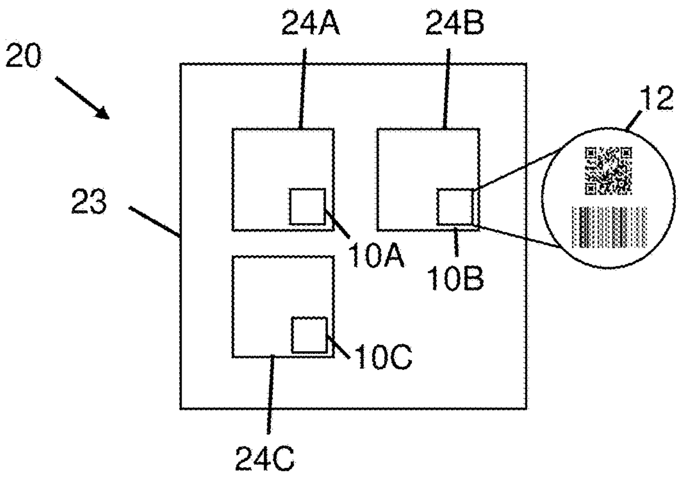
FIG. 14B shows an example of an authentication system including an outer container and multiple inner objects, according to illustrative embodiments of the present disclosure.

FIG. 14B shows an example of an authentication system 20 including an outer container 23 and inner objects 24A-C disposed inside the outer container. The objects 24A-C each include an authentication element 10A-C, respectively. Each of the authentication elements 10A-C includes one or more encoding portions 12 that encode at least a portion of an authentication code as a QR code or barcode. The QR codes or barcodes may be identical to each other or different ones may be different (e.g., one or more may each be unique).

Figure 14C:
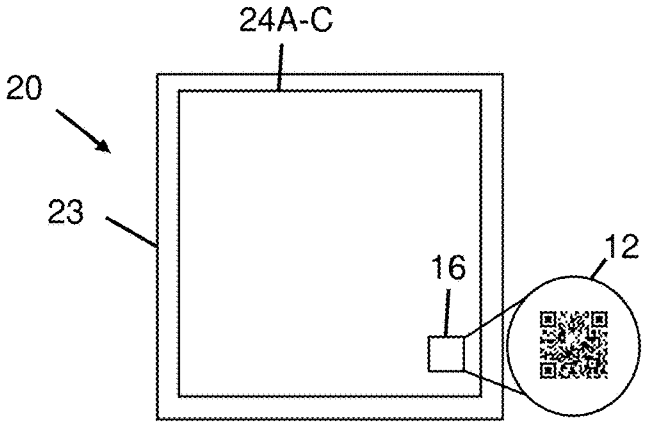
FIG. 14C shows an example of an authentication system including an outer container and multiple inner objects, according to illustrative embodiments of the present disclosure.
Figure 14D:
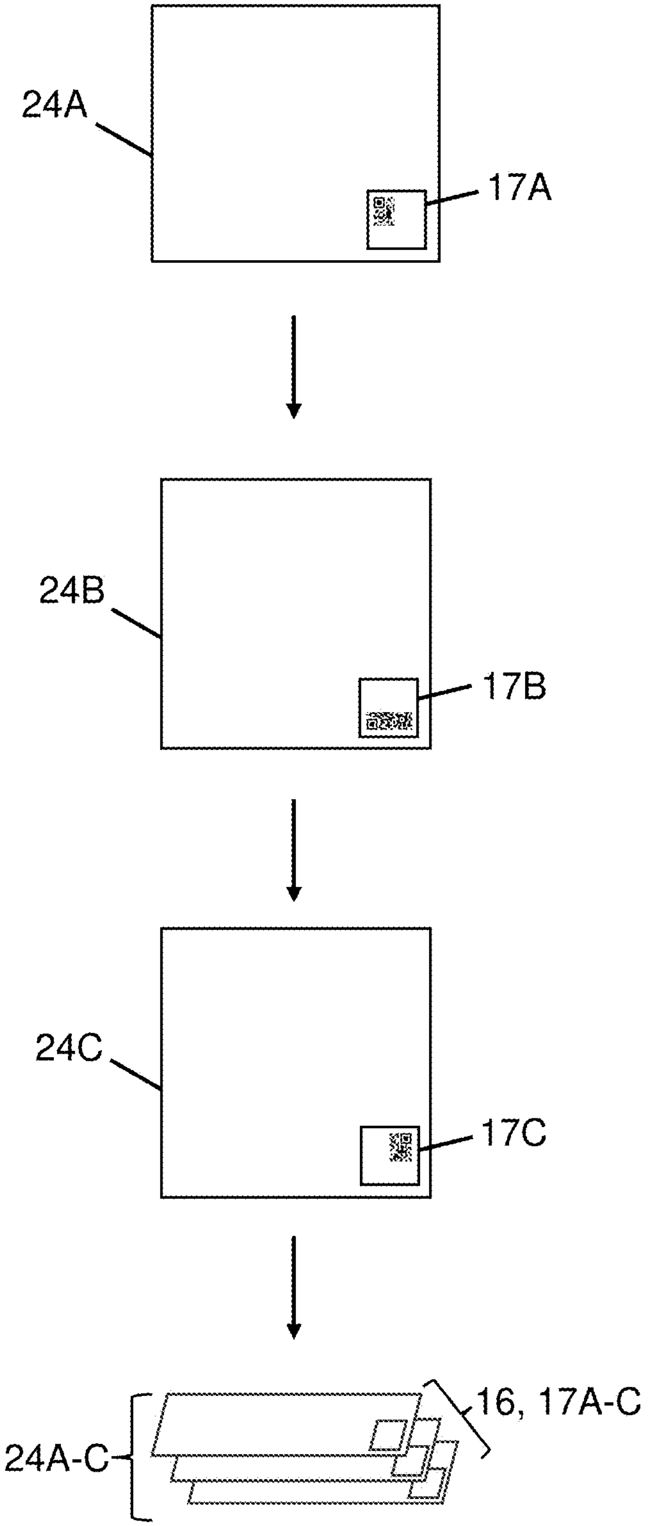
FIG. 14D shows examples of multiple inner objects, according to illustrative embodiments of the present disclosure.

FIG. 14C shows an example of an authentication system 20 including an envelope 23 and pages 24A-C of a document disposed inside the envelope 23. The pages 24A-C are in an ordered stack. The pages 24A-C each include a distinct portion 17A-C, respectively, of a composite authentication element 16 that is readable when the pages are present in a stack, as illustrated in FIG. 14D (with arrows indicating stacking of pages). The composite authentication element 16 encodes at least a portion of an authentication code 13 as a radiopaque QR code. Composite authentication element 16 is only readable when all pages are present in a stack in the correct orientation, as shown in FIG. 14C. However, notably, the order of pages 24A-C does not matter (so long as they are correctly oriented and positioned, for example due to a size and shape of envelope 23) since the QR code will be readable two-dimensionally. The distinct portions 17A-C of the composite authentication element 16 are shown in FIG. 14D but other divisions may be used, for example where pixels in a QR code are divided into proper subsets that do not necessarily correspond to distinct regions. For example, every other pixel may be in a distinct portion if two distinct portions are used or every third pixel may be in a distinct portion if three distinct portions are used.

Figure 15:
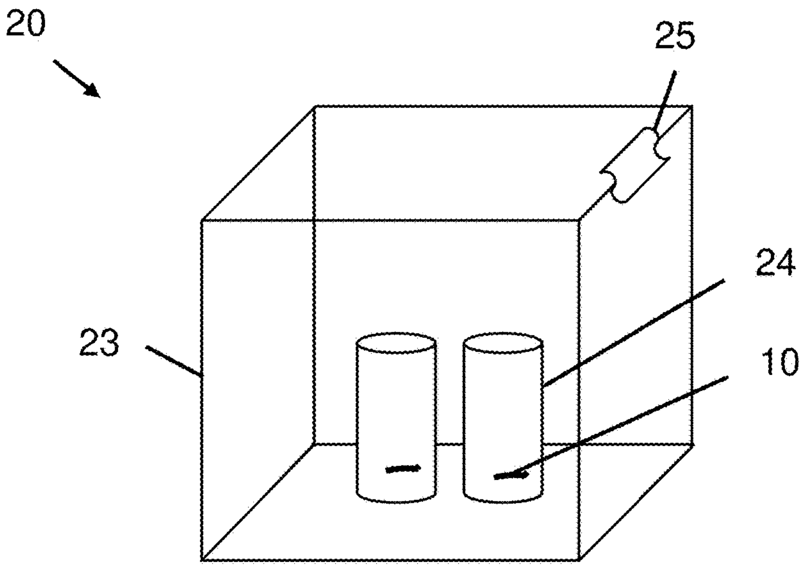
FIG. 15 shows an example of an authentication system including an outer container and multiple inner objects, according to illustrative embodiments of the present disclosure.

FIG. 15 shows an example of an authentication system 20 including an outer container 23 and one or more inner objects 24. Each inner object 24 is physically associated with an authentication element 10 that encodes at least a portion of an authentication code. In this example, the outer container 23 is a box and the inner object 24 includes a packaged good or product. The box 23 is sealed by a tamper-proof mechanism 25. The tamper-proof mechanism 25 may be a label. In some embodiments, the inner object 24 may be authenticated inside the box 23, while the tamper-proof mechanism 25 remains intact, for example using x-rays, radio waves, or sound waves applied through the box 23. As an example, there may be confidentiality and/or security concerns for inner objects 24, and the authentication element 10 may enable authentication of the inner objects 24 at different points of transit without the risk of exposing the confidential and/or sensitive nature of the inner objects 24. As another example, the inner objects 24 may include or be delicate and/or specialized articles that require specialized packaging, and authentication system 20 may eliminate the need to unpack the article and the resulting possible damages in order to authenticate the inner objects 24 (e.g., during storage and/or transit and/or at time of purchase).

Figure 16:
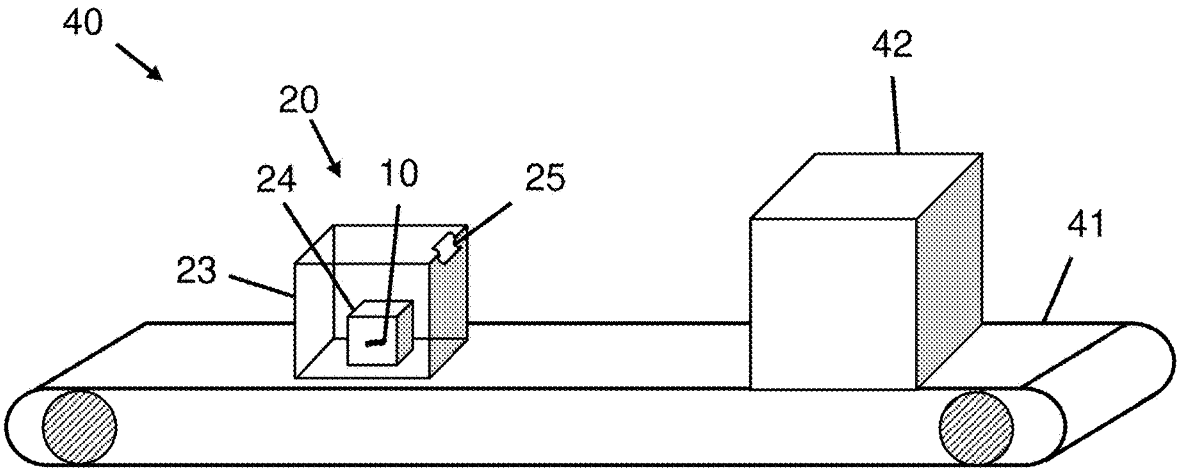
FIG. 16 shows an exemplary setup to authenticate an object, according to illustrative embodiments of the present disclosure.

FIG. 16 shows an exemplary system 40 to authenticate an object 24. The system 40 includes an authentication system 20, an authentication element reading device 42 and a conveyor belt 41. The authentication system includes an outer container 23 sealed by a tamper-proof mechanism 25 and an inner object 24 disposed inside of the outer container 23. The inner object 24 is physically associated with an authentication element 10. In this example, the outer container 23 is a box and the inner object 24 may is a good or product (e.g., a packaged good or product). In some embodiments, the box 23 may be placed on a conveyor belt 41 to move through the authentication element reading device 42 (e.g., an imaging device). The conveyor belt 41 may be one that already exists, for example, is used in part of a logistics process such that the authentication element reading device 42. In this example, the authentication element reading device 42 is an x-ray machine that includes a radiation emitting source and a radiation detector through which the authentication system 20 travels on the conveyor belt 41. The x-ray machine 42 may read the authentication element 10 (e.g., by receiving signal produced from the authentication element 10 upon exposure of the authentication element 10 to x-rays) while the inner object 24 is inside the box and the tamper-proof mechanism 25 remains intact.

Figure 17:
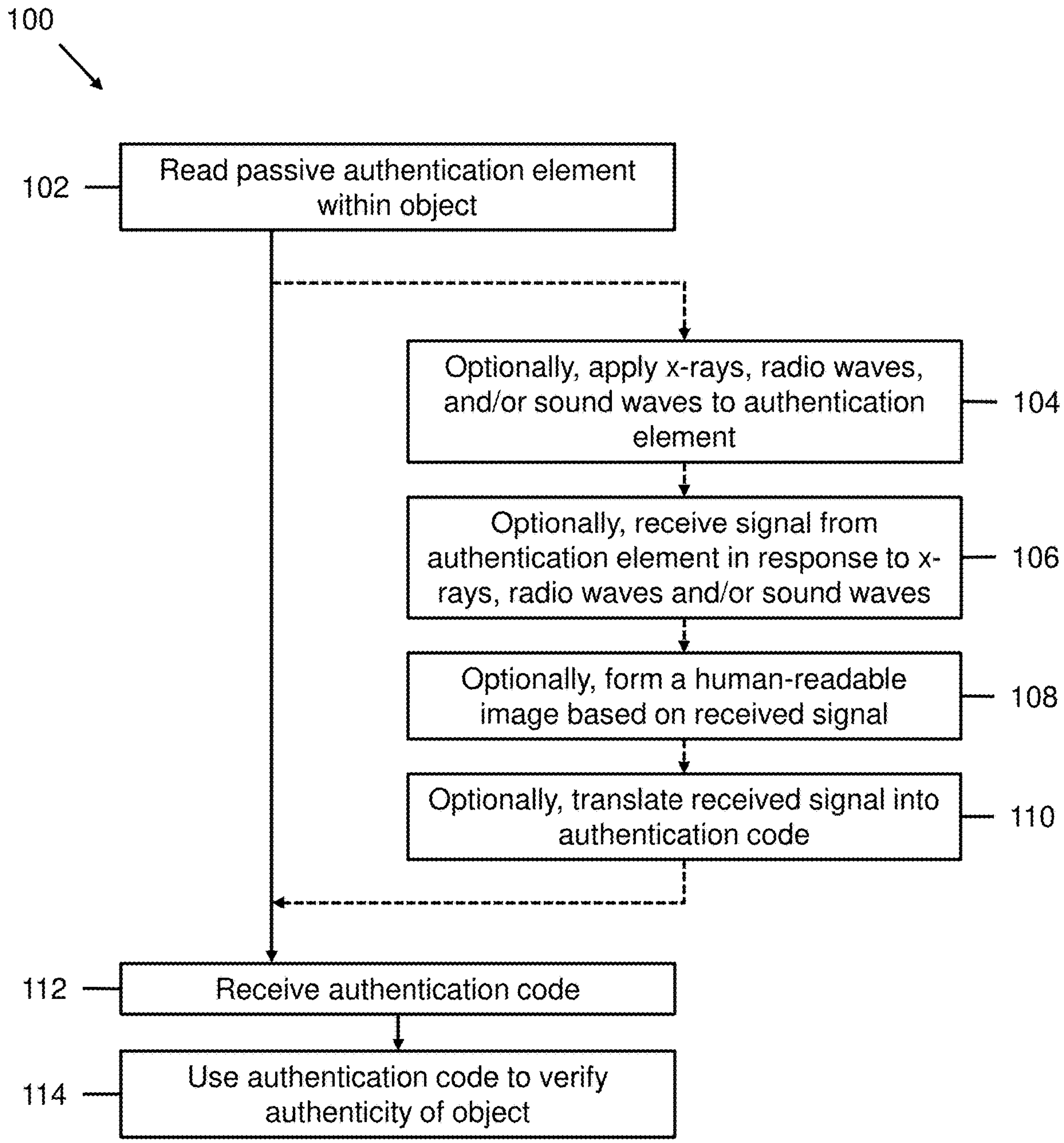
FIG. 17 illustrates a flow diagram of an exemplary method, according to illustrative embodiments of the present disclosure.

FIG. 17 illustrates an exemplary method 100 of verifying authenticity of an object. In step 102, a passive authentication element encoding an authentication code and physically associated with (e.g., within) an object is read. Part or all of an optional subroutine starting at optional step 104 may be performed as part of step 102. In optional step 104, a probe (e.g., x-rays, radio waves, and/or sound waves) are applied to the authentication element. In optional step 106, signal is received from the authentication element in response to the x-rays, radio waves, and/or sound waves, for example at one or more detectors. In optional step 108, a human-readable image is formed based on the received signal from step 106. For example, an x-ray image that can be interpreted by a human may be formed if x-rays are used in steps 104-106. In step 110, the received signal from step 106 is translated into the authentication code. In some embodiments, performance of step 110 is accomplished by performing step 108. In some embodiments, only one of step 108 and step 110, and not both, is performed. In some embodiments, optional step 110 includes processing a human-readable image formed in step 108, for example may include processing a QR code. In step 112, an authentication code is received based on the reading in step 102. In some embodiments, optional step 110 is performed and the authentication code based on the outcome of step 110. In step 114, the authentication code is used to verify authenticity of the object (e.g., by comparing the authentication code to an authentication code registered in a registry).

Without limitation to the foregoing description, the following is an enumerated list of non-limiting exemplary embodiments included in the present disclosure. Those of ordinary skill in the art will appreciate that one or more features discussed above may be included with or incorporated into any of the following numbered embodiments to form additional embodiments.

1. An object that can be authenticated, wherein the object is physically associated with an authentication element, such as, e.g., a passive authentication element, that encodes at least a portion of an authentication code (e.g., encodes an entire authentication code) for the object.

2. An authentication element, such as, e.g., a passive authentication element, that encodes at least a portion of an authentication code (e.g., encodes an entire authentication code) (e.g., for an object).
3. The object or authentication element of any one of the preceding embodiments, wherein the authentication element comprises one or more radiopaque encoding portions.
4. The object or authentication element of any one of the preceding embodiments, wherein the authentication element comprises one or more threads and/or one or more fibers that encode at least a portion of the authentication code [e.g., one or more fibers that are braided into a thread (e.g., with or without one or more other fibers) such that the one or more fibers encode at least a portion of the authentication code].
5. The object or authentication element of any one of the preceding embodiments, wherein the authentication element comprises one or more threads and/or one or more fibers that are radiopaque (e.g., comprise one or more radiopaque filaments).
6. The object or authentication element of any one of the preceding embodiments, wherein the authentication code comprises one or more characters and the authentication element comprises one or more encoding portions [e.g., one or more threads and/or one or more fibers and/or made of ink (e.g., radiopaque ink)] that each encode one of the one or more characters.
7. The object or authentication element of any one of the preceding embodiments, wherein the authentication code comprises one or more characters and the authentication element comprises a plurality of encoding portions [e.g., one or more threads and/or one or more fibers and/or made of ink (e.g., radiopaque ink)], wherein two or more of the plurality of encoding portions together encode one of the one or more characters.
8. The object or authentication element of embodiment 6 or embodiment 7, wherein the one or more encoding portions are spatially arranged, spatially distributed, phased, positioned, oriented, or a combination thereof such that the one or more encoding portions encode at least a portion of the authentication code.
9. The object or authentication element of any one of the preceding embodiments, wherein the authentication element comprises one or more encoding portions (e.g., one or more threads and/or one or more fibers) that are spatially arranged, spatially distributed, phased, positioned, oriented, shaped, sized, constructed to produce a responsive signal, or a combination thereof such that the one or more encoding portions encode at least a portion of the authentication code.
10. The object or authentication element of any one of the preceding embodiments, wherein at least a portion of the authentication code is encoded by a spatial distribution, position, and/or size of one or more encoding portions of the authentication element.
11. The object or authentication element of any one of the preceding embodiments, wherein the authentication element comprises one or more encoding portions [e.g., one or more threads and/or one or more fibers (e.g., woven or braided or stitched or embroidered into the encoding portion(s)) and/or made of ink (e.g., radiopaque ink)] that form a readable pattern (e.g., QR code or barcode) that encodes at least a portion of the authentication code.
12. The object or authentication element of any one of the preceding embodiments, wherein the authentication element comprises one or more braided elements that encode at least a portion of the authentication code based on one or more spacings between adjacent portions of the one or more braided elements (e.g., between adjacent braided elements).
13. The object or authentication element of any one of the preceding embodiments, wherein the authentication element is readable using x-rays, radio waves (e.g., in combination with a magnetic field), sound waves, or a combination thereof to determine the at least a portion of the authentication code.
14. The object or authentication element of any one of the preceding embodiments, wherein the authentication element comprises one or more materials of variable radio-density that encode at least a portion of the authentication code.
15. The object or authentication element of any one of the preceding embodiments, wherein the authentication element comprises a plurality of radiopaque elements that together encode at least a portion of the authentication code.
16. The object or authentication element of any one of the preceding embodiments, wherein the authentication element comprises a plurality of radiopaque elements that each encode a character in the authentication code.
17. The object or authentication element of any one of the preceding embodiments, wherein the object is an artwork and the object comprises a substrate [e.g., canvas or board (e.g., wood board)] that comprises the authentication element.
18. The object or authentication element of any one of the preceding embodiments, wherein the authentication element is integrated (e.g., not removable without noticeably damaging the object) into the object [e.g., woven into a substrate thereof (e.g., wherein the object is an artwork and the authentication element is woven into a canvas of the artwork)].
19. The object or authentication element of any one of the preceding embodiments, wherein the authentication element is covered (e.g., by a portion of the object) (e.g., from external view from a human observer).
20. The object or authentication element of any one of the preceding embodiments, wherein the authentication element is woven or braided or stitched or embroidered into the object (e.g., into a logo of the object) (e.g., into a patch, an emblem, badge, crest, seal, and/or token of the object).
21. The object or authentication element of any one of the preceding embodiments, wherein the authentication element is embedded in the object.
22. The object or authentication element of any one of the preceding embodiments, wherein the authentication element is (i) disposed in an interior of the object, (ii) internal to the object, (iii) covered from view by unaided human eyes by a portion of the object, or (iv) a combination thereof.
23. The object or authentication element of any one of the preceding embodiments, wherein the object is a textile, a document, an artwork, a fashion object (e.g., clothing, an accessory, a handbag, a shoe), a weapon, ammunition for a weapon, or currency.

24. The object or authentication element of any one of the preceding embodiments, wherein the authentication element occupies a volume of no more than 10 $cm^3$ (e.g., no more than 10 $cm^3$, no more than 5 $cm^3$, no more than 2 $cm^3$, no more than 1 $cm^3$, no more than 0.5 $cm^3$, no more than 0.25 $cm^3$, no more than 0.1 $cm^3$, no more than 0.05 $cm^3$, no more than 0.01 $cm^3$, or no more than 0.001 $cm^3$).
25. The object or authentication element of any one of the preceding embodiments, wherein the authentication element has a largest surface and a surface area of the largest surface is no more than 50 $cm^2$ (e.g., no more than 40 $cm^2$, no more than 30 $cm^2$, no more than 20 $cm^2$, no more than 10 $cm^2$, no more than 5 $cm^2$, no more than 4 $cm^2$, no more than 3 $cm^2$, no more than 2 $cm^2$, no more than 1 $cm^2$, no more than 0.5 $cm^2$, or no more than 0.1 $cm^2$).
26. The object or authentication element of any one of the preceding embodiments, wherein the authentication element has been applied to the object (e.g., printed on the object) after the object has been at least partially formed [e.g., has been applied to a substrate that has been then processed (e.g., has been deposited on a canvas that has then been made into an artwork)].
27. The object or authentication element of any one of the preceding embodiments, wherein the object is unfinished (e.g., is a blank canvas).
28. The object or authentication element of any one of the preceding embodiments, wherein the authentication code is unique to the object.
29. The object or authentication element of any one of the preceding embodiments, wherein the authentication element is not visible to unaided human eyes.
30. The object or authentication element of any one of the preceding embodiments, wherein the authentication element comprises one or more portions (e.g., one or more radiopaque portions) that encode information indicating a start point and/or end point of the at least a portion of the authentication code (e.g., wherein the one or more portions precede a portion of the authentication element that corresponds to a first character in the authentication code and/or succeed a portion of the authentication element that corresponds to a last character in the authentication code).
31. The object or authentication element of any one of the preceding embodiments, wherein the authentication element encodes multiple copies of the at least a portion of the authentication code (e.g., multiple copies of an entirety of the authentication code).
32. The object or authentication element of any one of the preceding embodiments, wherein the authentication element encodes the at least a portion of the authentication code in an encrypted manner (e.g., SHA-encrypted) (e.g., such that a person must unencrypt information read from the authentication element in order to authenticate the object by matching the authentication code).
33. The object or authentication element of any one of the preceding embodiments, wherein the at least a portion of the authentication code is encoded in an encrypted manner with a public key.
34. The object or authentication element of embodiment 33, wherein the public key corresponds to a private key such that the authenticity of the object can be verified using the private key.
35. The object or authentication element of any one of the preceding embodiments, wherein the authentication code is at least 10 (e.g., at least 20, at least 30, or at least 50) characters long and/or at least 64 bits (e.g., at least 128 bits, at least 256 bits, or at least 512 bits).
36. The object or authentication element of any one of the preceding embodiments, wherein the authentication element encodes the at least a portion of the authentication code in a base that is not base 10 and/or not in plaintext (e.g., wherein the authentication element encodes the at least a portion of the authentication code in base 2 or in hexadecimal).
37. The object or authentication element of any one of the preceding embodiments, wherein the authentication element encodes at least a portion of multiple authentication codes (e.g., corresponding to different persons and/or organizations).
38. The object or authentication element of any one of the preceding embodiments, wherein one or more first portions (e.g., filament(s), fiber(s), ink(s)) of the authentication element encode at least a portion of a first authentication code and one or more second portions (e.g., filament(s), fiber(s), ink(s)) of the authentication element encode at least a portion of a second authentication code.
39. The object or authentication element of any one of the preceding embodiments, wherein the authentication element comprises one or more first portions that encode a first portion of the authentication code in a first manner and one or more second portions that encode a second portion of the authentication code in a second manner different from the first manner (e.g., wherein the first manner is based on size and the second manner is based on spatial distribution).
40. The object or authentication element of any one of the preceding embodiments, wherein the at least a portion of the authentication code is encoded by a single portion (e.g., single filament or single fiber) of the authentication element.
41. The object or authentication element of any one of the preceding embodiments, wherein the authentication element is tamper-proof such that the at least a portion of the authentication code cannot be obtained from the authentication element if the authentication element has been tampered with.
42. The object or authentication element of any one of the preceding embodiments, wherein the authentication element is disposed on a surface of the object.
43. The object or authentication element of any one of the preceding embodiments, wherein the authentication element is adhered to the object.
44. The object or authentication element of any one of the preceding embodiments, wherein the authentication element is integrated with the object.
45. The object or authentication element of any one of the preceding embodiments, wherein the object contains the authentication element.
46. The object or authentication element of any one of the preceding embodiments, wherein the object comprises the authentication element.
47. The object or authentication element of any one of embodiments 1-45, wherein the object has a tamper-proof label affixed (e.g., adhered) thereto and the tamper-proof label comprises the authentication element.
48. The object or authentication element of embodiment 47, wherein the at least a portion of the authentication code cannot be obtained from the authentication element if the tamper-proof label has been tampered with.

49. The object or authentication element of embodiment 47 or embodiment 48, wherein the authentication element is comprised in (e.g., embedded in) a tamper evident portion of the tamper-proof label.
50. The object or authentication element of any one of embodiments 1-45, wherein the object is packaged by a packaging [e.g., box (e.g., cardboard box) or shrink-wrap] and the packaging comprises the authentication element.
51. The object or authentication element of embodiment 50, wherein the packaging is tamper-proof.
52. The object or authentication element of embodiment 50 or embodiment 51, wherein the authentication element is comprised in a tamper-proof portion of the packaging.
53. The object or authentication element of any one of the preceding embodiments, wherein the at least a portion of the authentication code is encoded by a barcode or a QR code.
54. The object or authentication element of any one of the preceding embodiments, wherein a location and/or orientation of the authentication element relative to the object corresponds to the object being authentic (e.g., is verifiable).
55. The object or authentication element of any one of the preceding embodiments, wherein the authentication element is invisible to unaided human eyes.
56. The object of any one of the preceding embodiments, wherein multiple authentication elements are physically associated with the object.
57. The object of embodiment 56, wherein each of the multiple authentication elements encode a portion (e.g., a distinct portion) of the at least a portion of the authentication code (e.g., together encode an entirety of the authentication code).
58. The object of embodiment 56, wherein each of the multiple authentication elements encodes at least a portion of a distinct authentication code (e.g., an entire distinct authentication code).
59. The object of embodiment 56, wherein each of the multiple authentication elements encodes a same at least a portion of an authentication code (e.g., a same entire authentication code).
60. The object of any one of embodiments 56-59, wherein the multiple authentication elements are physically associated with (e.g., disposed in and/or on) different portions of the object.
61. The object of any one of embodiments 56-60, wherein arrangement of the multiple authentication elements corresponds to the object being authentic (e.g., is verifiable).
62. The object of embodiment 61, wherein the arrangement is a relative arrangement of each of the multiple authentication elements relative to each other.
63. The object of embodiment 61 or embodiment 62, wherein the arrangement is (e.g., also) an absolute arrangement of each of the multiple authentication elements relative to the object.
64. A method of verifying authenticity of an object, the method comprising:
    receiving an authentication code (e.g., alphanumeric string, passcode, password, or passphrase) for an object that has been obtained, at least in part, by reading an authentication element, such as, e.g., a passive authentication element, physically associated with (e.g., comprised in) the object that encodes at least a portion of the authentication code; and
    verifying authenticity of the object using the authentication code.
65. The method of embodiment 64, comprising obtaining the authentication code, wherein obtaining the authentication code comprises reading the authentication element.
66. The method of embodiment 64 or embodiment 65, wherein reading the authentication element comprises applying x-rays, radio waves (e.g., in combination with a magnetic field), and/or sound waves to the authentication element.
67. The method of embodiment 66, comprising forming a human-readable image based on signal received from the authentication element in response to the x-rays, radio waves, and/or sound waves, wherein receiving the authentication code comprises receiving the human-readable image and verifying authenticity of the object using the authentication code as received comprises interpreting the human-readable image.
68. The method of embodiment 66 or embodiment 67, comprising receiving signal from the authentication element in response to the x-rays, radio waves (e.g., in combination with a magnetic field), and/or sound waves and translating the signal into at least a portion of the authentication code.
69. A method of verifying authenticity of an object, the method comprising:
    receiving information potentially corresponding to an authentication code for an object, wherein at least a portion of the information has been obtained by reading an authentication element, such as, e.g., a passive authentication element, physically associated with (e.g., in or on) the object; and
    determining whether the information sufficiently corresponds to the authentication code [e.g., that the information at least approximates (e.g., matches) the authentication code and could not correspond to any other authentication code].
70. The method of embodiment 69, comprising verifying authenticity of the object based on the determination that the information sufficiently corresponds to the authentication code.
71. The method of embodiment 69 or embodiment 70, comprising obtaining the information by reading the authentication element.
72. The method of any one of embodiments 69-71, wherein reading the authentication element comprises applying x-rays, radio waves (e.g., in combination with a magnetic field), and/or sound waves to the authentication element.
73. The method of embodiment 72, comprising forming a human-readable image based on signal received from the authentication element in response to the x-rays, radio waves, and/or sound waves, wherein receiving the information comprises receiving the human-readable image and determining that the information sufficiently corresponds to the authentication code comprises interpreting the human-readable image.
74. The method of embodiment 72 or embodiment 73, comprising receiving signal from the authentication element in response to the x-rays, radio waves, and/or sound waves and translating the signal into the information.
75. The method of any one of embodiments 69-74, comprising determining that the information sufficiently corresponds to the authentication code.

76. The method of any one of embodiments 69-74, comprising determining that the information does not sufficiently correspond to the authentication code (e.g., corresponds to an authentication code for a different object) and consequently determining that the object is a counterfeit.
77. The method of any one of embodiments 64-76, wherein the method is performed or caused to be performed by an appraiser for the object, an employee of an auction house, a dealer for the object, a seller for the object, a prospective buyer of the object, or an owner of the object.
78. The method of any one of embodiments 64-77, comprising determining a location and/or orientation of the authentication element relative to (e.g., on or in) the object.
79. The method of embodiment 78, comprising determining whether the object is authentic based at least in part on the location and/or orientation.
80. The method of any one of embodiments 64-79, wherein the object is physically associated with multiple authentication elements.
81. The method of embodiment 80, comprising determining a location and/or orientation of each of the multiple authentication elements relative to (e.g., on or in) the object and/or relative to each other.
82. The method of embodiment 81, comprising determining whether the object is authentic based at least in part on the location and/or orientation of each of the multiple authentication elements.
83. The method of any one of embodiments 80-82, wherein each of the multiple authentication elements encodes a distinct portion of the authentication code.
84. The method of any one of embodiments 80-82, wherein each of the multiple authentication elements encodes a same at least a portion of the authentication code (e.g., each encodes all of the authentication code).
85. The method of any one of embodiments 64-84, wherein the method is performed in-line [e.g., during a logistics process (e.g., during a sorting process (e.g., a document or postal sorting process), a package routing process, a package sorting process, a shipping process, a warehouse process, and/or a distribution process)] [e.g., while the object is being transferred (e.g., using one or more conveyor belts)].
86. The method of any one of embodiments 64-85, wherein the method is performed during a logistics process [e.g., during a sorting process (e.g., a document or postal sorting process), a package routing process, a package sorting process, a shipping process, a warehouse process, and/or a distribution process] [e.g., while the object is being transferred (e.g., using one or more conveyor belts)].
87. The method of any one of embodiments 64-86, comprising verifying authenticity of the object, wherein the at least a portion of an authentication code is encoded a public key and the verifying is performed or caused to be performed by a person having knowledge of a private key corresponding to the public key such that the authenticity of the object can be verified using the private key to decrypt the at least a portion of the authentication code.
88. The method of any one of embodiments 64-87, wherein the object is an object according to any one of embodiments 1, 3-63.
89. The method of any one of embodiments 64-88, wherein the authentication element is an authentication element according to any one of embodiments 2-55.
90. A method of registering a fingerprint of an object, the method comprising:
receiving an object physically associated with an authentication element;
obtaining a fingerprint of the authentication element; and
registering the fingerprint with the object in a registry.
91. The method of embodiment 90, wherein obtaining the fingerprint comprises reading the authentication element using x-rays, radio waves (e.g., in combination with a magnetic field), or sound waves.
92. The method of embodiment 90 or embodiment 91, wherein the method is performed or caused to be performed by an appraiser for the object, an employee of an auction house, a dealer for the object, an owner of the object, or a creator of the object.
93. A method of verifying authenticity of an object, the method comprising:
obtaining a comparative fingerprint for an authentication element physically associated with an object;
receiving, from a registry, a copy of an authentic fingerprint for the object, wherein the object has been registered with the registry; and
verifying authenticity of the object by, at least in part, comparing the comparative fingerprint to the authentic fingerprint.
94. The method of embodiment 93, wherein obtaining the comparative fingerprint comprises reading the authentication element using x-rays, radio waves (e.g., in combination with a magnetic field), or sound waves.
95. The method of embodiment 93 or embodiment 94, wherein the method is performed or caused to be performed by an appraiser for the object, an employee of an auction house, a dealer for the object, an owner of the object, a prospective buyer, or a seller of the object.
96. The method of any one of embodiments 90-95, wherein the fingerprint is a radiological fingerprint.
97. The method of any one of embodiments 90-96, wherein the fingerprint is an image.
98. The method of any one of embodiments 90-97, wherein the authentication element comprises one more encoding portions and the one or more encoding portions are discernable in the fingerprint.
99. The method of any one of embodiments 90-98, wherein an authentication code is determinable from the fingerprint.
100. The method of any one of embodiments 90-99, wherein the object is an artwork.
101. The method of embodiment 100, wherein the artwork is a completed artwork.
102. The method of any one of embodiments 90-101, wherein obtaining the fingerprint comprises identifying an orientation mark that identifies the authentication element.
103. The method of any one of embodiments 90-102, wherein the authentication element is unique to an owner or creator of the object.
104. The method of any one of embodiments 90-103, wherein the registry is owned and/or maintained by an auction house, an appraisal firm, a gallery, or a dealer.
105. The method of any one of embodiments 90-104, wherein the method is performed or caused to be performed by an appraiser for the object, an employee of an auction house, a dealer for the object, an owner of the object, or a creator of the object.

106. The method of any one of embodiments 90-105, wherein the object is an object according to any one of embodiments 1, 3-63.

107. An object physically associated with an authentication element, wherein the authentication element is an authentication element according to any one of embodiments 2-55.

108. An object and an authentication element according to any one of embodiments 2-63, wherein the object is physically associated with the authentication element.

109. A plurality of authentication elements according to any one of embodiments 2-55, wherein the plurality of together encode at least a portion of an authentication code.

110. A plurality of authentication elements that together encode at least a portion of an authentication code.

111. A system comprising:

an enclosed outer container;

objects removably disposed in (e.g., inside) the outer container; and a composite authentication element encoding at least a portion of an authentication code for the objects, wherein each of the objects is physically associated with (e.g., comprises) a distinct portion of the composite authentication element and the composite authentication element can be read (e.g., to determine the authentication code) through the outer container (e.g., without accessing inside of the outer container).

112. The system of embodiment 111, wherein the objects are ordered in the outer container so that the composite authentication element is readable to determine the at least a portion of the authentication code.

113. The system of embodiment 111 or embodiment 112, wherein the objects are layered in the outer container so that the composite authentication element is readable to determine the at least a portion of the authentication code.

114. The system of any one of embodiments 111-113, wherein objects are arranged in the outer container such that the composite authentication element can be read from a predetermined angle (e.g., within a predetermined range of acceptable angles) [e.g., using x-rays, radio waves (e.g., in combination with a magnetic field), and/or sound waves].

115. The system of any one of embodiments 111-114, wherein the objects are arranged in three dimensions such that the composite authentication element encodes an authentication code two-dimensionally (e.g., barcode or QR code).

116. The system of any one of embodiments 111-115, wherein, for each of the objects, the portion of the composite authentication element comprised in the object has been deposited (e.g., printed) onto a surface of the object.

117. The system of any one of embodiments 111-116, wherein, for each of the objects, the portion of the composite authentication element comprised in the object has been integrated (e.g., woven) into the object.

118. The system of any one of embodiments 111-117, wherein the composite authentication element comprises (e.g., is) a QR code or a barcode and the at least a portion of the authentication code is encoded in the QR code or barcode.

119. The system of any one of embodiments 111-118, wherein the composite authentication element is readable based on the objects having a particular arrangement within the outer container.

120. The system of any one of embodiments 111-119, wherein the composite authentication element is readable only if the objects have a particular arrangement within the outer container.

121. The system of any one of embodiments 111-120, wherein the objects are flat.

122. The system of any one of embodiments 111-121, wherein the composite authentication element is flat.

123. The system of any one of embodiments 111-122, wherein the composite authentication element is invisible to unaided human eyes.

124. The system of any one of embodiments 111-123, wherein the outer container is opaque.

125. The system of any one of embodiments 111-124, wherein the outer container is secure (e.g., sealed or locked).

126. The system of any one of embodiments 111-125, wherein the outer container is secured by a tamper-proof mechanism.

127. The system of embodiment 126, wherein the tamper-proof mechanism is a seal.

128. The system of any one of embodiments 111-127, wherein the outer container is secured by a mechanism that can be authenticated (e.g., a tamper-proof mechanism that can be authenticated).

129. The system of any one of embodiments 111-128, wherein the outer container is an envelope.

130. The system of any one of embodiments 111-128, wherein the outer container is a box.

131. The system of any one of embodiments 111-130, wherein the outer container is packaging [e.g., box (e.g., cardboard box) or shrink-wrap].

132. The system of any one of embodiments 111-131, wherein the outer container is disposable.

133. The system of any one of embodiments 111-132, wherein the outer container maintains alignment of the objects such that the authentication element is readable (e.g., to determine the authentication code).

134. The system of any one of embodiments 111-133, wherein the outer container is sized and shaped relative to the objects such that the outer container maintains alignment of the objects.

135. The system of any one of embodiments 111-134, wherein the objects are shaped and disposed as sheet-like layers.

136. The system of any one of embodiments 111-135, wherein the objects are sheets of paper (e.g., pages of a document or currency notes).

137. The system of any one of embodiments 111-136, wherein the composite authentication element comprises radiopaque encoding portions (e.g., wherein the distinct portion of the composite authentication element is radiopaque).

138. The system of any one of embodiments 111-137, wherein the composite authentication element is formed from one or more radiopaque materials.

139. The system of embodiment 138, wherein the one or more radiopaque materials are deposited (e.g., printed) on the objects.

140. The system of embodiment 138 or embodiment 139, wherein the one or more radiopaque materials are integrated (e.g., woven) into the objects.

141. The system of any one of embodiments 111-140, wherein the objects together form a complete document or a complete set of documents.

142. The system of any one of embodiments 111-141, wherein the objects are folded and the composite authentication element is readable (e.g., to determine the authentication code) based on how the objects are folded.

143. A system comprising:

an enclosed outer container; and an object removably disposed in (e.g., inside) the outer container, wherein the object is physically associated with (e.g., comprises) an authentication element encoding at least a portion of an authentication code (e.g., an entire authentication code) for the object, wherein the authentication element can be read (e.g., to determine the authentication code) without accessing inside of the outer container.

144. The system of embodiment 143, wherein, the authentication element has been deposited [e.g., printed (e.g., ink-jet printed)] onto a surface of the object.

145. The system of embodiment 143 or embodiment 144, wherein, the authentication element has been integrated (e.g., woven) into the object.

146. The system of any one of embodiments 143-145, wherein the authentication element comprises (e.g., is) a QR code or a barcode and the at least a portion of the authentication code is encoded in the QR code or barcode.

147. The system of any one of embodiments 143-146, wherein the authentication element is readable based on the object having a particular arrangement within the outer container.

148. The system of any one of embodiments 143-147, wherein the authentication element is readable only if the object has a particular arrangement within the outer container.

149. The system of any one of embodiments 143-148, wherein the object is flat.

150. The system of any one of embodiments 143-149, wherein the authentication element is flat.

151. The system of any one of embodiments 143-150, wherein the authentication element is invisible to an unaided human viewer.

152. The system of any one of embodiments 143-151, wherein the outer container is opaque.

153. The system of any one of embodiments 143-152, wherein the outer container is secure (e.g., sealed or locked).

154. The system of any one of embodiments 143-153, wherein the outer container is secured by a tamper-proof mechanism.

155. The system of embodiment 154, wherein the tamper-proof mechanism is a seal.

156. The system of any one of embodiments 143-155, wherein the outer container is secured by a mechanism that can be authenticated (e.g., a tamper-proof mechanism that can be authenticated).

157. The system of any one of embodiments 143-156, wherein the outer container is an envelope.

158. The system of any one of embodiments 143-157, wherein the outer container is a box.

159. The system of any one of embodiments 143-158, wherein the outer container is packaging.

160. The system of any one of embodiments 143-159, wherein the outer container is disposable.

161. The system of any one of embodiments 143-160, wherein the outer container is sized and shaped relative to the object such that the outer container maintains alignment of the object.

162. The system of any one of embodiments 143-161, wherein the outer container maintains alignment of the object such that the authentication element is readable (e.g., to determine the authentication code).

163. The system of any one of embodiments 143-162, wherein the object is shaped as a sheet-like layer.

164. The system of any one of embodiments 143-163, wherein the object is a sheet of paper (e.g., a page of a document or a currency note).

165. The system of any one of embodiments 143-164, wherein the authentication element comprises one or more radiopaque encoding portions.

166. The system of any one of embodiments 143-165, wherein the authentication element is formed from one or more radiopaque materials.

167. The system of embodiment 166, wherein the one or more radiopaque materials are deposited (e.g., printed) on (e.g., a surface of) the object.

168. The system of embodiment 166 or embodiment 167, wherein the one or more radiopaque materials are integrated (e.g., woven) into the object.

169. The system of any one of embodiments 143-168, wherein the object is a page of a document, a complete document, or part of a complete set of documents that are contained in the outer container.

170. The system of any one of embodiments 143-169, wherein the object is folded and the authentication element is readable (e.g., to determine the authentication code) based on how the object is folded.

171. The system of any one of embodiments 143-170, comprising a plurality of objects removably disposed in the outer container, wherein each of the objects is physically associated with an authentication element encoding at least a portion of an authentication code (e.g., an entire authentication code), wherein the authentication element can be read (e.g., to determine the authentication code) through the outer container (e.g., without accessing in of the outer container).

172. The system of embodiment 171, wherein the authentication code is a common authentication code used all of the objects.

173. The system of embodiment 171 or embodiment 172, wherein the authentication element of the objects together encode an entirety of the authentication code.

174. The system of embodiment 173, wherein the authentication element of the objects together encode an entirety of the authentication code such that a viewer can determine whether a complete set of objects is present in (e.g., inside of) the container.

175. The system of embodiment 171, wherein, for each of the objects, the authentication code is a unique authentication code for the object.

176. The system of embodiment 171, wherein, for each of the objects, the authentication element encodes at least a portion of a distinct authentication code.

177. The system of any one of embodiments 143-170, comprising multiple authentication elements that each encode an entire same authentication code.

178. The system of any one of embodiments 177, wherein the multiple authentication elements are physically associated with (e.g., disposed in and/or on) different portions of the object.

179. A system comprising:
an enclosed (e.g., opaque) outer container;
an object removably disposed inside the outer container; and
an authentication element encoding at least a portion of an authentication code for the object, wherein the authentication element is physically associated with the object,
wherein the object comprises distinct portions of the authentication element each disposed in or on a different portion of the object,
wherein the authentication element is readable without accessing the outer container based on the object being distorted in a particular manner.

180. The system of embodiment 179, wherein the object is folded and the authentication element is readable (e.g., to determine the authentication code) based on how the object is folded.

181. A method of authenticating objects, the method comprising:
providing a system, the system comprising (i) an outer container (e.g., an opaque outer container), (ii) objects removably disposed in (e.g., inside) the outer container, and (iii) a composite authentication element encoding at least a portion of an authentication code, wherein each of the one or more objects is physically associated with (e.g., comprises) a portion (e.g., a distinct portion) of the composite authentication element; and
reading the composite authentication element through the outer container (e.g., without accessing inside of the outer container).

182. The method of embodiment 181, wherein the reading comprises (i) applying x-rays, radio waves (e.g., in combination with a magnetic field), and/or sound waves that penetrate the outer container to the objects and (ii) receiving signal from the authentication element in response.

183. The method of embodiment 182, wherein receiving the signal comprises forming a human readable image from the signal.

184. The method of any one of embodiments 181-183, comprising verifying the authenticity of one or more of the objects based on the reading.

185. The method of any one of embodiments 181-184, comprising verifying that no object is missing from the outer container based on the reading.

186. The method of any one of embodiments 181-185, comprising removing one or more of the objects from the container after determining that the one or more objects are authentic.

187. The method of any one of embodiments 181-186, comprising removing one or more of the objects from the container only after determining that no object is missing from the outer container.

188. The method of embodiment 186 or embodiment 187, wherein, while the one or more objects are disposed in the outer container, the outer container is secure and removing the one or more of the objects comprises compromising security of the outer container.

189. The method of any one of embodiments 187-188, wherein removing the one or more of the objects from the outer container comprises breaking a tamper-proof mechanism that secures that outer container prior to removal of the one or more objects.

190. A method of authenticating objects, the method comprising:
providing a system, the system comprising (i) an outer container (e.g., an opaque outer container), (ii) one or more objects removably disposed in (e.g., inside of) the outer container, and (iii), for each of the one or more objects, an authentication element physically associated with the object that encodes at least a portion of an authentication code; and
reading the authentication element through the outer container (e.g., without accessing inside of the outer container).

191. The method of embodiment 190, wherein the reading comprises (i) applying x-rays, radio waves (e.g., in combination with a magnetic field), and/or sound waves that penetrate the outer container to the one or more objects and (ii) receiving signal from the authentication element in response.

192. The method of embodiment 191, wherein receiving the signal comprises forming a human readable image from the signal.

193. The method of any one of embodiments 190-192, comprising verifying the authenticity of one or more of the one or more objects based on the reading.

194. The method of any one of embodiments 190-193, comprising verifying that no object is missing from the outer container based on the reading.

195. The method of any one of embodiments 190-194, comprising removing one or more of the one or more objects from the container after determining that the one or more objects are authentic.

196. The method of any one of embodiments 190-195, comprising removing one or more of the one or more objects from the container only after determining that no object is missing from the outer container.

197. The method of embodiment 195 or embodiment 196, wherein, while the one or more objects are disposed in the outer container, the outer container is secure and removing the one or more of the one or more objects comprises compromising security of the outer container.

198. The method of any one of embodiments 195-197, wherein removing the one or more of the one or more objects from the outer container comprises breaking a tamper-proof mechanism that secures that outer container prior to removal of the one or more objects.

199. The method of any one of embodiments 181-198, comprising orienting the outer container before reading the authentication element.

200. The method of any one of embodiments 181-199, comprising positioning the outer container before reading the authentication element.

201. The method of any one of embodiments 181-200, wherein the outer container is secure during the reading (e.g., secured by a tamper-proof mechanism).

202. The method of any one of embodiments 181-201, wherein the method is performed in-line [e.g., during a logistics process (e.g., during a sorting process (e.g., a document or postal sorting process), a package routing process, a package sorting process, a shipping process, a warehouse process, and/or a distribution process)] [e.g., while the outer container is being transferred (e.g., using one or more conveyor belts)].

203. The method of any one of embodiments 181-202, wherein the method is performed during a logistics process [e.g., during a sorting process (e.g., a document or postal sorting process), a package routing process, a package sorting process, a shipping process, a warehouse process, and/or a distribution process] [e.g., while the outer container is being transferred (e.g., using one or more conveyor belts)].

204. The method of any one of embodiments 181-203, wherein the system is a system according to any one of embodiments 111-180.

205. A non-transitory image in which an authentication element is discernable (e.g., based on one or more encoding portions comprised in the authentication element), wherein the authentication element is physically associated with an object and the object is authenticatable using the image.

206. The image of embodiment 205, wherein the authentication element is an authentication element according to any one of embodiments 2-55.

207. The image of embodiment 205 or embodiment 206, wherein the object is an object according to any one of embodiments 1, 3-63.

208. The image of any one of embodiments 205-207, wherein the object is discernable in the image.

209. The image of any one of embodiments 205-207, wherein the object is not discernable in the image.

210. The image of any one of embodiments 205-209, wherein a label comprises the authentication element and the label is discernable in the image.

211. The image of any one of embodiments 205-209, wherein a label comprises the authentication element and the label is not discernable in the image.

212. A non-transitory image in which a composite authentication element is discernable (e.g., based on one or more encoding portions comprised in the composite authentication element), wherein the composite authentication element is physically associated with objects and the objects are authenticatable using the image.

213. The image of embodiment 212, wherein the composite authentication element and the objects are comprised in a system according to any one of embodiments 111-180.

214. The image of embodiment 212 or embodiment 213, wherein the objects are discernable in the image.

215. The image of embodiment 212 or embodiment 213, wherein the objects are not discernable in the image.

216. The image of any one of embodiments 205-215, wherein the image is a radiological image.

217. The image of any one of embodiments 205-215, wherein the image is a sonogram (e.g., an ultrasound image).

218. The image of any one of embodiments 205-216, wherein the image is a tomographic image [e.g., an x-ray tomography image and/or a CT image (e.g., CT scan)].

219. The image of any one of embodiments 205-216, wherein the image is an x-ray image.

220. The image of embodiment 219, wherein the image is a dual energy x-ray absorptiometry image.

221. One or more non-transitory computer-readable media having one or more images according to any one of embodiments 205-220 stored thereon.

222. A method comprising acquiring the image of any one of embodiments 205-220 (e.g., from outside of an outer container) [e.g., wherein acquiring comprises providing (e.g., directing) x-rays, radio waves (e.g., in combination with a magnetic field), or sound waves to the authentication element (e.g., through an outer container)] (e.g., wherein the image is acquired using x-rays, radio waves (e.g., in combination with a magnetic field), or sound waves).

223. A method comprising rendering, by a processor of a computing device, the image of any one of embodiments 205-220.

224. A method comprising displaying, by a processor of a computing device, the image of any one of embodiments 205-220.

225. A method comprising constructing (e.g., by a processor of a computing device) the image of any one of embodiments 205-220.

226. A method comprising developing the image of any one of embodiments 205-220.

227. The image of any one of embodiments 205-220, wherein the image is a printed image.

228. The image of any one of embodiments 205-220, wherein the image is a film image.

229. A cipher element, such as, e.g., a passive cipher element, that encodes a cipher key for an encrypted authentication code (e.g., corresponding to an object).

230. The cipher element of embodiment 229, wherein the cipher element comprises one or more encoding portions (e.g., one or more radiopaque encoding portions) that encode the cipher key.

231. The cipher element of embodiment 230, wherein the one or more encoding portions are spatially arranged, spatially distributed, phased, positioned, oriented, or a combination thereof such that the one or more encoding portions encode the cipher key.

232. The cipher element of any one of embodiments 229-231, wherein the cipher element comprises one or more threads and/or one or more fibers that encode the cipher key [e.g., one or more fibers that are braided into a thread (e.g., with or without one or more other fibers) such that the one or more fibers encode the cipher key].

233. The cipher element of any one of embodiments 229-232, wherein the cipher element comprises one or more threads and/or one or more fibers that are radiopaque (e.g., comprise one or more radiopaque filaments).

234. The cipher element of any one of embodiments 229-233, wherein the cipher element comprises one or more encoding portions (e.g., one or more threads and/or one or more fibers) that are spatially arranged, spatially distributed, phased, positioned, oriented, shaped, sized, constructed to produce a responsive signal, or a combination thereof such that the one or more encoding portions encode the cipher key.

235. The cipher element of any one of embodiments 229-234, wherein the cipher key is encoded by a spatial distribution, position, and/or size of one or more encoding portions of the cipher element.

236. The cipher element of any one of embodiments 229-235, wherein the cipher element comprises one or more encoding portions [e.g., one or more threads and/or one or more fibers and/or made of ink (e.g., radiopaque ink)] that form a readable pattern (e.g., QR code or barcode) that encodes the cipher key.

237. The cipher element of any one of embodiments 229-236, wherein the cipher element comprises one or more braided elements that encode the cipher key based on one or more spacings between adjacent portions of the one or more braided elements (e.g., between adjacent braided elements).

238. The cipher element of any one of embodiments 229-237, wherein the cipher element is readable using x-rays, radio waves (e.g., in combination with a magnetic field), sound waves, or a combination thereof to determine the cipher key.

239. The cipher element of any one of embodiments 229-238, wherein the cipher element comprises one or more materials of variable radio-density that encode the cipher key.

240. The cipher element of any one of embodiments 229-239, wherein the cipher element comprises a plurality of radiopaque elements that together encode the cipher key.

241. The cipher element of any one of embodiments 229-240, wherein the cipher element comprises a plurality of radiopaque elements that each encode a character in the cipher key.

242. The cipher element of any one of embodiments 229-241, wherein the cipher element is integrated (e.g., not removable without noticeably damaging the object) into an object corresponding to the authentication code [e.g., woven into a substrate thereof (e.g., wherein the object is an artwork and the cipher element is woven into a canvas of the artwork)].

243. The cipher element of any one of embodiments 229-242, wherein the cipher element is covered (e.g., by a portion of an object) (e.g., from external view from a human observer).

244. The cipher element of any one of embodiments 229-243, wherein the cipher element is woven into an object corresponding to the authentication code.

245. The cipher element of any one of embodiments 229-244, wherein the cipher element is embedded in an object corresponding to the authentication code.

246. The cipher element of any one of embodiments 229-245, wherein the cipher element is (i) disposed in an interior of an object corresponding to the authentication code, (ii) internal to an object corresponding to the authentication code, (iii) covered from view by unaided human eyes by a portion of an object corresponding to the authentication code, or (iv) a combination thereof.

247. The cipher element of any one of embodiments 229-246, wherein an object corresponding to the authentication code is a textile, a document, an artwork, a fashion object (e.g., clothing, an accessory, a handbag, a shoe), a weapon, ammunition for a weapon, or currency.

248. The cipher element of any one of embodiments 229-247, wherein the cipher element occupies a volume of no more than 10 $cm^3$ (e.g., no more than 10 $cm^3$, no more than 5 $cm^3$, no more than 2 $cm^3$, no more than 1 $cm^3$, no more than 0.5 $cm^3$, no more than 0.25 $cm^3$, no more than 0.1 $cm^3$, no more than 0.05 $cm^3$, no more than 0.01 $cm^3$, or no more than 0.001 $cm^3$).

249. The cipher element of any one of embodiments 229-248, wherein the cipher element has a largest surface and a surface area of the largest surface is no more than 50 $cm^2$ (e.g., no more than 40 $cm^2$, no more than 30 $cm^2$, no more than 20 $cm^2$, no more than 10 $cm^2$, no more than 5 $cm^2$, no more than 4 $cm^2$, no more than 3 $cm^2$, no more than 2 $cm^2$, no more than 1 $cm^2$, no more than 0.5 $cm^2$, or no more than 0.1 $cm^2$).

250. The cipher element of any one of embodiments 229-249, wherein the cipher element has been applied to an object corresponding to the authentication code (e.g., printed on the object) after the object has been at least partially formed [e.g., has been applied to a substrate that has been then processed (e.g., has been deposited on a canvas that has then been made into an artwork)].

251. The cipher element of any one of embodiments 229-250, wherein the cipher key is unique to the authentication code or unique to an object corresponding to the authentication code.

252. The cipher element of any one of embodiments 229-251, wherein the cipher element is not visible to unaided human eyes.

253. The cipher element of any one of embodiments 229-252, wherein the cipher element is invisible to unaided human eyes.

254. The cipher element of any one of embodiments 229-253, wherein the cipher element comprises one or more portions (e.g., one or more radiopaque portions) that encode information indicating a start point and/or end point of the cipher key (e.g., wherein the one or more portions precede a portion of the cipher element that corresponds to a first character in the cipher key and/or succeed a portion of the cipher element that corresponds to a last character in the cipher key).

255. The cipher element of any one of embodiments 229-254, wherein the cipher element encodes multiple copies of the cipher key.

256. The cipher element of any one of embodiments 229-255, wherein the cipher element encodes the cipher key in a base that is not base 10 and/or not in plaintext (e.g., wherein the cipher element encodes the cipher key in base 2 or in hexadecimal).

257. The cipher element of any one of embodiments 229-256, wherein the cipher element comprises one or more first portions that encode a first portion of the cipher key in a first manner and one or more second portions that encode a second portion of the cipher key in a second manner different from the first manner (e.g., wherein the first manner is based on size and the second manner is based on spatial distribution).

258. The cipher element of any one of embodiments 229-257, wherein the cipher key is encoded by a single portion (e.g., single filament or single fiber) of the cipher element.

259. The cipher element of any one of embodiments 229-258, wherein the cipher element is tamper-proof such that the cipher key cannot be obtained from the cipher element if the cipher element has been tampered with.

260. The cipher element of any one of embodiments 229-259, wherein the cipher element is disposed on a surface of an object corresponding to the authentication code.

261. The cipher element of any one of the preceding embodiments 229-260, wherein the cipher element is adhered to an object corresponding to the authentication code.

262. The cipher element of any one of embodiments 229-261, wherein the cipher element is integrated an object corresponding to the authentication code.

263. The cipher element of any one of embodiments 229-262, wherein an object corresponding to the authentication code contains the cipher element.

264. The cipher element of any one of embodiments 229-263, wherein an object corresponding to the authentication code comprises the cipher element.

265. The cipher element of any one of embodiments 229-263, wherein an object corresponding to the authentication code has a tamper-proof label affixed (e.g., adhered) thereto and the tamper-proof label comprises the cipher element.

266. The cipher element of embodiment 265, wherein the cipher key cannot be obtained from the cipher element if the tamper-proof label has been tampered with.

267. The cipher element of embodiment 265 or embodiment 266, wherein the cipher element is comprised in (e.g., embedded in) a tamper evident portion of the tamper-proof label.

268. The cipher element of any one of embodiments 229-259, wherein an object corresponding to the authentication code is packaged by a packaging [e.g., box (e.g., cardboard box) or shrink-wrap] and the packaging comprises the cipher element.

269. The cipher element of embodiment 268, wherein the packaging is tamper-proof.

270. The cipher element of embodiment 268 or embodiment 269, wherein the cipher element is comprised in a tamper-proof portion of the packaging.

271. The cipher element of any one of embodiments 229-270, wherein the cipher key is encoded by a barcode or a QR code.

272. The cipher element of any one of embodiments 229-271, wherein different portions of the cipher element are disposed on or in different portions (e.g., different surfaces) of an object corresponding to the authentication code.

273. The cipher element of any one of embodiments 229-272, wherein the cipher element is physically associated with an object corresponding to the authentication code and a location and/or orientation of the cipher element relative to the object corresponds to the object being authentic (e.g., is verifiable).

274. An object physically associated with a cipher element, wherein the cipher element is a cipher element according to any one of embodiments 229-273 [e.g., wherein the object is also physically associated with an authentication element that encodes at least a portion of an authentication code (e.g., an authentication element according to any one of embodiments 2-55)].

275. An object and a cipher element according to any one of embodiments 229-273, wherein the object is physically associated with the cipher element [e.g., wherein the object is also physically associated with an authentication element that encodes at least a portion of an authentication code (e.g., an authentication element according to any one of embodiments 2-55)].

276. A plurality of cipher elements that encode a cipher key for an encrypted authentication code (e.g., corresponding to an object).

277. The plurality of cipher elements of embodiment 274, wherein each of the cipher elements encode a portion (e.g., a distinct portion) of the cipher key.

278. A plurality of cipher elements that each encode a different cipher key of a set of cipher keys corresponding to an encrypted authentication code (e.g., for an object).

279. The plurality of cipher elements of any one of embodiments 276-278, wherein the plurality of cipher elements are physically associated with an object corresponding to the authentication code.

280. The plurality of cipher elements of any one of embodiments 276-279, wherein each of the cipher elements is physically associated with (e.g., disposed in and/or on) a different portion of an object corresponding to the authentication code.

281. The plurality of cipher elements of any one of embodiments 276-280, wherein the cipher elements are physically associated with an object corresponding to the authentication code and arrangement of the cipher elements corresponds to the object being authentic (e.g., is verifiable).

282. The cipher element of embodiment 281, wherein the arrangement is a relative arrangement of each of the cipher elements relative to each other.

283. The cipher element of embodiment 281 or embodiment 282, wherein the arrangement is (e.g., also) an absolute arrangement of each of the cipher elements relative to an object corresponding to the authentication code.

284. An object physically associated with a plurality of cipher elements, wherein the plurality of cipher elements is a plurality of cipher elements according to any one of embodiments 276-283 [e.g., wherein the object is also physically associated with an authentication element that encodes at least a portion of an authentication code (e.g., an authentication element according to any one of embodiments 2-55)].

285. An object and a plurality of cipher elements according to any one of embodiments 276-283, wherein the object is physically associated with the plurality of cipher elements [e.g., wherein the object is also physically associated with an authentication element that encodes at least a portion of an authentication code (e.g., an authentication element according to any one of embodiments 2-55)].

286. A method of determining authenticity of an object, the method comprising:

reading a cipher element physically associated with an object to determine a cipher key;

decrypting an encrypted authentication code for the object using the cipher key; and determining that the object is authentic based on the decrypted authentication code.

287. The method of embodiment 286, wherein the cipher element is a cipher element according to any one of embodiments 229-273.

288. The method of embodiment 286 or embodiment 287, wherein the method comprises reading an authentication element according to any one of embodiments 2-55 that is physically associated with the object in order to determine at least a portion of the authentication code.

289. The method of embodiment 286 or embodiment 287, comprising receiving the encrypted authentication code from documentation, an invoice, or an electronic or physical file for the object or from a registry for the object.

290. A system comprising:

an enclosed outer container;

objects removably disposed in (e.g., inside) the outer container; and a composite cipher element encoding a cipher key for an encrypted authentication code corresponding to the objects, wherein each of the objects is physically associated with (e.g., comprises) a distinct portion of the composite cipher element and the composite cipher element can be read (e.g., to determine the cipher key) through the outer container (e.g., without accessing inside of the outer container).

291. The system of embodiment 290, wherein the objects are ordered in the outer container so that the composite cipher element is readable to determine the cipher key.

292. The system of embodiment 290 or embodiment 291, wherein the objects are layered in the outer container so that the composite cipher element is readable to determine the cipher key.

293. The system of any one of embodiments 290-292, wherein objects are arranged in the outer container such that the composite cipher element can be read from a predetermined angle (e.g., within a predetermined range of acceptable angles) [e.g., using x-rays, radio waves (e.g., in combination with a magnetic field), and/or sound waves].

294. The system of any one of embodiments 290-293, wherein the objects are arranged in three dimensions such that the composite cipher element encodes the cipher key two-dimensionally (e.g., barcode or QR code).

295. The system of any one of embodiments 290-294, wherein, for each of the objects, the portion of the composite cipher element comprised in the object has been deposited (e.g., printed) onto a surface of the object.

296. The system of any one of embodiments 290-295, wherein, for each of the objects, the portion of the composite cipher element comprised in the object has been integrated (e.g., woven) into the object.

297. The system of any one of embodiments 290-296, wherein the composite cipher element comprises (e.g., is) a QR code or a barcode and the cipher key is encoded in the QR code or barcode.

298. The system of any one of embodiments 290-297, wherein the composite cipher element is readable based on the objects having a particular arrangement within the outer container.

299. The system of any one of embodiments 290-298, wherein the composite cipher element is readable only if the objects have a particular arrangement within the outer container.

300. The system of any one of embodiments 290-299, wherein the objects are flat.

301. The system of any one of embodiments 290-300, wherein the composite cipher element is flat.

302. The system of any one of embodiments 290-301, wherein the composite cipher element is invisible to unaided human eyes.

303. The system of any one of embodiments 290-302, wherein the outer container is opaque.

304. The system of any one of embodiments 290-303, wherein the outer container is secure (e.g., sealed or locked).

305. The system of any one of embodiments 290-304, wherein the outer container is secured by a tamper-proof mechanism.

306. The system of embodiment 305, wherein the tamper-proof mechanism is a seal.

307. The system of any one of embodiments 290-306, wherein the outer container is secured by a mechanism that can be authenticated (e.g., a tamper-proof mechanism that can be authenticated).

308. The system of any one of embodiments 290-307, wherein the outer container is an envelope.

309. The system of any one of embodiments 290-307, wherein the outer container is a box.

310. The system of any one of embodiments 290-309, wherein the outer container is packaging [e.g., box (e.g., cardboard box) or shrink-wrap].

311. The system of any one of embodiments 290-310, wherein the outer container is disposable.

312. The system of any one of embodiments 290-311, wherein the outer container maintains alignment of the objects such that the cipher element is readable (e.g., to determine the cipher key).

313. The system of any one of embodiments 290-312, wherein the outer container is sized and shaped relative to the objects such that the outer container maintains alignment of the objects.

314. The system of any one of embodiments 290-313, wherein the objects are shaped and disposed as sheet-like layers.

315. The system of any one of embodiments 290-314, wherein the objects are sheets of paper (e.g., pages of a document or currency notes).

316. The system of any one of embodiments 290-315, wherein the composite cipher element comprises radiopaque encoding portions (e.g., wherein the distinct portion of the composite cipher element is radiopaque).

317. The system of any one of embodiments 290-316, wherein the composite cipher element is formed from one or more radiopaque materials.

318. The system of embodiment 317, wherein the one or more radiopaque materials are deposited (e.g., printed) on the objects.

319. The system of embodiment 317 or embodiment 318, wherein the one or more radiopaque materials are integrated (e.g., woven) into the objects.

320. The system of any one of embodiments 290-319, wherein the objects together form a complete document or a complete set of documents.

321. The system of any one of embodiments 290-320, wherein the objects are folded and the composite cipher element is readable (e.g., to determine the cipher key) based on how the objects are folded.

322. A system comprising:

an enclosed outer container; and an object removably disposed in (e.g., inside) the outer container, wherein the object is physically associated with (e.g., comprises) a cipher element encoding a cipher key for an encrypted authentication code, wherein the authentication code corresponds to the object, wherein the cipher element can be read (e.g., to determine the cipher key) without accessing inside of the outer container.

323. The system of embodiment 322, wherein, the cipher element has been deposited [e.g., printed (e.g., ink-jet printed)] onto a surface of the object.

324. The system of embodiment 322 or embodiment 323, wherein, the cipher element has been integrated (e.g., woven) into the object.

325. The system of any one of embodiments 322-324, wherein the cipher element comprises (e.g., is) a QR code or a barcode and the cipher key is encoded in the QR code or barcode.

326. The system of any one of embodiments 322-325, wherein the cipher element is readable based on the object having a particular arrangement within the outer container.

327. The system of any one of embodiments 322-326, wherein the cipher element is readable only if the object has a particular arrangement within the outer container.

328. The system of any one of embodiments 322-327, wherein the object is flat.

329. The system of any one of embodiments 322-328, wherein the cipher element is flat.

330. The system of any one of embodiments 322-329, wherein the cipher element is invisible to an unaided human viewer.

331. The system of any one of embodiments 322-330, wherein the outer container is opaque.

332. The system of any one of embodiments 322-331, wherein the outer container is secure (e.g., sealed or locked).

333. The system of any one of embodiments 322-332, wherein the outer container is secured by a tamper-proof mechanism.

334. The system of embodiment 333, wherein the tamper-proof mechanism is a seal.

335. The system of any one of embodiments 322-334, wherein the outer container is secured by a mechanism that can be authenticated (e.g., a tamper-proof mechanism that can be authenticated).

336. The system of any one of embodiments 322-335, wherein the outer container is an envelope.

337. The system of any one of embodiments 322-336, wherein the outer container is a box.

338. The system of any one of embodiments 322-337, wherein the outer container is packaging.

339. The system of any one of embodiments 322-338, wherein the outer container is disposable.

340. The system of any one of embodiments 322-339, wherein the outer container is sized and shaped relative to the object such that the outer container maintains alignment of the object.

341. The system of any one of embodiments 322-340, wherein the outer container maintains alignment of the object such that the cipher element is readable (e.g., to determine the cipher key).

342. The system of any one of embodiments 322-341, wherein the object is shaped as a sheet-like layer.

343. The system of any one of embodiments 322-342, wherein the object is a sheet of paper (e.g., a page of a document or a currency note).

344. The system of any one of embodiments 322-343, wherein the cipher element comprises one or more radiopaque encoding portions.

345. The system of any one of embodiments 322-344, wherein the cipher element is formed from one or more radiopaque materials.

346. The system of embodiment 345, wherein the one or more radiopaque materials are deposited (e.g., printed) on (e.g., a surface of) the object.

347. The system of embodiment 345 or embodiment 346, wherein the one or more radiopaque materials are integrated (e.g., woven) into the object.

348. The system of any one of embodiments 322-347, wherein the object is a page of a document, a complete document, or part of a complete set of documents that are contained in the outer container.

349. The system of any one of embodiments 322-348, wherein the object is folded and the cipher element is readable (e.g., to determine the cipher key) based on how the object is folded.

350. The system of any one of embodiments 322-349, comprising a plurality of objects removably disposed in the outer container, wherein each of the objects is physically associated with a cipher element encoding the cipher key, wherein the cipher element can be read (e.g., to determine the cipher key) through the outer container (e.g., without accessing in of the outer container).

351. An object physically associated with an element, the element comprising one or more portions that are radiopaque and/or attenuate sound (e.g., one or more encoding portions), wherein the object is authenticatable based on the one or more portions.

352. The object of embodiment 351, wherein the element is a thread or fiber.

353. The object of embodiment 351 or 352, wherein the one or more portions comprise one or more filaments, one or more threads, or one or more fibers.

354. The object of any one of embodiments 351-353, wherein the element is integrated with the object.

355. The object of any one of embodiments 351-354, wherein the element is woven into, stitched into, or embroidered into the object.

356. The object of any one of embodiments 351-355, wherein the element is physically associated with a logo disposed on or in the object.

357. The object of any one of embodiments 351-356, wherein the object is authenticatable based at least on (e.g., solely on) a spatial arrangement of the one or more portions.

358. The object of any one of embodiments 351-357, wherein the object is authenticatable based at least on (e.g., solely on) a location of the one or more portion relative to the object.

359. The object of any one of embodiments 351-358, wherein the object comprises the element.

360. An object comprising radiopaque and/or sound attenuating filament, thread, or fiber, wherein the object is authenticatable based on the filament, thread, or fiber.

361. The object of embodiments 360, wherein the object is authenticatable based at least on (e.g., solely on) a spatial arrangement of the filament, thread, or fiber.

362. The object of embodiment 360 or 361, wherein the object is authenticatable based at least on (e.g., solely on) a location of the filament, thread, or fiber relative to the object.

363. A method of authenticating an object physically associated with an authentication element that encodes at least a portion of an authentication code for the object, the method comprising:

orienting the authentication element to a predetermined orientation (e.g., angle) or within a range of predetermined orientations (e.g., angles) relative to a source and/or detector (e.g., for a non-visible imaging modality) (e.g., of an x-ray machine, an MRI machine, a CT machine, or an ultrasound machine);

reading the authentication element with the source and the detector (e.g., with the x-ray machine, the MRI machine, the CT machine, or the ultrasound machine) to determine the at least a portion of an authentication code; and authenticating the object using the at least a portion of an authentication code.

364. The method of embodiment 363, wherein the step of orienting the authentication element comprises rotating the source and/or detector relative to the authentication element.

365. The method of embodiment 363 or 364, wherein the step of orienting the authentication element comprises rotating the source and/or detector.

366. The method of any one of embodiments 363-365, wherein the step of orienting the authentication element comprises rotating the object thereby rotating the authentication element.

Exemplary Computing Devices

Figure 18:
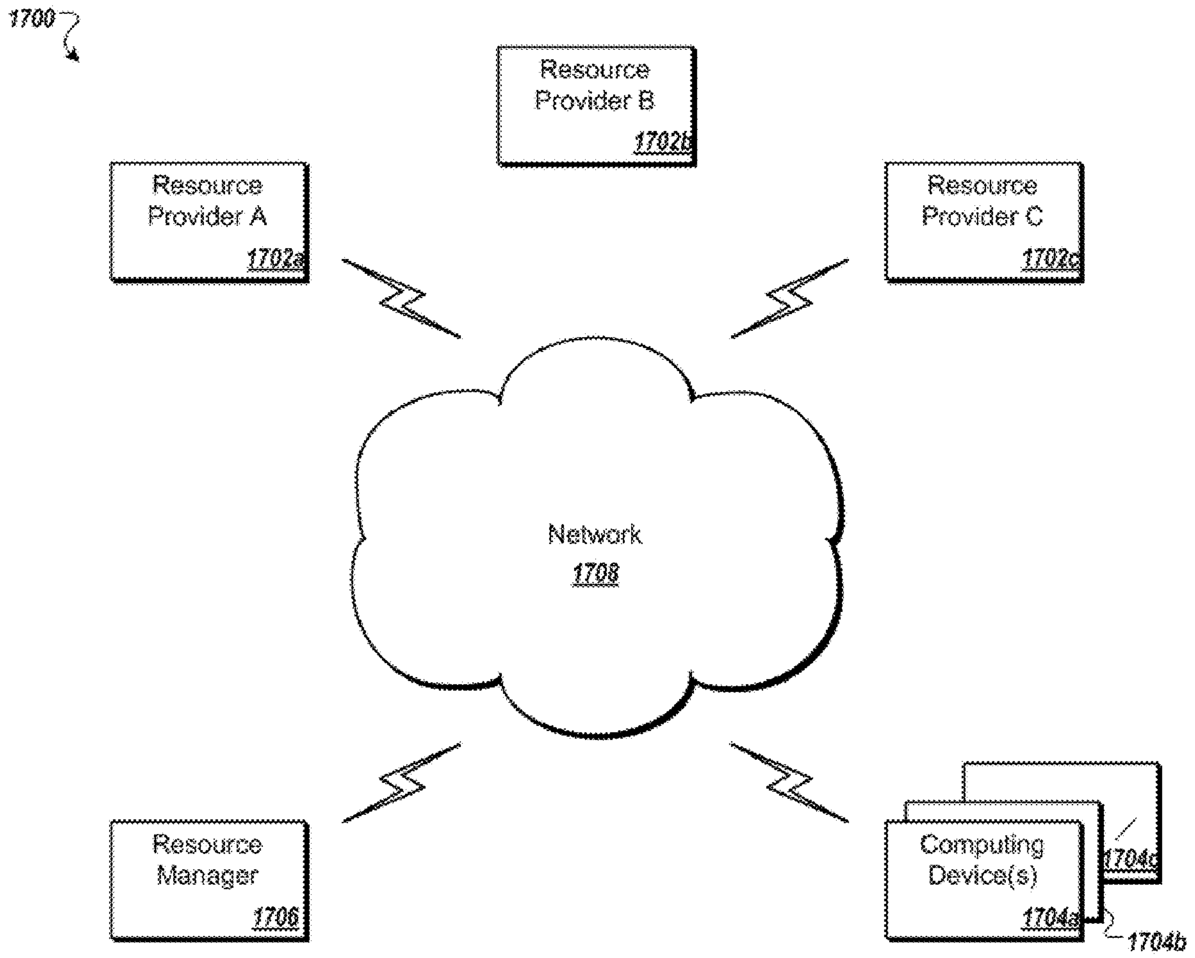
FIG. 18 is a block diagram of an example network environment for use in the methods and systems described herein, according to illustrative embodiments of the present disclosure.

Illustrative embodiments of systems and methods disclosed herein were described above with reference to computations performed locally by a computing device. However, computations performed over a network are also contemplated. FIG. 18 shows an illustrative network environment 1800 for use in the methods and systems described herein. In brief overview, referring now to FIG. 18, a block diagram of an illustrative cloud computing environment 1800 is shown and described. The cloud computing environment 1800 may include one or more resource providers 1802*a*, 1802*b*, 1802*c* (collectively, 1802). Each resource provider 1802 may include computing resources. In some implementations, computing resources may include any hardware and/or software used to process data. For example, computing resources may include hardware and/or software capable of executing algorithms, computer programs, and/or computer applications. In some implementations, illustrative computing resources may include application servers and/or databases with storage and retrieval capabilities. Each resource provider 1802 may be connected to any other resource provider 1802 in the cloud computing environment 1800. In some implementations, the resource providers 1802 may be connected over a computer network 1808. Each resource provider 1802 may be connected to one or more computing device 1804*a*, 1804*b*, 1804*c* (collectively, 1804), over the computer network 1808.

The cloud computing environment 1800 may include a resource manager 1806. The resource manager 1806 may be connected to the resource providers 1802 and the computing devices 1804 over the computer network 1808. In some implementations, the resource manager 1806 may facilitate the provision of computing resources by one or more resource providers 1802 to one or more computing devices 1804. The resource manager 1806 may receive a request for a computing resource from a particular computing device 1804. The resource manager 1806 may identify one or more resource providers 1802 capable of providing the computing resource requested by the computing device 1804. The resource manager 1806 may select a resource provider 1802 to provide the computing resource. The resource manager 1806 may facilitate a connection between the resource provider 1802 and a particular computing device 1804. In some implementations, the resource manager 1806 may establish a connection between a particular resource provider 1802 and a particular computing device 1804. In some implementations, the resource manager 1806 may redirect a particular computing device 1804 to a particular resource provider 1802 with the requested computing resource.

Figure 19:
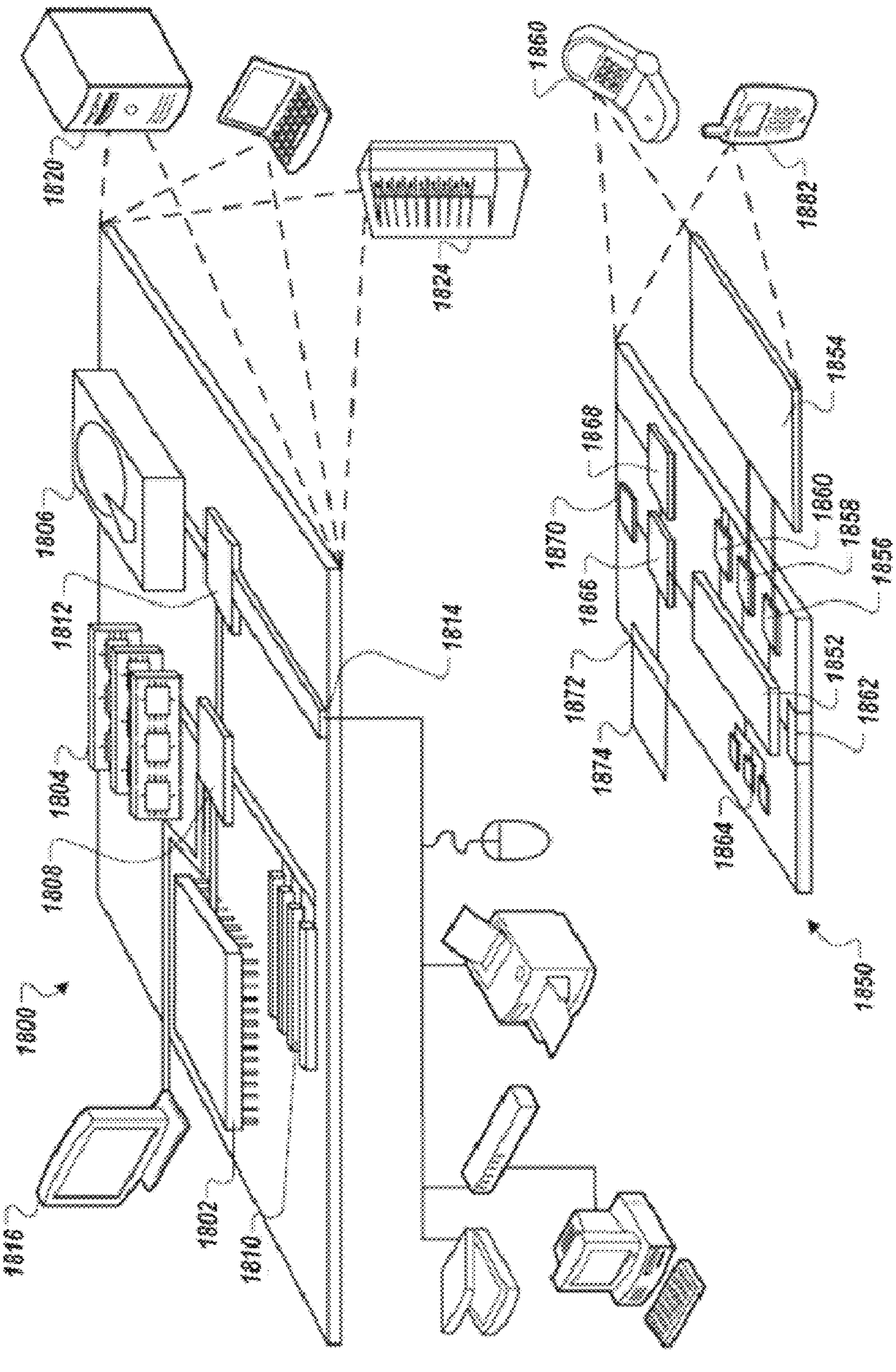
FIG. 19 is a block diagram of an example computing device and an example mobile computing device, for use in illustrative embodiments of the present disclosure.

FIG. 19 shows an example of a computing device 1900 and a mobile computing device 1950 that can be used in the methods and systems described in this disclosure. The computing device 1900 is intended to represent various forms of digital computers, such as laptops, desktops, workstations, personal digital assistants, servers, blade servers, mainframes, and other appropriate computers. The mobile computing device 1950 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1900 includes a processor 1902, a memory 1904, a storage device 1906, a high-speed interface 1908 connecting to the memory 1904 and multiple high-speed expansion ports 1910, and a low-speed interface 1912 connecting to a low-speed expansion port 1914 and the storage device 1906. Each of the processor 1902, the memory 1904, the storage device 1906, the high-speed interface 1908, the high-speed expansion ports 1910, and the low-speed interface 1912, are interconnected using various busses, and may be mounted on a common motherboard or in other manners as appropriate. The processor 1902 can process instructions for execution within the computing device 1900, including instructions stored in the memory 1904 or on the storage device 1906 to display graphical information for a GUI on an external input/output device, such as a display 1916 coupled to the high-speed interface 1908. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Also, multiple computing devices may be connected, with each device providing portions of the necessary operations (e.g., as a server bank, a group of blade servers, or a multi-processor system). Thus, as the term is used herein, where a plurality of functions are described as being performed by "a processor", this encompasses embodiments wherein the plurality of functions are performed by any number of processors (e.g., one or more processors) of any number of computing devices (e.g., one or more computing devices). Furthermore, where a function is described as being performed by "a processor", this encompasses embodiments wherein the function is performed by any number of processors (e.g., one or more processors) of any number of computing devices (e.g., one or more computing devices) (e.g., in a distributed computing system).

The memory 1904 stores information within the computing device 1900. In some implementations, the memory 1904 is a volatile memory unit or units. In some implementations, the memory 1904 is a non-volatile memory unit or units. The memory 1904 may also be another form of computer-readable medium, such as a magnetic or optical disk.

The storage device 1906 is capable of providing mass storage for the computing device 1900. In some implementations, the storage device 1906 may be or contain a computer-readable medium, such as a hard disk device, an optical disk device, a flash memory or other similar solid state memory device, or an array of devices, including devices in a storage area network or other configurations. Instructions can be stored in an information carrier. The instructions, when executed by one or more processing devices (for example, processor 1902), perform one or more methods, such as those described above. The instructions can also be stored by one or more storage devices such as computer- or machine-readable mediums (for example, the memory 1904, the storage device 1906, or memory on the processor 1902).

The high-speed interface 1908 manages bandwidth-intensive operations for the computing device 1900, while the low-speed interface 1912 manages lower bandwidth-intensive operations. Such allocation of functions is an example only. In some implementations, the high-speed interface 1908 is coupled to the memory 1904, the display 1916 (e.g., through a graphics processor or accelerator), and to the high-speed expansion ports 1910, which may accept various expansion cards (not shown). In the implementation, the low-speed interface 1912 is coupled to the storage device 1906 and the low-speed expansion port 1914. The low-speed expansion port 1914, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1900 may be implemented in a number of different forms, as shown in the figure. For example, it may be implemented as a standard server 1920, or multiple times in a group of such servers. In addition, it may be implemented in a personal computer such as a laptop computer 1922. It may also be implemented as part of a rack server system 1924. Alternatively, components from the computing device 1900 may be combined with other components in a mobile device (not shown), such as a mobile computing device 1950. Each of such devices may contain one or more of the computing device 1900 and the mobile computing device 1950, and an entire system may be made up of multiple computing devices communicating with each other.

The mobile computing device 1950 includes a processor 1952, a memory 1964, an input/output device such as a display 1954, a communication interface 1966, and a transceiver 1968, among other components. The mobile computing device 1950 may also be provided with a storage device, such as a micro-drive or other device, to provide additional storage. Each of the processor 1952, the memory 1964, the display 1954, the communication interface 1966, and the transceiver 1968, are interconnected using various buses, and several of the components may be mounted on a common motherboard or in other manners as appropriate.

The processor 1952 can execute instructions within the mobile computing device 1950, including instructions stored in the memory 1964. The processor 1952 may be implemented as a chipset of chips that include separate and multiple analog and digital processors. The processor 1952 may provide, for example, for coordination of the other components of the mobile computing device 1950, such as control of user interfaces, applications run by the mobile computing device 1950, and wireless communication by the mobile computing device 1950.

The processor 1952 may communicate with a user through a control interface 1958 and a display interface 1956 coupled to the display 1954. The display 1954 may be, for example, a TFT (Thin-Film-Transistor Liquid Crystal Display) display or an OLED (Organic Light Emitting Diode) display, or other appropriate display technology. The display interface 1956 may comprise appropriate circuitry for driving the display 1954 to present graphical and other information to a user. The control interface 1958 may receive commands from a user and convert them for submission to the processor 1952. In addition, an external interface 1962 may provide communication with the processor 1952, so as to enable near area communication of the mobile computing device 1950 with other devices. The external interface 1962 may provide, for example, for wired communication in some implementations, or for wireless communication in other implementations, and multiple interfaces may also be used.

The memory 1964 stores information within the mobile computing device 1950. The memory 1964 can be implemented as one or more of a computer-readable medium or media, a volatile memory unit or units, or a non-volatile memory unit or units. An expansion memory 1974 may also be provided and connected to the mobile computing device 1950 through an expansion interface 1972, which may include, for example, a SIMM (Single In Line Memory Module) card interface. The expansion memory 1974 may provide extra storage space for the mobile computing device 1950, or may also store applications or other information for the mobile computing device 1950. Specifically, the expansion memory 1974 may include instructions to carry out or supplement the processes described above, and may include secure information also. Thus, for example, the expansion memory 1974 may be provided as a security module for the mobile computing device 1950, and may be programmed with instructions that permit secure use of the mobile computing device 1950. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier and, when executed by one or more processing devices (for example, processor 1952), perform one or more methods, such as those described above. The instructions can also be stored by one or more storage devices, such as one or more computer- or machine-readable mediums (for example, the memory 1964, the expansion memory 1974, or memory on the processor 1952). In some implementations, the instructions can be received in a propagated signal, for example, over the transceiver 1968 or the external interface 1962.

The mobile computing device 1950 may communicate wirelessly through the communication interface 1966, which may include digital signal processing circuitry where necessary. The communication interface 1966 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1968 using a radio-frequency. In addition, short-range communication may occur, such as using a Bluetooth®, Wi-Fi™, or other such transceiver (not shown). In addition, a GPS (Global Positioning System) receiver module 1970 may provide additional navigation- and location-related wireless data to the mobile computing device 1950, which may be used as appropriate by applications running on the mobile computing device 1950.

The mobile computing device 1950 may also communicate audibly using an audio codec 1960, which may receive spoken information from a user and convert it to usable digital information. The audio codec 1960 may likewise generate audible sound for a user, such as through a speaker, e.g., in a handset of the mobile computing device 1950. Such sound may include sound from voice telephone calls, may include recorded sound (e.g., voice messages, music files, etc.) and may also include sound generated by applications operating on the mobile computing device 1950.

The mobile computing device 1950 may be implemented in a number of different forms, as shown in the figure. For example, it may be implemented as a cellular telephone 1980. It may also be implemented as part of a smart-phone 1982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

It is contemplated that systems, devices, methods, and processes of the disclosure encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it is contemplated that, additionally, there are articles, devices, and systems according to certain embodiments of the present disclosure that consist essentially of, or consist of, the recited components, and that there are processes and methods according to certain embodiments of the present disclosure that consist essentially of, or consist of, the recited processing steps.

It should be understood that the order of steps or order for performing certain action is immaterial so long as operability is not lost. Moreover, two or more steps or actions may be conducted simultaneously. As is understood by those skilled in the art, the terms "over", "under", "above", "below", "beneath", and "on" are relative terms and can be interchanged in reference to different orientations of the layers, elements, and substrates included in the present disclosure. For example, a first layer on a second layer, in some embodiments means a first layer directly on and in contact with a second layer. In other embodiments, a first layer on a second layer can include another layer there between.

In this application, unless otherwise clear from context or otherwise explicitly stated, (i) the term "a" may be understood to mean "at least one"; (ii) the term "or" may be understood to mean "and/or"; (iii) the terms "comprising" and "including" may be understood to encompass itemized components or steps whether presented by themselves or together with one or more additional components or steps; and (iv) where ranges are provided, endpoints are included.

Those of ordinary skill in the art will recognize that where the foregoing description described one or more features of "an authentication element," such feature(s) may apply or be applied to a composite authentication element and vice versa; such embodiments are expressly contemplated. For readability reasons only, each instance of "an authentication element" is not followed by "or a composite authentication element" or written as "a (composite) authentication element."

Headers have been provided for the convenience of the reader and are not intended to be limiting with respect to the disclosed or claimed subject matter.

Certain embodiments of the present disclosure were described above. It is, however, expressly noted that the present disclosure is not limited to those embodiments, but rather the intention is that additions and modifications to what was expressly described in the present disclosure are also included within the scope of the disclosure. Moreover, it is to be understood that the features of the various embodiments described in the present disclosure were not mutually exclusive and can exist in various combinations and permutations, even if such combinations or permutations were not made express, without departing from the spirit and scope of the disclosure. The disclosure has been described in detail with particular reference to certain embodiments thereof, but it will be understood that variations and modifications can be effected within the spirit and scope of the claimed invention.

PARTS LIST d1, d2, d3 distance/spacing/dimension
w1, w2, w3 width
10 authentication element/internal component
11 thread
12 encoding portion/visibility-enhancing element
13 authentication code
14 authentication element location
15 image of authentication element
16 composite authentication element
17 distinct portion of composite authentication element

20 authentication system
21 object/item
22 label
23 outer container/envelope/box
24 inner object/interior container
25 tamper-proof mechanism/seal
26 medallion
27 stitched oval
30 canvas
31 paint
40 system/logistics system
41 conveyor belt
42 authentication element reading device/imaging device/ x-ray machine

What is claimed is:

1. A passive authentication thread comprising one or more radiopaque fibers braided into the thread, wherein an arrangement of the one or more radiopaque fibers in the thread at least partially encodes at least a portion of an authentication code.

2. The authentication thread of claim 1, wherein the authentication code comprises one or more characters and the arrangement encodes the one or more characters.

3. The authentication thread of claim 1, wherein the authentication code comprises one or more characters and the one or more radiopaque fibers is a plurality of radiopaque fibers, wherein the arrangement of two or more of the plurality of radiopaque fibers together encodes one of the one or more characters.

4. The authentication thread of claim 1, wherein the one or more radiopaque fibers are spatially arranged, spatially distributed, phased, positioned, oriented, or a combination thereof such that the arrangement encodes at least a portion of the authentication code.

5. The authentication thread of claim 1, wherein the one or more radiopaque fibers are spatially arranged, spatially distributed, phased, positioned, oriented, shaped, sized, constructed to produce a responsive signal, or a combination thereof such that the arrangement encodes at least a portion of the authentication code.

6. The authentication thread of claim 1, wherein at least a portion of the authentication code is encoded by a spatial distribution, position, size, or any combination of spatial distribution, position, and size of the one or more radiopaque fibers of the authentication thread.

7. The authentication thread of claim 1, wherein the authentication thread is readable using (i) x-rays and (ii) radio waves and/or sound waves to determine the at least a portion of the authentication code.

8. The authentication thread of claim 1, comprising a plurality of radiopaque fibers that together encode at least a portion of the authentication code.

9. The authentication thread of claim 1, comprising a plurality of radiopaque fibers that each encode a character in the authentication code.

10. The authentication thread claim 1, wherein the authentication thread is covered.

11. The authentication thread of claim 1, wherein the authentication thread is not visible to unaided human eyes.

12. The authentication thread of claim 1, wherein the authentication thread comprises one or more portions that encode information indicating a start point or an end point or both a start point and an end point of the at least a portion of the authentication code.

13. The authentication thread of claim 1, wherein the authentication thread encodes multiple copies of the at least a portion of the authentication code.

14. The authentication thread of claim 1, wherein the authentication thread encodes the at least a portion of the authentication code in an encrypted manner.

15. The authentication thread of claim 1, wherein the authentication code is at least 10 characters long or at least 64 bits.

16. The authentication thread of claim 1, wherein the authentication thread encodes the at least a portion of the authentication code in a base that is not base 10 or not in plaintext or both in a base that is not base 10 and not in plaintext.

17. The authentication thread of claim 1, wherein the authentication thread encodes at least a portion of multiple authentication codes.

18. The authentication thread of claim 1, wherein one or more first portions of the authentication thread encode at least a portion of a first authentication code and one or more second portions of the authentication thread encode at least a portion of a second authentication code.

19. The authentication thread of claim 1, wherein the authentication thread comprises one or more first portions that encode a first portion of the authentication code in a first manner and one or more second portions that encode a second portion of the authentication code in a second manner different from the first manner.

20. The authentication thread of claim 1, wherein the at least a portion of the authentication code is encoded by a single portion of the authentication thread.

21. The authentication thread of claim 1, wherein the authentication thread is tamper-proof such that the at least a portion of the authentication code cannot be obtained from the authentication thread if the authentication thread has been tampered with.

22. An object physically associated with the passive authentication thread of claim 2, wherein the object can be authenticated with the authentication code.

23. The object of claim 22, wherein the object is an artwork and the object comprises a substrate that comprises the authentication thread.

24. The object of claim 22, wherein the authentication thread is embedded in the object.

25. The object of claim 22, wherein the authentication thread is (i) disposed in an interior of the object, (ii) internal to the object, (iii) covered from view by unaided human eyes by a portion of the object, or (iv) a combination thereof.

26. The object of claim 22, wherein the authentication code is unique to the object.

27. The object of claim 22, wherein the authentication thread is disposed on a surface of the object.

28. The object of claim 22, wherein the authentication thread is adhered to the object.

29. The object of claim 22, wherein the authentication thread is integrated with the object.

30. The object of claim 22, wherein the object contains the authentication thread.

31. The object of claim 22, wherein the object comprises the authentication thread.

32. The object of claim 22, wherein the object is enclosed in an opaque container and the authentication thread is disposed such that the authentication thread is readable from outside the container using x-rays.

33. The authentication thread of claim 1, wherein a number of the one or more radiopaque fibers in the arrangement at least partially encodes the at least a portion of the authentication code.

34. The authentication thread of claim 1, wherein a size of the one or more radiopaque fibers in the arrangement at least partially encodes the at least a portion of the authentication code.

35. The authentication thread of claim 1, wherein a size of each of the one or more radiopaque fibers in the arrangement at least partially encodes the at least a portion of the authentication code.

36. The authentication thread of claim 1, wherein an orientation of the one or more radiopaque fibers in the arrangement at least partially encodes the at least a portion of the authentication code.

37. The authentication thread of claim 1, wherein a spatial distribution of the one or more radiopaque fibers in the arrangement at least partially encodes the at least a portion of the authentication code.

38. The authentication thread of claim 1, wherein the one or more radiopaque fibers is a plurality of radiopaque fibers, wherein spacing between adjacent two or more of the plurality of radiopaque fibers in the arrangement at least partially encodes the at least a portion of the authentication code.

39. The authentication thread of claim 1, wherein a radiodensity of the one or more radiopaque fibers in the arrangement at least partially encodes the at least a portion of the authentication code.

40. The authentication thread of claim 1, wherein the one or more radiopaque fibers comprises a monofilament fiber.

41. The authentication thread of claim 1, wherein the one or more radiopaque fibers comprises a multifilament fiber.

42. The authentication thread of claim 41, wherein the multifilament fiber comprises one or more radiopaque filaments.

43. The authentication thread of claim 1, wherein a braiding pattern of the one or more radiopaque fibers in the thread encodes the at least a portion of the authentication code.

44. The authentication thread of claim 1, wherein the arrangement of the one or more radiopaque fibers in the thread encodes the at least a portion of the authentication code.

45. The authentication thread of claim 1, wherein the arrangement is a spatial arrangement.

* * * * *